United States Patent
Yamada et al.

(10) Patent No.: US 8,937,653 B2
(45) Date of Patent: Jan. 20, 2015

(54) MICROSCOPE SYSTEM, SPECIMEN OBSERVING METHOD, AND COMPUTER-READABLE RECORDING MEDIUM

(75) Inventors: Tatsuki Yamada, Tokyo (JP); Futoshi Akiyama, Tokyo (JP); Rie Horii, Tokyo (JP)

(73) Assignees: Olympus Corporation, Tokyo (JP); Japanese Foundation for Cancer Research, Tokyo (JP)

( * ) Notice: Subject to any disclaimer, the term of this patent is extended or adjusted under 35 U.S.C. 154(b) by 628 days.

(21) Appl. No.: 13/205,922

(22) Filed: Aug. 9, 2011

(65) Prior Publication Data

US 2012/0033064 A1 Feb. 9, 2012

(30) Foreign Application Priority Data

Aug. 9, 2010 (JP) ................................ 2010-178984

(51) Int. Cl.
*H04N 7/18* (2006.01)
*G02B 21/00* (2006.01)
(Continued)

(52) U.S. Cl.
CPC ............ *H04N 7/183* (2013.01); *G02B 21/0004* (2013.01); *G02B 21/367* (2013.01); *G02B 26/008* (2013.01); *G02B 21/086* (2013.01); *G02B 21/26* (2013.01)
USPC .......................................................... 348/79

(58) Field of Classification Search
CPC .......... G06K 9/00127; G06K 9/00147; G06K 9/0014; G01N 15/1475
USPC ......... 348/79; 382/133; 435/6, 40.5; 600/477
See application file for complete search history.

(56) References Cited

U.S. PATENT DOCUMENTS 7,826,648 B2   11/2010   Arai
8,111,897 B2    2/2012   Yamashita et al.
(Continued)

FOREIGN PATENT DOCUMENTS

JP   HEI07-120324 A    5/1995
JP   HEI09-281405 A   10/1997
(Continued)

OTHER PUBLICATIONS

The Decision of a Patent Grant, issued on Dec. 17, 2013, in the corresponding Japanese application No. 2010-178984 and English translation thereof.

*Primary Examiner* — Tung Vo
*Assistant Examiner* — Rowina Cattungal

(57) ABSTRACT

A microscope system includes a pigment amount calculating unit, a cell component identification processing unit, a target molecule expression portion extraction unit, a cell variant setting unit, a cell variant classification determining unit, and a display image generating unit. The pigment amount calculating unit calculates a pigment amount of a molecule target pigment for each pixel of a VS image. The cell component identification processing unit identifies a cell component based on the pigment amount. The target molecule expression portion extraction unit extracts expression portions of target molecules in the area of the cell component. The cell variant setting unit sets a cell variant including a combination of presence/absence of expressions of target molecules. The cell variant classification determining unit classifies a cell area in the VS image into a cell variant based on the combination of the expression portions of the target molecules included in the cell area.

14 Claims, 38 Drawing Sheets

(51) Int. Cl.
  *G02B 21/36* (2006.01)
  *G02B 26/00* (2006.01)
  *G02B 21/08* (2006.01)
  *G02B 21/26* (2006.01)

(56) References Cited

U.S. PATENT DOCUMENTS

| 8,144,966 B2* | 3/2012 | Provenzano et al. ......... 382/133 |
| 8,486,393 B2 | 7/2013 | Ferrone et al. |
| 2004/0023320 A1* | 2/2004 | Steiner et al. ............. 435/40.5 |
| 2008/0015448 A1* | 1/2008 | Keely et al. ................. 600/477 |
| 2008/0279441 A1* | 11/2008 | Matsuo et al. ............... 382/133 |
| 2009/0075266 A1* | 3/2009 | Shuber .............................. 435/6 |
| 2010/0141752 A1 | 6/2010 | Yamada |
| 2010/0158894 A1 | 6/2010 | Umemura et al. |

FOREIGN PATENT DOCUMENTS

| JP | 2002-521682 A | 7/2002 |
| JP | 2006-343573 A | 12/2006 |
| JP | 2008-051654 A | 3/2008 |
| JP | 2008-309662 | 12/2008 |
| JP | 2008-309685 | 12/2008 |
| JP | 2009-175334 A | 8/2009 |

* cited by examiner

FIG.1

|  | EXPRESSION ON CELL MEMBRANE | HER2 RECEPTOR: HER2 | |
|---|---|---|---|
| EXPRESSION ON CELL NUCLEUS | | POSITIVE (+) | NEGATIVE (-) |
| HORMONE RECEPTOR (ESTROGEN RECEPTOR: ER PROGESTERONE RECEPTOR: PgR) | POSITIVE (+) | LUMINAL B | LUMINAL A |
| | NEGATIVE (-) | HER2 DISEASE | BASAL LIKE |

| ARRANGEMENT NUMBER | | | POSITION OF ELECTROMOTIVE STAGE | | |
|---|---|---|---|---|---|
| x | y | z | X | Y | Z |
| 1 | 1 | - | $X_{11}$ | $Y_{11}$ | $Z_{11}$ |
| 1 | 2 | - | $X_{12}$ | $Y_{12}$ | $Z_{12}$ |
| ⋮ | ⋮ | ⋮ | ⋮ | ⋮ | ⋮ |

| LABEL | CIRCUM-SCRIBING RECTANGLE | | | | BARY-CENTER | | SIZE OF AREA | PERIPH-ERAL LENGTH | ROUND-NESS | LENGTH OF MAJOR AXIS | LENGTH OF MINOR AXIS | ASPECT RATIO |
|---|---|---|---|---|---|---|---|---|---|---|---|---|
| | x | y | W | H | x | y | | | | | | |
| | | | | | | | | | | | | |
| | | | | | | | | | | | | |
| | | | | | | | | | | | | |
| | | | | | | | | | | | | |
| | | | | | | | | | | | | |

FIG.24

| LABEL | CIRCUM-SCRIBING RECTANGLE | | | | BARY-CENTER | | THICK-NESS | PERIPH-ERAL LENGTH | ROUND-NESS | LENGTH OF MAJOR AXIS | LENGTH OF MINOR AXIS | AS-PECT RATIO | PRESENCE/ABSENCE OF (OR THE NUMBER OF) NUCLEUSES |
|---|---|---|---|---|---|---|---|---|---|---|---|---|---|
| | x | y | W | H | x | y | | | | | | | |
| | | | | | | | | | | | | | |
| | | | | | | | | | | | | | |
| | | | | | | | | | | | | | |
| | | | | | | | | | | | | | |
| | | | | | | | | | | | | | |

FIG.29A

MAP DATA OF CELL NUCLEUS

FIG.29B

EXPRESSION STATE MAP

TARGET MOLECULE EXPRESSION
PORTION MAP

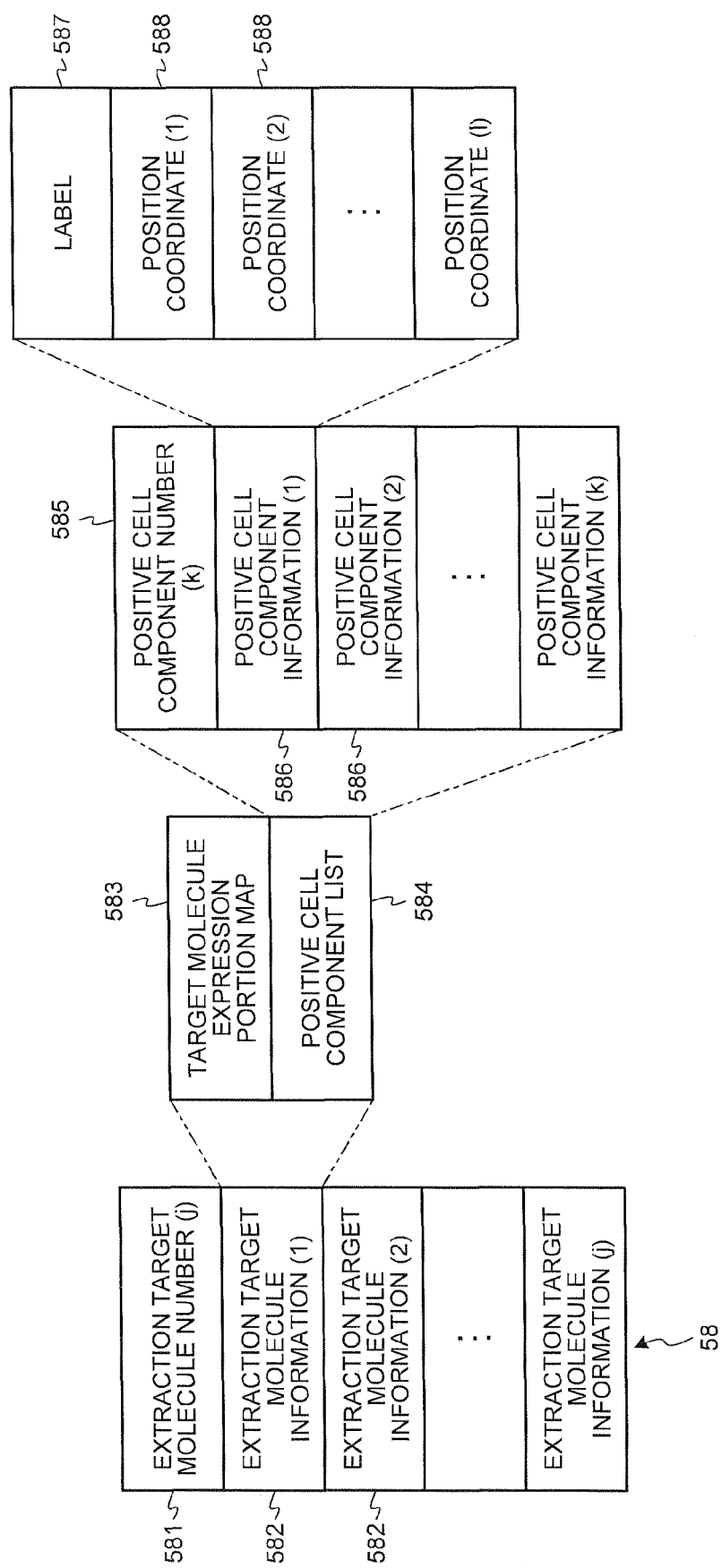

| CELL VARIANT NAME | PIGMENT INFORMATION | | | | | |
|---|---|---|---|---|---|---|
| | DAB | | VV | | VR | |
| | ER, PgR | | HER2 | | ESA | |
| LUMINAL B | ○ | ▼ | ○ | ▼ | — | ▼ |
| LUMINAL A | ○ | ▼ | × | ▼ | — | ▼ |
| HER2 DISEASE | × | ▼ | ○ | ▼ | — | ▼ |
| BASAL LIKE | × | ▼ | × | ▼ | — | ▼ |

○: TARGET MOLECULE IS EXPRESSED
×: TARGET MOLECULE IS NOT EXPRESSED
—: IRRELEVANT

FIG.40

| CELL VARIANT NAME | PIGMENT INFORMATION | | | |
|---|---|---|---|---|
| | DAB | VV | RG | VR |
| | ER, PgR | HER2 | Ki-67 | ESA |
| LUMINAL B1 | ○ | ○ | × | — |
| LUMINAL B2 | ○ | ○ | ○ | — |
| LUMINAL A1 | ○ | × | × | — |
| LUMINAL A2 | ○ | ○ | × | — |
| HER2 DISEASE1 | × | ○ | × | — |
| HER2 DISEASE2 | × | ○ | ○ | — |
| BASAL LIKE1 | × | × | × | — |
| BASAL LIKE2 | × | × | ○ | — |

○: TARGET MOLECULE IS EXPRESSED
×: TARGET MOLECULE IS NOT EXPRESSED
—: IRRELEVANT

FIG.46

| CELL VARIANT NAME | PIGMENT INFORMATION | | |
|---|---|---|---|
| | DAB | VV | VR |
| | ER, PgR | HER2 | ESA |
| LUMINAL B | ○ | ○ | ○ |
| LUMINAL A | ○ | × | ○ |
| HER2 DISEASE | × | ○ | ○ |
| BASAL LIKE | × | × | ○ |

○: TARGET MOLECULE IS EXPRESSED
×: TARGET MOLECULE IS NOT EXPRESSED

MICROSCOPE SYSTEM, SPECIMEN OBSERVING METHOD, AND COMPUTER-READABLE RECORDING MEDIUM

CROSS-REFERENCE TO RELATED APPLICATIONS

This application is based upon and claims the benefit of priority from Japanese Patent Application No. 2010-178984, filed on Aug. 9, 2010, the entire contents of which are incorporated herein by reference.

BACKGROUND OF THE INVENTION

1. Field of the Invention

The present invention relates to a microscope system that acquires a specimen image by capturing a specimen using a microscope, displays the acquired specimen image, and observes the specimen, and also relates to a specimen observing method, and a computer-readable recording medium.

2. Description of Related Art

For example, in pathological diagnosis, a system that creates a specimen by thinly slicing a tissue specimen obtained by removing an organ or performing a needle biopsy with the thickness of approximately several micrometers and performs a magnifying observation using an optical microscope for acquiring various findings has been widely performed. In this case, since the specimen rarely absorb and scatter any light and is nearly clear and colorless, the specimen is generally stained by a pigment before the observation.

Conventionally, various types of staining methods have been suggested. However, regarding especially the tissue specimen, hematoxylin eosin staining (hereinafter, referred to as "HE staining") using two pigments of hematoxylin and eosin is generally used as morphological observation staining for a morphological observation of the specimen. For example, a method that captures the specimen subjected to the HE staining with multi-bands, estimates a spectral spectrum of a specimen position to calculate (estimate) the pigment amount of the pigment staining the specimen, and synthesizes R, G, and B images for display is disclosed (for example, see Japanese Laid-open Patent Publication No. 2008-51654, Japanese Laid-open Patent Publication No. 7-120324, and International Publication No. 00/06774). As another morphological observation staining, for example, in cytological diagnosis, Papanicolaou staining (Pap staining) is known.

In the pathological diagnosis, molecule target staining to confirm an expression of molecule information is performed on the specimen to be used for diagnosis of function abnormality, such as expression abnormality of a gene or a protein. For example, the specimen is fluorescently labeled using an IHC (immunohistochemistry) method, an ICC (immunocytochemistry) method, and an ISH (in situ hybridization) method and fluorescently observed, or is enzyme-labeled and observed in a bright field. In this case, in the fluorescent observation of the specimen by the fluorescent labeling, for example, a confocal laser microscope is used. In this observation using the fluorescent labeling, highly-sensitive sharp image can be obtained, so that the specimen can be observed three-dimensionally, or the specimen can be observed in a desired direction. Further, there is an advantage in that a plurality of target molecules (antigen) can be labeled at a time.

Meanwhile, in the bright field observation (the IHC method, the ICC method, and a CISH method) by the enzyme labeling, an optical microscope is used, and therefore, the observation can be performed together with the morphological observation.

On the other hand, in recent years, as a treatment of cancers and the like, therapy called molecular target therapy using therapeutic agent acting on particular molecules (antibody therapeutic agent) has been carried out, and is expected to have therapeutic effect and reduce the side effects. In this cancer treatment using the molecular target therapy, antibody therapeutic agent targeted for specific molecules in cancer cells (protein antigen) is used, and before the treatment, for example, whether antigen serving as the target molecules of the antibody therapeutic agent is expressed on the surface of cells, i.e., cell membrane, is observed by the IHC method and the like, whereby patients eligible for the treatment are selected. Examples of antibody therapeutic agents approved for use include trastuzumab (Herceptin (registered trademark)), i.e., anti-HER2 antibody preparation for breast cancer, and cetuximab (Erbitux (registered trademark)), i.e., anti-EGFR antibody preparation for colorectal cancer.

Antibodies are caused to act on a plurality of target molecules (antigen) to label each antigen, a combination of presence/absence of the expressions (expression pattern) has been evaluated (antibody panel evaluation). For example, a combination of antigens expressed on a cell membrane is evaluated to identify cancer stem cells. More specifically, for example, in diagnosis of breast cancer, cells in which CD 44 molecule is expressed on the cell membrane and CD 24 molecule is not expressed on the cell membrane (or expressed at a lower level) are identified as stem cells. On the other hand, in diagnosis of colorectal cancer, cells in which CD 44 molecule and CD 133 are expressed on the cell membrane are identified as stem cells. In addition, various kinds of antibody panel evaluation are performed by exerting antibodies and labeling antigens, in accordance with purposes such as estimation of a primary source of cancer whose primary source is unknown (for example, distinguishing epithelial cancers of colon cancer, breast cancer, and lung cancer), distinguishing of B-cell lymphoma and T-cell lymphoma, identification of mesothelioma, distinguishing of squamous cell carcinoma and adenocarcinoma, and the like.

Furthermore, in breast cancer treatment in recent years, target treatment selectively using antibody therapeutic agent is making progress, and it is common practice to, depending on the expression pattern of multiple target molecules in a tumor site, classify the disease type (cell variant) into four types called "Luminal B", "Luminal A", "HER2 disease", and "Basal like", and accordingly, a treatment method is basically selected. For example, see Toru Watanabe, Rie Tahara, "Breast cancer; new disease classification and use of molecular targeted drugs", Keiyukai, Hamamatsu Oncology Center, [retrieved on 2010-05-07] (Retrieved from the Internet <URL: http://www.cancertherapy.jp/molecule/2009_spring/06.html>) (hereinafter, referred to as Watanabe reference). For example, depending on presence or absence of expression on the cell nucleus of estrogen receptor (hereinafter abbreviated as "ER") and progesterone receptor (hereinafter abbreviated as "PgR"), i.e., hormone receptors, a determination is made as to whether cancer multiplies depending on hormone, and a determination is made as to whether endocrine therapy (hormone therapy) is applicable or not. In addition, depending on presence or absence of expression on a cell membrane of HER2 receptor (hereinafter abbreviated as "HER2"), a selection is made as to whether trastuzumab (Herceptin (registered trademark)), i.e., anti-HER2 antibody preparation, can be applied or not. In the type called triple-negative breast cancer (TNBC) in which none of ER, PgR, HER2 expresses, chemotherapy is mainly used as treatment.

For example, when the target molecule is labeled by molecule target staining or when a plurality of target molecules are labeled by molecule target staining, the technique disclosed in Japanese Laid-open Patent Publication No. 2008-51654, Japanese Laid-open Patent Publication No. 7-120324, and International Publication No. 00/06774 is applied, so that for each pigment staining the specimen (pigment made visible by molecule target staining), the pigment amount can be calculated, and an RGB image synthesized for display can be displayed on the display device and can be observed.

SUMMARY OF THE INVENTION

A microscope system according to an aspect of the present invention includes an image acquiring unit that acquires a specimen image obtained by capturing an image of a specimen using a microscope, the specimen being stained by an element identification pigment visualizing one or more cell constituent elements constituting a cell and by a molecule target pigment visualizing a plurality of target molecules; a pigment amount acquiring unit that acquires a pigment amount of the element identification pigment staining a corresponding position on the specimen and a pigment amount of the molecule target pigment, for each pixel of the specimen image; an element area identification unit that identifies an area of the cell constituent element in the specimen image, on the basis of the pigment amount of the element identification pigment; an expression portion extraction unit that extracts expression portions of the plurality of target molecules on the cell constituent element, on the basis of the pigment amount of the molecule target pigment at a pixel in the area of the cell constituent element; an expression pattern setting unit that sets an expression pattern of the target molecules including a combination of presence/absence of expression of the plurality of target molecules; an expression pattern classification unit that classifies an area of a cell corresponding to the expression pattern of the target molecules having been set, on the basis of a combination of expression portions of the plurality of target molecules included in the area of the cell; a display image generating unit that generates a display image in which the area of the cell classified into the expression pattern of the target molecules is labeled and displayed differently from other areas of cells; and a display processing unit that displays the display image.

A specimen observing method according to another aspect of the present invention includes acquiring a specimen image obtained by capturing an image of a specimen using a microscope, the specimen being stained by an element identification pigment visualizing one or more cell constituent elements constituting a cell and by a molecule target pigment visualizing a plurality of target molecules; acquiring a pigment amount of the element identification pigment staining a corresponding position on the specimen and a pigment amount of the molecule target pigment, for each pixel of the specimen image; identifying an area of the cell constituent element in the specimen image, on the basis of the pigment amount of the element identification pigment; extracting expression portions of the plurality of target molecules on the cell constituent element, on the basis of the pigment amount of the molecule target pigment at a pixel in the area of the cell constituent element; setting an expression pattern of the target molecules including a combination of presence/absence of expression of the plurality of target molecules; classifying an area of a cell corresponding to the expression pattern of the target molecules having been set, on the basis of a combination of expression portions of the plurality of target molecules included in the area of the cell; generating a display image in which the area of the cell classified into the expression pattern of the target molecules is labeled and displayed differently from other areas of cells; and displaying the display image.

A non-transitory computer-readable storage medium according to still another aspect of the present invention has an executable program stored thereon. The program instructs a processor to perform: acquiring a specimen image obtained by capturing an image of a specimen using a microscope, the specimen being stained by an element identification pigment visualizing one or more cell constituent elements constituting a cell and by a molecule target pigment visualizing a plurality of target molecules; acquiring a pigment amount of the element identification pigment staining a corresponding position on the specimen and a pigment amount of the molecule target pigment, for each pixel of the specimen image; identifying an area of the cell constituent element in the specimen image, on the basis of the pigment amount of the element identification pigment; extracting expression portions of the plurality of target molecules on the cell constituent element, on the basis of the pigment amount of the molecule target pigment at a pixel in the area of the cell constituent element; setting an expression pattern of the target molecules including a combination of presence/absence of expression of the plurality of target molecules; classifying an area of a cell corresponding to the expression pattern of the target molecules having been set, on the basis of a combination of expression portions of the plurality of target molecules included in the area of the cell; generating a display image in which the area of the cell classified into the expression pattern of the target molecules is labeled and displayed differently from other areas of cells; and displaying the display image.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an example of cell variants.

FIG. 21 is a schematic diagram illustrating an example of the data configuration of map data of a cell nucleus;

FIG. 22 is a schematic diagram illustrating an example of the data configuration of map data of a cell membrane;

FIG. 23 is a diagram illustrating an example of the data configuration of morphological characteristic data of a cell nucleus;

FIG. 24 is a diagram illustrating an example of the data configuration of morphological characteristic data of a cell membrane;

FIGS. 29A to 29C are explanatory diagrams illustrating the principle of target molecule expression portion extraction processing according to the first embodiment;

FIG. 30 is a diagram illustrating an example of the data configuration of target molecule expression portion information;

FIG. 40 is a diagram illustrating an example of cell variants according to a modification;

FIG. 46 is a diagram illustrating an example of cell variants according to a modification;

DETAILED DESCRIPTION OF THE PREFERRED EMBODIMENTS

Figure 2:
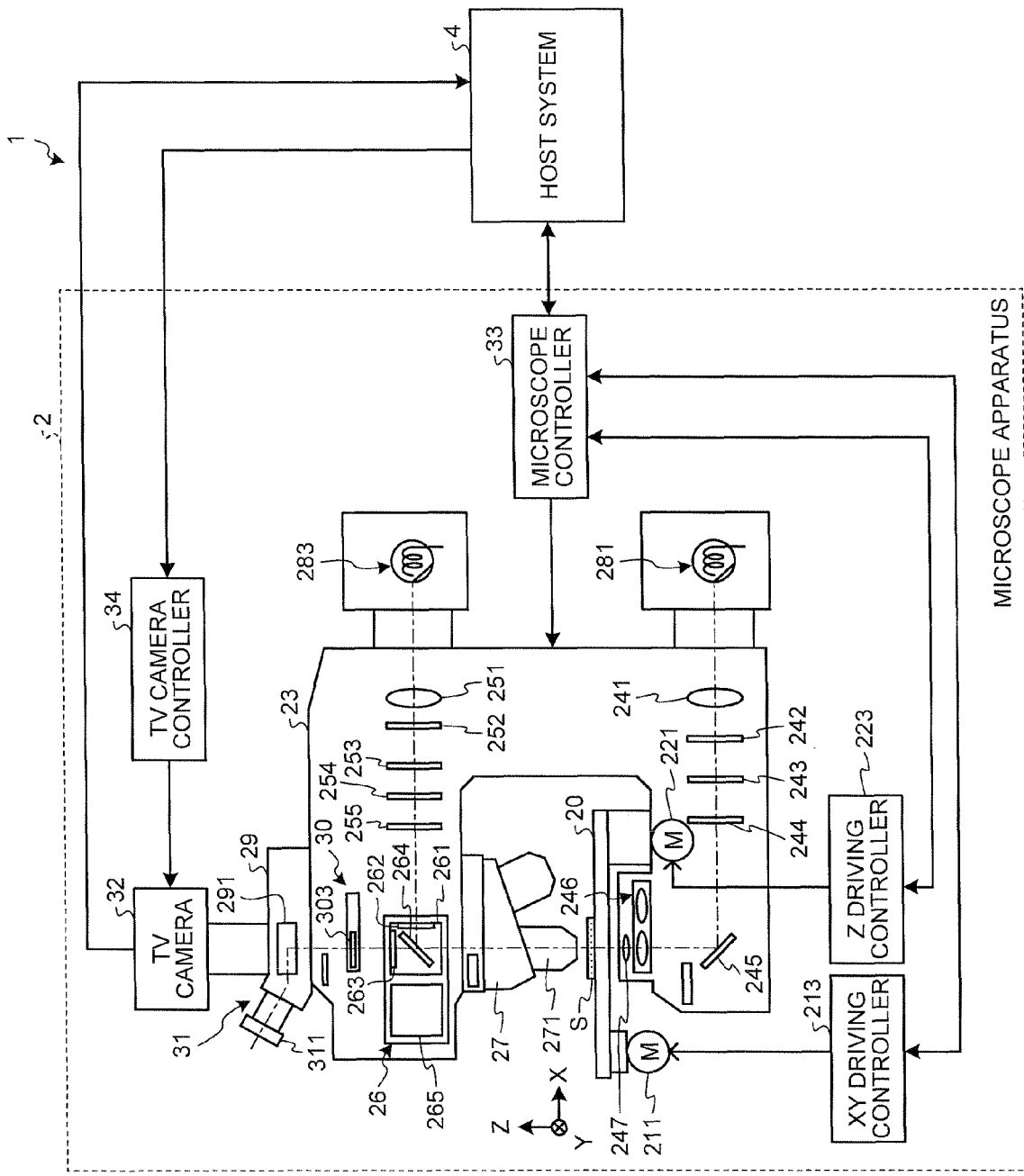
FIG. 2 is a schematic diagram illustrating an example of the entire configuration of a microscope system according to the first embodiment.

Hereinafter, the preferred embodiments of the invention will be described in detail with reference to the accompanying drawings. However, the invention is not intended to be limited by the embodiments. In the drawings, the same components are denoted by the same reference numerals.

When the specimen is observed using a microscope, a one-time observable range (viewing range) is mainly determined by a magnification of an objective lens. In this case, if the magnification of the objective lens is high, a high-resolution image can be obtained, but the viewing range is narrowed. In order to resolve this problem, a microscope system that is called a virtual microscope system has been known. In the virtual microscope system, each portion of the specimen image is captured using an objective lens having a high magnification, while changing the viewing range by moving an electromotive stage to load the specimen. In addition, a specimen image having high resolution and a wide field is generated by synthesizing the individual captured partial specimen images (for example, see Japanese Laid-open Patent Publication No. 9-281405 and Japanese Laid-open Patent Publication No. 2006-343573). Hereinafter, the image having high resolution and a wide field (specimen image) that is generated in the virtual microscope system is called a "VS image".

According to the virtual microscope system, a specimen can be observed even in an environment in which the specimen actually does not exist. When the generated VS image is published through a network, and thus the specimen can be observed regardless of a time and a place. For this reason, the virtual microscope system is made use of in the field of education of the pathological diagnosis or a consultation between pathologists in a remote place. In the explanation below, for example, the present invention will be explained in a case where the present invention is applied to this virtual microscope system.

First Embodiment

In a first embodiment, a cell variant defined by a combination of presence/absence of predetermined target molecules expressed on a predetermined cell component is set in advance, and a cell appearing in a VS image is classified in accordance with the cell variant thus set. In this case, the cell component is a term which collectively refers to cell constituent elements constituting a cell such as a cell nucleus, a cell membrane, and a cytoplam.

FIG. 1 is a diagram illustrating a cell variant illustrated in the first embodiment as an example. As explained with reference to Watanabe reference, in breast cancer treatment, attention is paid to estrogen receptor (ER), progesterone receptor (PgR), and HER2 receptor (HER2), i.e., hormone receptor and the expression pattern of these target molecules are classified into four cell variants, whereby a treatment method is selected. In the explanation about the first embodiment, for example, a cell appearing in a VS image is classified into these four cell variants.

More specifically, as illustrated in FIG. 1, a cell in which the hormone receptor (ER and/or PgR) is expressed as positive (+) on a cell nucleus, and HER 2 is expressed as positive (+) on a cell membrane is classified as a cell variant called "Luminal B". As disclosed in Watanabe reference, about 10% of breast cancer cases correspond to this "Luminal B", and endocrine treatment and anti-HER2 therapy are preferentially used, and the effects of chemotherapy treatment can be expected.

A cell in which the hormone receptor (ER and/or PgR) is expressed as positive (+) on a cell nucleus, and HER 2 is not expressed or is expressed with a low degree as negative (−) on a cell membrane is classified as a cell variant called "Luminal A". As disclosed in Watanabe reference, about 70% of breast cancer cases correspond to this "Luminal A", and the effects of endocrine treatment can be expected. On the other hand, the effects of chemotherapy treatment cannot be expected much.

A cell in which the hormone receptor (ER and/or PgR) is not expressed or is expressed with a low degree as negative (−) on a cell nucleus, and HER 2 is expressed as positive (+) on a cell membrane is classified as a cell variant called "HER2 disease". As disclosed in Watanabe reference, about 10% of breast cancer cases correspond to this "HER2 disease", and anti-HER2 therapy is preferentially used, and the effects of chemotherapy treatment can be expected.

A cell in which the hormone receptor (ER and/or PgR) is not expressed or is expressed with a low degree as negative (−) on a cell nucleus, and HER 2 is not expressed or is expressed with a low degree as negative (−) on a cell membrane is classified as a cell variant called "Basal like". As disclosed in Watanabe reference, about 10% of breast cancer cases correspond to this "Basal like". As described above, in this type called triple-negative breast cancer, only the chemotherapy treatment is expected to be effective as drug treatment.

Subsequently, a specimen observed and diagnosed in the first embodiment (hereinafter referred to as "target specimen") will be explained. The target specimen is a multi-stained specimen that is multi-stained by a plurality of pigments. More specifically, the target specimen is subjected to morphological observation staining for a morphological observation and molecule target staining for confirming an expression of molecule information, and includes a specimen for tissue diagnosis and a specimen for cytological diagnosis. In cytological diagnosis, for example, a specimen (cell block) may be made by cell block method in order to observe the structure in a cell such as conformation of a cell clump, and the specimen for cytological diagnosis includes this cell block.

The morphological observation staining stains and visualizes a cell nucleus, a cytoplasm or a connective tissue. According to the morphological observation staining, sizes or positional relationships of elements constituting a tissue can be grasped, and a state of the specimen can be morphologically determined. In this case, examples of the morphological observation staining may include the HE staining, the Pap staining, and triple staining that performs special staining, such as hematoxylin staining (E staining), Giemsa staining, and Elastica-van Gieson staining; the HE staining; and Victoria Blue staining to specifically stain an elastic fiber. The Pap staining or the Giemsa staining is a staining method that is used for a specimen for cytological diagnosis.

Meanwhile, in the molecule target staining, an IHC method or an ICC method causes a specific antibody with respect to a material (mainly, protein material) needed to examine the location to act on a tissue so as to be coupled with the material, thereby visualizing a state thereof. For example, an enzyme antibody technique that visualizes location of the antibody coupled with an antigen by color formation through an enzymatic reaction is known. As an enzyme, for example, peroxidase or alkaline phosphatase is generally used.

That is, in the explanation below, a pigment that stains the specimen includes a color component that is visualized by staining and a color component that is visualized by the color formation through the enzymatic reaction, for example. Hereinafter, the pigment that is visualized by the morphological observation staining is called a "morphological observation pigment", the pigment that is visualized by the molecule target staining is called a "molecule target pigment", and the pigment that actually stains the target specimen is called a "staining pigment".

In the first embodiment, as described above, at least one of the molecule target staining or the morphological observation staining, i.e., staining pigment staining the target specimen corresponds to cell component identification staining for identifying a cell component. The cell component identification staining is configured to specifically stain a cell nucleus, a cell membrane, or a cytoplam, which are cell components. Hereinafter, a staining pigment that is visualized by cell component identification staining for identifying a cell nucleus will be referred to as "cell nucleus identification pigment" as necessary. A staining pigment that is visualized by cell component identification staining for identifying a cell membrane will be referred to as "cell membrane identification pigment" as necessary. A pigment staining pigment that is visualized by cell component identification staining for identifying a cytoplam will be referred to as cytoplam identification pigment" as necessary. The cell nucleus identification pigment, the cell membrane identification pigment, and the cytoplam identification pigment will be collectively referred to as "cell component identification pigment". The cell component identification pigment corresponds to an element identification pigment.

More specifically, the target specimen used as an example observed and diagnosed in the first embodiment is a tissue specimen subjected to HE staining using two pigments of hematoxylin (hereinafter, referred to as "H pigment") and eosin (hereinafter, referred to as "E pigment") carried out as the morphological observation staining. In addition, the tissue specimen is labeled by color formation though a DAB reaction (hereinafter, referred to as "DAB pigment") using an anti-ER antibody for recognizing estrogen receptor (ER) and an anti-PgR antibody for recognizing progesterone receptor (PgR) as molecule target staining. Also, the tissue specimen is labeled by color formation with "Vector VIP substrate" made by Vector Laboratories, Inc. (hereinafter, referred to as "VV pigment") using an anti-HER2 antibody for recognizing HER2 receptor (HER2). Also, the tissue specimen is labeled by color formation with "Vector NovaRed substrate" made by Vector Laboratories, Inc. (hereinafter, referred to as "VR pigment") using an ESA antibody for recognizing Epithelial Specific Antigen (ESA), i.e., a kind of a glycoprotein expressed on a cell membrane of an epithelial cell. In other words, the staining pigments for the target specimen observed and diagnosed in the first embodiment include five types, i.e, H pigment, E pigment, DAB pigment, VV pigment, and VR pigment. The cell nucleus is stained in blue-violet by the H pigment, the cytoplam and the connective tissue are stained in light red by the E pigment, the ER and the PgR are labeled in dark brown by the DAB pigment, the HER2 is labeled in purple by the VV pigment, and the cell membrane of the epithelial cell is labeled in brick red by the VR pigment. In the explanation about the first embodiment, for example, respectively using the H pigment as a cell nucleus identification pigment and the VR pigment as a cell membrane identification pigment among these five staining pigments, cells in the target specimen appearing in the VS image are classified into cell variants defined in advance, in accordance with expression pattern of ER, PgR, and HER2, i.e., a combination of presence/absence of expression of ER and/or PgR on the cell nucleus and presence/absence of expression of HER2 on the cell membrane.

It should be noted that the present invention is not limited to observation of a specimen stained by an enzyme antibody technique. For example, the present invention can also be applied to a specimen labeled by CISH method, for example. Alternatively, the invention may also be applied to a specimen that is labeled simultaneously (multi-stained) by the IHC method and the CISH method.

Figure 3:
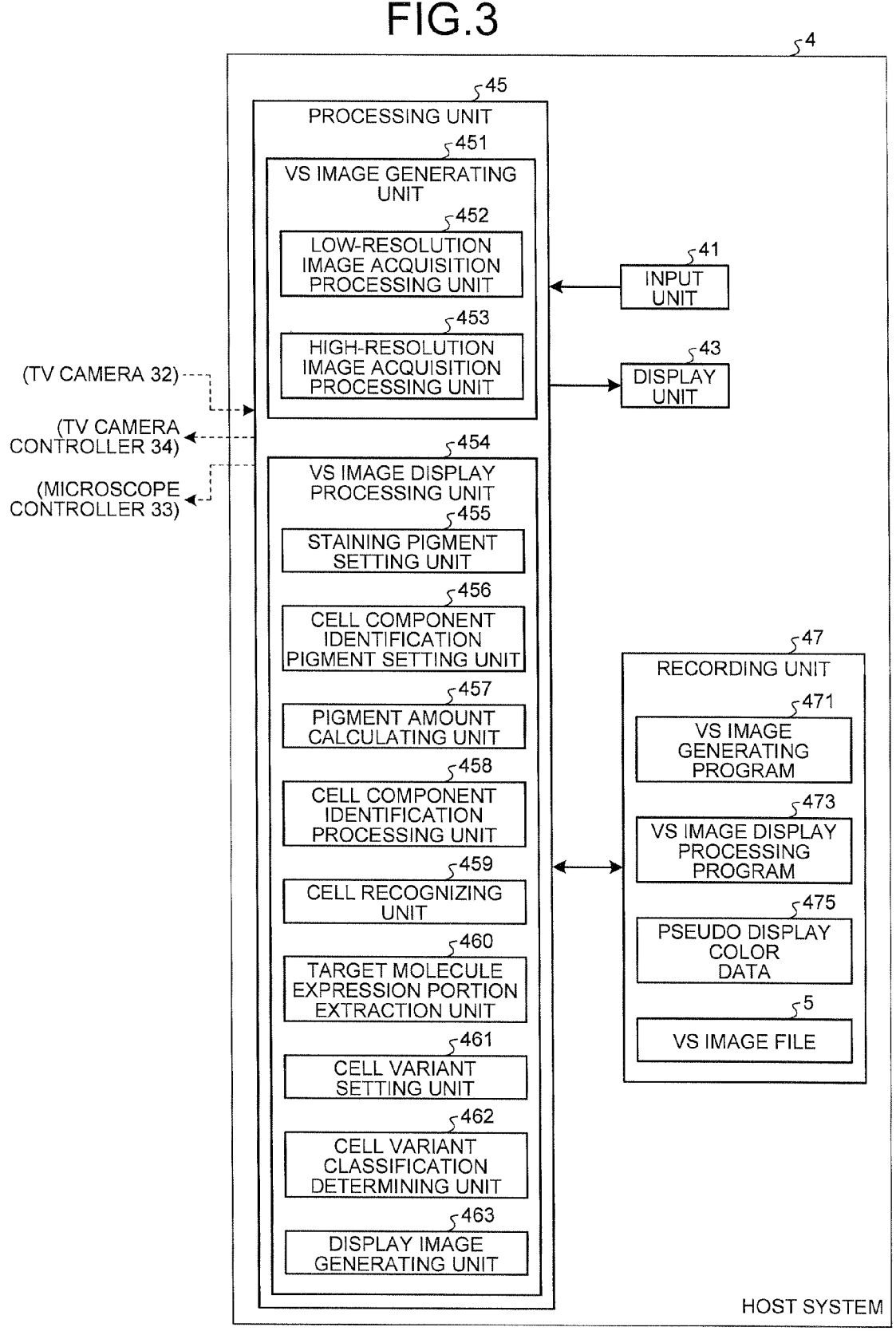
FIG. 3 is a block diagram illustrating a main functional configuration of a host system according to the first embodiment.

Subsequently, the configuration of a microscope system 1 according to the first embodiment will be explained. FIG. 2 is a schematic diagram illustrating an example of the entire configuration of the microscope system 1. FIG. 3 is a block diagram illustrating a main functional configuration of a host system 4 constituting the microscope system 1. As illustrated in FIG. 2, the microscope system 1 is configured by connecting a microscope apparatus 2 and a host system 4 to exchange data with each other. Hereinafter, an optical axis direction of an objective lens 271 illustrated in FIG. 2 is defined as a Z direction, and a plane perpendicular to the Z direction is defined as an XY plane.

The microscope apparatus 2 includes an electromotive stage 20 where a target specimen S is loaded, a microscope body 23, a transmitting illumination light source 281 that is disposed at the back (the right side of FIG. 2) of a bottom portion of the microscope body 23, a incident-light illumination light source 283 that is disposed at the back (the right side of FIG. 2) of an upper portion of the microscope body 23, and a lens barrel 29 that is loaded on the upper portion of the microscope body 23. The microscope body 23 has an approximately U shape in side view, and supports the electromotive stage 20 and holds the objective lens 271 through a revolver 27. In the lens barrel 29, a binocular unit 31 that is used to visually observe a specimen image of the target specimen S and a TV camera 32 that is used to capture the specimen image of the target specimen S are mounted.

The microscope apparatus 2 is used for not only bright field observation but also fluorescent observation, and a cube switch unit 26 is provided. The cube switch unit 26 arranges an observation cube (fluorescent cube) 261 for fluorescent observation in such a manner that the observation cube 261 can be detachably inserted into an optical path of observation light (more specifically, at a position where the optical path for observation light crosses illumination light emitted by the incident-light illumination light source 283 (hereinafter referred to as "incident-light illumination light")). The cube switch unit 26 has two attachment units for attaching observation cubes. A fluorescent cube 261 is attached to one of the attachment units, and the other of the attachment units is configured as an empty hole 265 in which no observation cube is attached. The cube switch unit 26 arranges the empty hole 265 on the optical path (the above crossing position) of the observation light during bright field observation. On the other hand, the cube switch unit 26 arranges the fluorescent cube 261 on the optical path (the above crossing position) of the observation light during fluorescent observation. In this case, the fluorescent cube 261 is made into a unit including an excitation filter 262 transmitting light having a specific excitation wavelengths (excitation light), an absorption filter 263 transmitting fluorescence emitted by the target specimen S excited by the excitation light, and a dichroic mirror 264 reflecting the excitation light and transmitting the fluorescence.

The electromotive stage 20 is configured to freely move in X, Y, and Z directions. That is, the electromotive stage 20 freely moves in an XY plane by a motor 211 and an XY driving controller 213 to control driving of the motor 211. The XY driving controller 213 detects a predetermined origin position in the XY plane of the electromotive stage 20 with an origin sensor of an XY position (not illustrated), under the control of a microscope controller 33. The XY driving controller 213 controls the driving amount of the motor 211 on the basis of the origin position and moves an observation place on the target specimen S. The XY driving controller 213 outputs an X position and a Y position of the electromotive stage 20 at the time of the observation to the microscope controller 33. The electromotive stage 20 freely moves in a Z direction with a motor 221 and a Z driving controller 223 to control driving of the motor 221. The Z driving controller 223 uses an origin sensor of a Z position (not illustrated) to detect a predetermined origin position in a Z direction of the electromotive stage 20, under the control of the microscope controller 33. The Z driving controller 223 controls the driving amount of the motor 221 on the basis of the origin position, and focuses and moves the target specimen S to the arbitrary Z position in a predetermined height range. The Z driving controller 223 outputs a Z position of the electromotive stage 20 at the time of the observation to the microscope controller 33 as necessary.

The revolver 27 is held to freely rotate with respect to the microscope body 23, and disposes the objective lens 271 on the upper portion of the target specimen S. The objective lens 271 and another objective lens having a different magnification (observation magnification) are mounted to be freely exchanged, with respect to the revolver 27. The objective lens 271 that is inserted into an optical path of observation light according to the rotation of the revolver 27 and is used to observe the target specimen S, is configured to be alternatively switched. In the first embodiment, the revolver 27 holds at least one objective lens (hereinafter, referred to as "low-magnification objective lens" as necessary) that has a relatively low magnification of, for example, 2× and 4× and at least one objective lens (hereinafter, referred to as "high-magnification objective lens" as necessary) that has a magnification higher than the magnification of the low-magnification objective lens, for example, a magnification of 10×, 20×, and 40×, as the objective lens 271. However, the above-described high and low magnifications are only exemplary, and at least one magnification may be higher than the other magnification.

The microscope body 23 incorporates an illumination optical system (transmitting illumination optical system) for transparently illuminating the target specimen S in a bottom portion, and also incorporates another illumination optical system (incident-light illumination optical system) for illuminating the target specimen S with incident-light in an upper portion.

The transmitting illumination optical system for transparently illuminating the target specimen S is configured by appropriately disposing a collector lens 241, a transmitting filter unit 242, a transmitting field stop 243, a transmitting aperture stop 244, a fold mirror 245, a capacitor optical element unit 246, a top lens unit 247, and the like along an optical path of transmitting illumination light. The collector lens 241 condenses illumination light (hereinafter referred to as "transmitting illumination light") that is emitted from the transmitting illumination light source 281. The fold mirror 245 deflects the optical path of the transmitting illumination light along an optical axis of the objective lens 271. The illumination light that is emitted from the transmitting illumination light source 281 is irradiated onto the target specimen S by the transmitting illumination optical system and enters into the objective lens 271 as objection light.

On the other hand, the incident-light illumination optical system for illuminating the target specimen S with incident-light is configured by appropriately disposing a collector lens 251, an incident-light filter unit 252, an incident-light shutter 253, an incident-light field stop 254, an incident-light aperture stop 255, and the like along an optical path of incident-light illumination light. In this case, the incident-light shutter 253 constituting the incident-light illumination optical system is inserted into the optical path of the incident-light illumination light to shut off the incident-light illumination light when the transmitting illumination optical system illuminates the target specimen S. On the other hand, the incident-light shutter 253 is displaced from the optical path of the incident-light illumination light when the incident-light illumination optical system illuminates the target specimen S.

The microscope body 23 incorporates a filter unit 30 in an upper portion thereof. The filter unit 30 holds an optical filter 303, which restricts a wavelength band of light forming an image as a specimen image to a predetermined range, to freely rotate, and inserts the optical filter 303 into the optical path of the observation light in a rear stage of the objective lens 271 as necessary. The observation light that passes through the objective lens 271 enters into the lens barrel 29 after passing through the filter unit 30.

The lens barrel 29 incorporates a beam splitter 291 that switches the optical path of the observation light passed through the filter unit 30 and guides the observation light to the binocular unit 31 or the TV camera 32. The specimen image of the target specimen S is introduced into the binocular unit 31 by the beam splitter 291 and is visually observed by a user using a microscope through an eyepiece lens 311. Alternatively, the specimen image of the target specimen S is captured by the TV camera 32. The TV camera 32 is configured to include an imaging element, such as a CCD or a CMOS, which forms a specimen image (more specifically, viewing range of the objective lens 271), and captures the specimen image and outputs image data of the specimen image to the host system 4.

In the first embodiment, the microscope apparatus 2 having the above configuration performs bright field observation of the target specimen S by causing the cube switch unit 26 to arrange the empty hole 265 on the optical path of the observation light and irradiating the transmitting illumination light emitted by the transmitting illumination light source 281 to the target specimen S using the transmitting illumination optical system.

Figure 4:
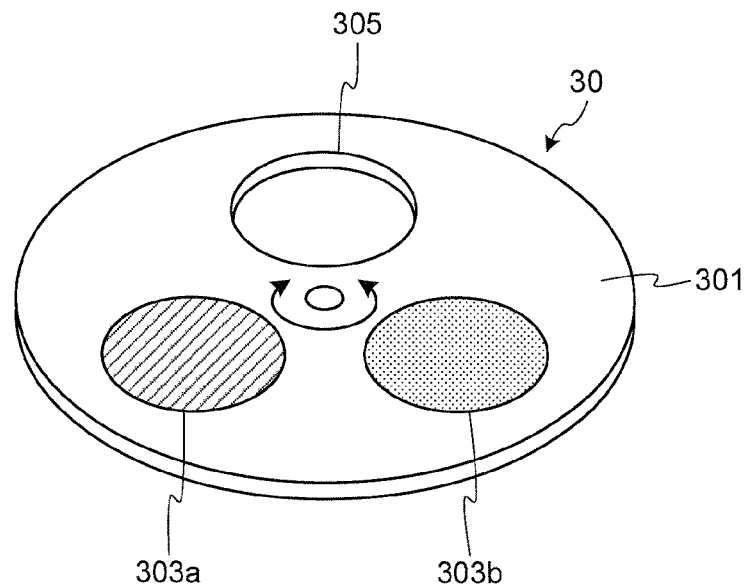
FIG. 4 is a schematic diagram illustrating the configuration of a filter unit.

In this case, the filter unit 30 will be described in detail. The filter unit 30 is used when the specimen image is captured with multi-bands by the TV camera 32. FIG. 4 is a schematic diagram illustrating the configuration of the filter unit 30. The filter unit 30 illustrated in FIG. 4 has a rotation-type optical filter switching unit 301 where three mounting holes needed to mount optical elements are formed. In the filter unit 30, two optical filters 303 (303a and 303b), each of which has a different spectral transmittance characteristic, are mounted in the two mounting holes of the three mounting holes, respectively, and the remaining one mounting hole is configured as an empty hole 305.

Figure 5:
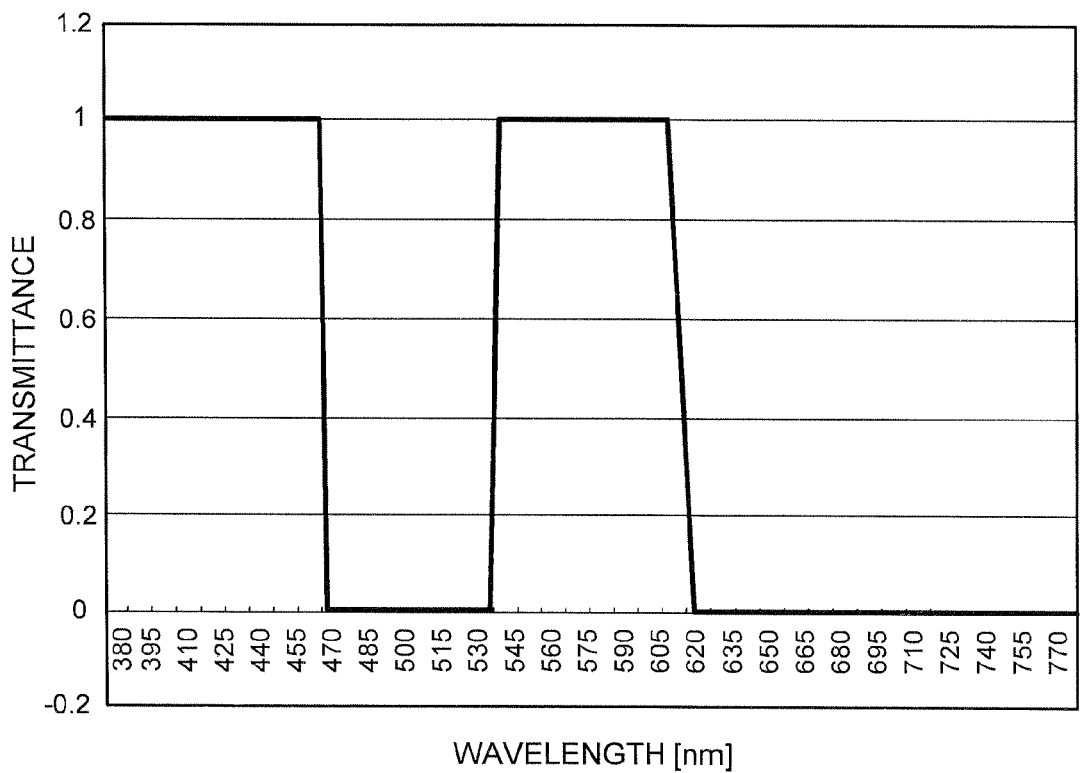
FIG. 5 is a diagram illustrating a spectral transmittance characteristic of one optical filter.
Figure 6:
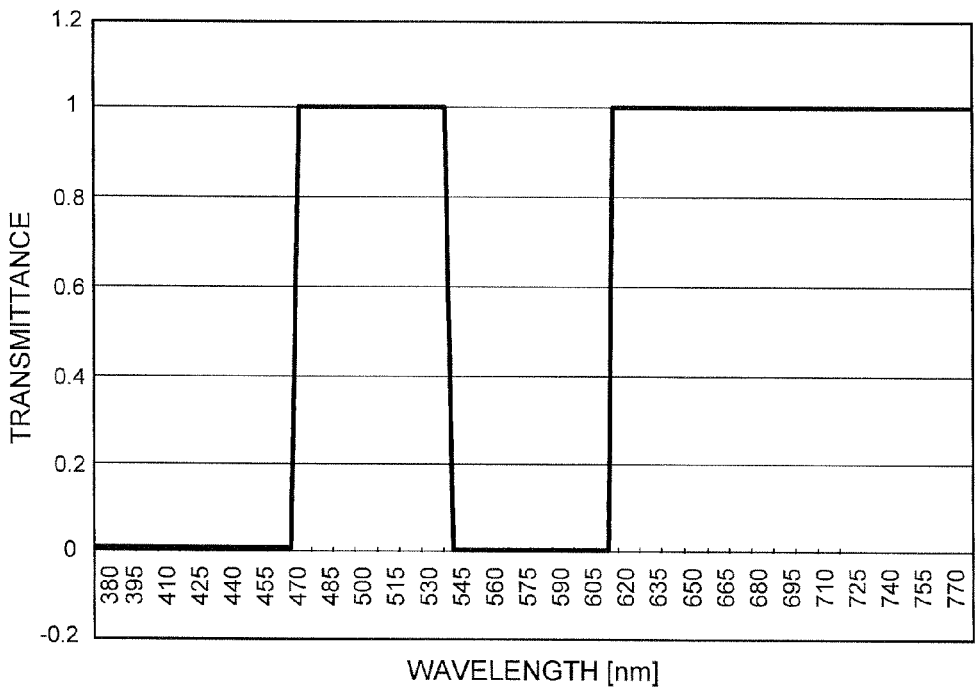
FIG. 6 is a diagram illustrating a spectral transmittance characteristic of the other optical filter.

FIG. 5 is a diagram illustrating a spectral transmittance characteristic of one of the optical filters, i.e., the optical filter 303a. FIG. 6 is a diagram illustrating a spectral transmittance characteristic of the other of the optical filters, i.e., the optical filter 303b. As illustrated in FIGS. 5 and 6, each of the optical filters 303a and 303b has a spectral characteristic of dividing each band for R, G, and B of the TV camera 32 into two parts. When the target specimen S is captured with multi-bands, first, the optical filter switching unit 301 rotates to insert the optical filter 303a into the optical path of the observation light, and the first capturing of the specimen image is performed by the TV camera 32. Next, the optical filter switching unit 301 rotates to insert the optical filter 303b into the optical path of the observation light, and the second capturing of the specimen image is performed by the TV camera 32. By each of the first capturing and the second capturing, images of three bands are obtained, and a multi-band image of six bands (optical spectrum image) is obtained by synthesizing the images of the three bands.

Figure 7:
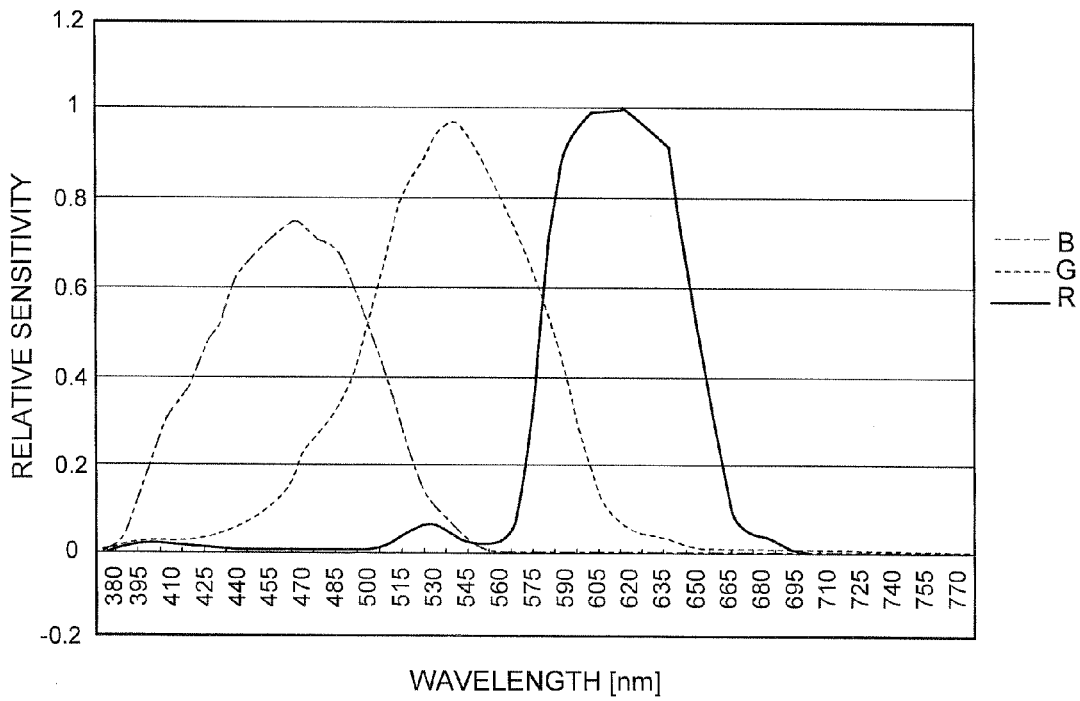
FIG. 7 is a diagram illustrating an example of spectral sensitivity of each band for R, G, and B.

As such, when the specimen image is captured with the multi-bands using the filter unit 30, the transmitting illumination light that is emitted from the transmitting illumination light source 281 and is irradiated onto the target specimen S by the transmitting illumination optical system enters into the objective lens 271 as the observation light. Then, the illumination light passes through the optical filter 303a or the optical filter 303b and forms an image on the imaging element of the TV camera 32. FIG. 7 is a diagram illustrating an example of spectral sensitivity of each band for R, G, and B when the specimen image is captured by the TV camera 32.

When common capturing is performed (RGB images of the specimen image are captured), the empty hole 305 may be disposed on the optical path of the observation light by rotating the optical filter switching unit 301 of FIG. 4. Here, the case where the optical filters 303a and 303b are disposed in the rear stage of the objective lens 271 is exemplified, but the invention is not limited thereto. The optical filters 303a and 303b may be disposed at any positions on the optical path that ranges from the transmitting illumination light source 281 to the TV camera 32. The number of optical filters is not limited to two, a filter unit may be configured using three or more optical filters, and the number of bands of the multi-band image is not limited to 6. For example, using the technology that is disclosed in Japanese Laid-open Patent Publication No. 2008-51654, multi-band images may be captured according to a frame sequential method while switching 16 band-pass filters, such that a multi-band image of 16 bands is captured. The configuration where the multi-band image is captured is not limited to the optical filter switching method. For example, plural TV cameras are arranged. Then, the observation light may be guided to each TV camera through the beam splitter, and an image forming optical system that complementarily complements a spectral characteristic may be configured. According to this configuration, the specimen images are simultaneously captured by the individual TV cameras, and a multi-band image is obtained by synthesizing the specimen images. Therefore, the speed of the processing can be increased.

As illustrated in FIG. 2, the microscope apparatus 2 includes the microscope controller 33 and a TV camera controller 34. The microscope controller 33 centrally controls the operation of each unit constituting the microscope apparatus 2, under the control of the host system 4. For example, the microscope controller 33 rotates the revolver 27 to switch the objective lens 271 disposed on the optical path of the observation light, controls modulated light of the transmitting illumination light source 281 or the incident-light illumination light source 283 according to the magnification of the switched objective lens 271, switches various optical elements, and gives instructions to the XY driving controller 213 or the Z driving controller 223 so as to move the electromotive stage 20. In this way, the microscope controller 33 controls each unit of the microscope apparatus 2 at the time of observing the target specimen S, and notifies the host system 4 of the state of each unit. The TV camera controller 34 performs, e.g., ON/OFF switching of automatic gain control, gain setting, ON/OFF switching of automatic exposure control, and exposure time setting, under the control of the host system 4, drives the TV camera 32, and controls the capturing operation of the TV camera 32.

Meanwhile, the host system 4 includes an input unit 41, a display unit 43, a processing unit 45, and a recording unit 47.

The input unit 41 is realized by a keyboard or a mouse, a touch panel, and various switches, and outputs an operation signal according to an operation input to the processing unit 45. The display unit 43 is realized by a display device, such as a LCD or an EL display, and displays various screens on the basis of display signals received from the processing unit 45.

The processing unit 45 is realized by hardware, such as a CPU. The processing unit 45 outputs an instruction to each unit constituting the host system 4 or transfers data to each unit, on the basis of an input signal received from the input unit 41, a state of each unit of the microscope apparatus 2 received from the microscope controller 33, image data received from the TV camera 32, and a program or data recorded in the recording unit 47, or outputs an operation instruction of each unit of the microscope apparatus 2 to the microscope controller 33 or the TV camera controller 34, and centrally controls the entire operation of the microscope system 1. For example, the processing unit 45 evaluates a contrast of an image at each Z position on the basis of the image data received from the TV camera 32, while moving the electromotive stage 20 in a Z direction, and executes an AF (automatic focus) process of detecting a focused focus position (focused position). The processing unit 45 executes a compressing process based on a compressing scheme such as JPEG or JPEG2000 or a decompressing process, when the image data received from the TV camera 32 is recorded in the recording unit 47 or is displayed on the display unit 43. The processing unit 45 includes a VS image generating unit 451 and a VS image display processing unit 454.

The VS image generating unit 451 obtains a low-resolution image and a high-resolution image of the specimen image, and generates a VS image. In this case, the VS image is an image that is generated by synthesizing one or more images captured by the microscope apparatus 2. Hereinafter, however, the VS image means an image that is generated by synthesizing a plurality of high-resolution images obtained by capturing individual parts of the target specimen S using a high-magnification objective lens, and a multi-band image having high resolution and a wide field where the entire area of the target specimen S is illustrated is called the VS image.

The VS image generating unit 451 includes a low-resolution image acquisition processing unit 452 and a high-resolution image acquisition processing unit 453 (which may be referred to as an image acquiring unit or a specimen image generating unit). The low-resolution image acquisition processing unit 452 instructs the operation of each unit of the microscope apparatus 2 and acquires a low-resolution image of the specimen image. The high-resolution image acquisition processing unit 453 instructs the operation of each unit of the microscope apparatus 2 and acquires a high-resolution image of the specimen image. In this case, the low-resolution image is acquired as an RGB image using a low-magnification objective lens, when the target specimen S is observed. Meanwhile, the high-resolution image is acquired as a multi-band image using a high-magnification objective lens, when the target specimen S is observed.

The VS image display processing unit 454 calculates the pigment amount of each staining pigment staining each specimen position on the target specimen S, on the basis of the VS image, and generates and displays an RGB image for display of the VS image (display image) on the display unit 43. The VS image display processing unit 454 includes a staining pigment setting unit 455, and a cell component identification pigment setting unit 456, a pigment amount calculating unit 457 (which may be referred to as a pigment amount acquiring unit), a cell component identification processing unit 458 (which may be referred to as an element area identification unit), a cell recognizing unit 459, a target molecule expression portion extraction unit 460, a cell variant setting unit 461 (which may be referred to as an expression pattern setting unit), a cell variant classification determining unit 462 (which may be referred to as an expression pattern classification unit), and a display image generating unit 463.

The staining pigment setting unit 455 receives registration operation of staining pigments from the user through the input unit 41, and sets the staining pigments according to the operation input. The cell component identification pigment setting unit 456 receives selection operation of a cell component identification pigment from the user through the input unit 41, and sets the cell component identification pigment according to the operation input.

The pigment amount calculating unit 457 estimates a spectral transmittance at each specimen position on the target specimen S corresponding to each pixel constituting the VS image, and calculates the pigment amount of each staining pigment at each specimen position on the basis of the estimated spectral transmittance (estimation spectrum). The cell component identification processing unit 458 identifies a cell component for which the cell component identification pigment is set by the cell component identification pigment setting unit 456.

The cell recognizing unit 459 recognizes an area of a cell in the VS image (cell area) on the basis of the area of the cell component identified by the cell component identification processing unit 458. The target molecule expression portion extraction unit 460 receives setting operation of an extraction condition that is performed by a user through the input unit 41, sets the extraction condition of a target portion according to the operation input, and extracts an area of the target molecule expression portion in the VS image that satisfies the extraction condition thus set.

The cell variant setting unit 461 receives setting operation of a cell variant that is performed by a user through the input unit 41, and sets, as a cell variant, an expression pattern of a target molecule including a combination of presence/absence of expressions of a plurality of target molecules, in accordance with operation input. The cell variant classification determining unit 462 determines the expression patterns of the target molecules for each cell area in the VS image, and classifies each cell area into a cell variant corresponding to the expression patterns of the target molecules. The expression patterns of the target molecules of each cell area is determined on the basis of a combination of target molecule expression portion included in the cell area.

The display image generating unit 463 generates a display image of the VS image representing the staining pigment and/or cell variant to be displayed, and performs processing for displaying the display image on the display unit 43. Selection operation of a staining pigment and/or cell variant to be displayed is performed by the user with the input unit 41, and the selection operation is received. The display target is selected according to the operation input. When a staining pigment is selected as the display target, the display image generating unit 463 generates a display image representing the state of staining of the selected staining pigment. When a cell variant is selected as the display target, the display image generating unit 463 generates a display image that identifies and displays a cell area classified as the selected cell variant.

The recording unit 47 is realized by various IC memories such as a ROM or a RAM like a flash memory enabling update and storage, a hard disk incorporated or connected by a data communication terminal, and a storage medium such as a CD-ROM and a reading device thereof. In the recording unit 47, a program that causes the host system 4 to operate and realizes various functions included in the host system 4 or data that is used during the execution of the program is recorded.

In the recording unit 47, a VS image generating program 471 that causes the processing unit 45 to function as the VS image generating unit 451 and realizes a VS image generating process is recorded. In the recording unit 47, a VS image display processing program 473 that causes the processing unit 45 to function as the VS image display processing unit 454 and realizes the VS image display process is also recorded. In the recording unit 47, a VS image file 5 is recorded. The VS image file 5 will be described in detail below.

Figure 8:
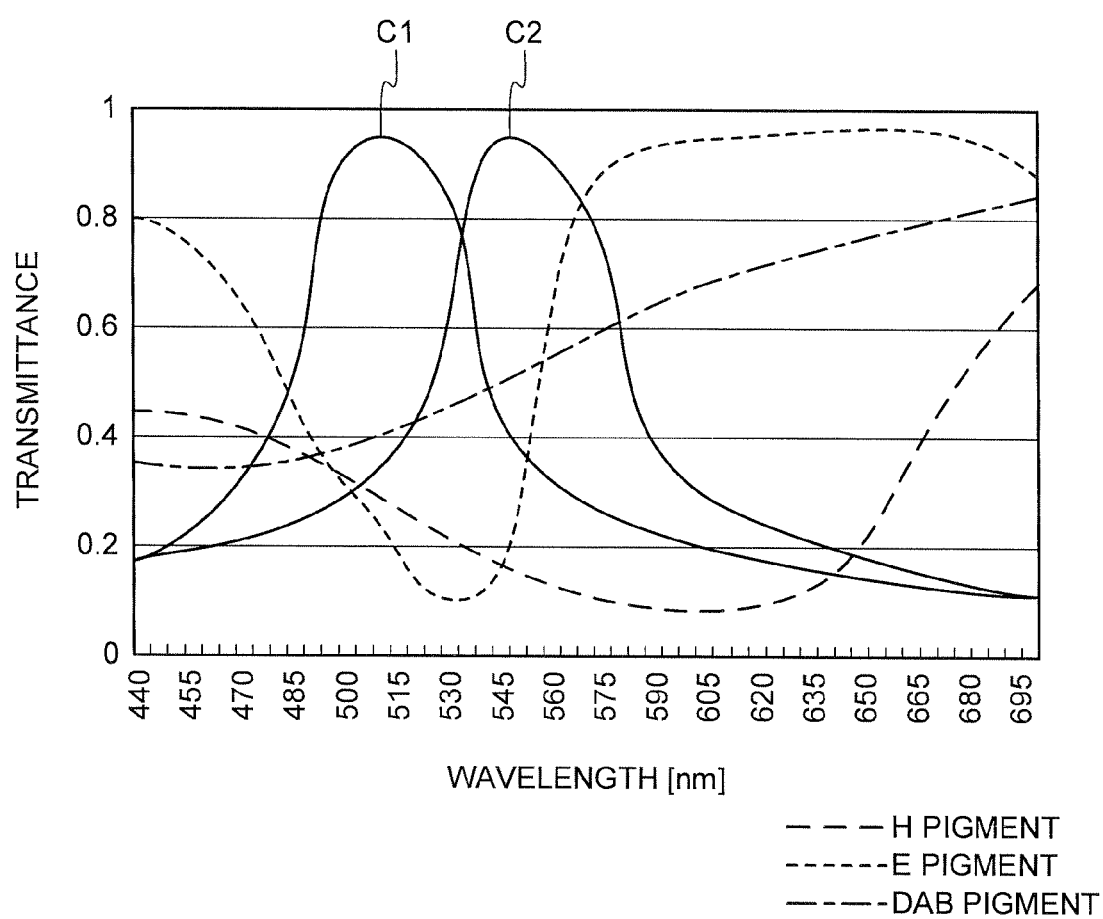
FIG. 8 is a diagram illustrating an example of a spectral transmittance characteristic of a pseudo display color.

In the recording unit 47, pseudo display color data 475 is recorded. FIG. 8 is a diagram illustrating an example of a spectral transmittance characteristic (spectrum) of a pseudo display color. In FIG. 8, spectrums of two kinds of pseudo display colors C1 and C2 and spectrums of the H pigment, the E pigment, and the DAB pigment are illustrated (spectrums of the VV pigment and the VR pigment are not illustrated). In the first embodiment, as in the pseudo display color C1 or C2 illustrated with solid lines in FIG. 8, a spectrum of a pseudo display color that is different from the spectrum of each staining pigment and has saturation higher than that of each staining pigment is prepared. The spectrum of the pseudo display color is recorded as pseudo display color data 475 in the recording unit 47 in advance and used as a spectrum of the staining pigment as necessary in response to user operation.

The host system 4 can be realized by the known hardware configuration including a CPU or a video board, a main storage device such as a main memory, an external storage device such as a hard disk or various storage media, a communication device, an output device such as a display device or a printing device, an input device, and an interface device connecting each component or an external input. For example, as the host system 4, a general-purpose computer, such as a workstation or a personal computer, may be used.

Figure 9:
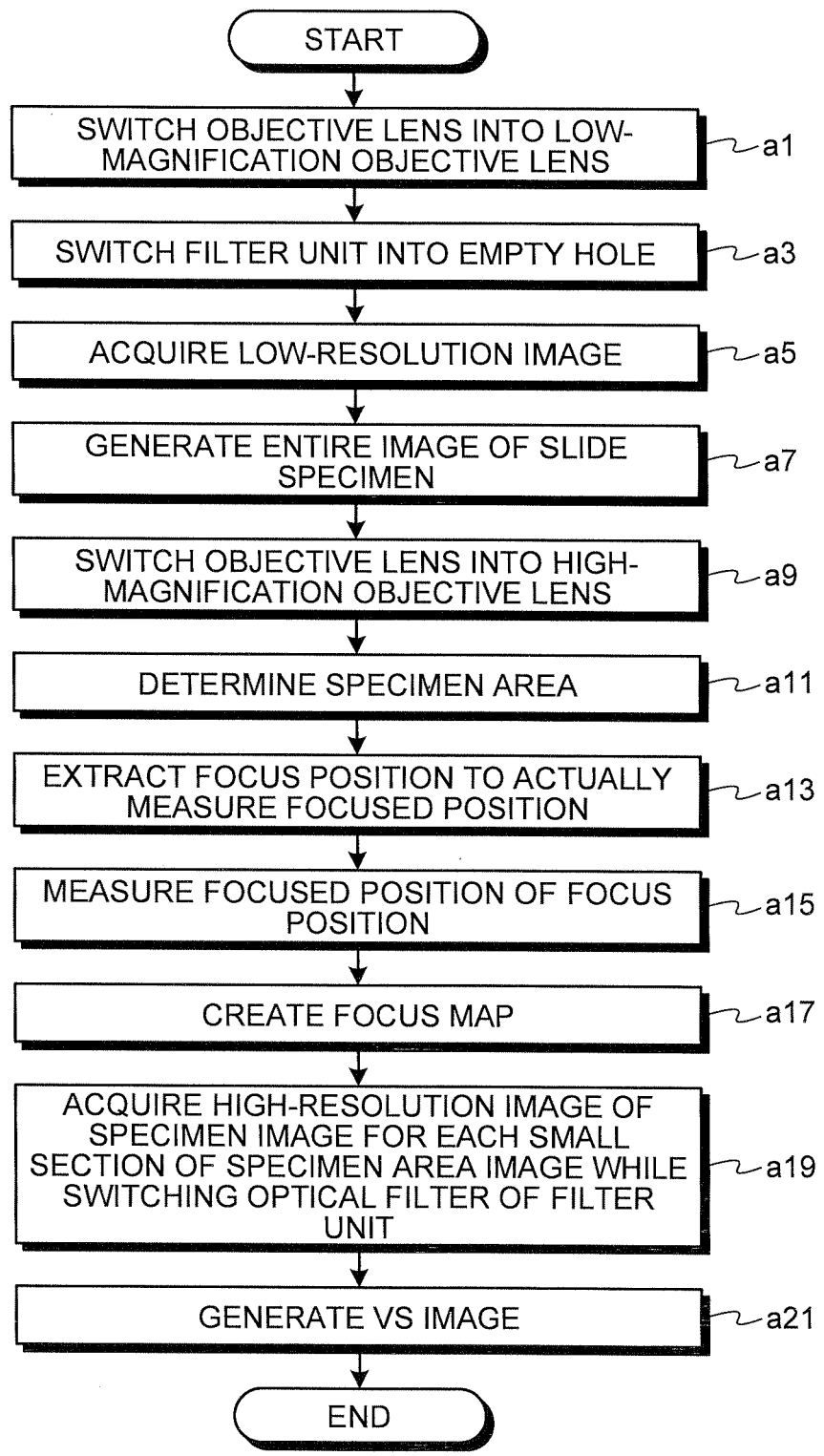
FIG. 9 is a flowchart illustrating the operation of the microscope system.

Subsequently, the VS image generating process and the VS image display process according to the first embodiment will be described in order. First, the VS image generating process will be described. FIG. 9 is a flowchart illustrating the operation of the microscope system 1 that is realized when the processing unit 45 of the host system 4 executes the VS image generating process. The operation of the microscope system 1 described herein is realized when the VS image generating unit 451 reads the VS image generating program 471 recorded in the recording unit 47 and executes the VS image generating program 471.

As illustrated in FIG. 9, first, the low-resolution image acquisition processing unit 452 of the VS image generating unit 451 outputs an instruction, which causes the objective lens 271 used when the target specimen S is observed to be switched into the low-magnification objective lens, to the microscope controller 33 (step a1). In response to the instruction, the microscope controller 33 rotates the revolver 27 as necessary, and disposes the low-magnification objective lens on the optical path of the observation light.

Subsequently, the low-resolution image acquisition processing unit 452 outputs an instruction, which causes the filter unit 30 to be switched into the empty hole 305, to the microscope controller 33 (step a3). In response to the instruction, the microscope controller 33 rotates the optical filter switching unit 301 of the filter unit 30 as necessary, and disposes the empty hole 305 on the optical path of the observation light.

Next, the low-resolution image acquisition processing unit 452 outputs an operation instruction of each unit of the microscope apparatus 2 to the microscope controller 33 or the TV camera controller 34, and acquires a low-resolution image (RGB image) of the specimen image (step a5).

Figure 10:
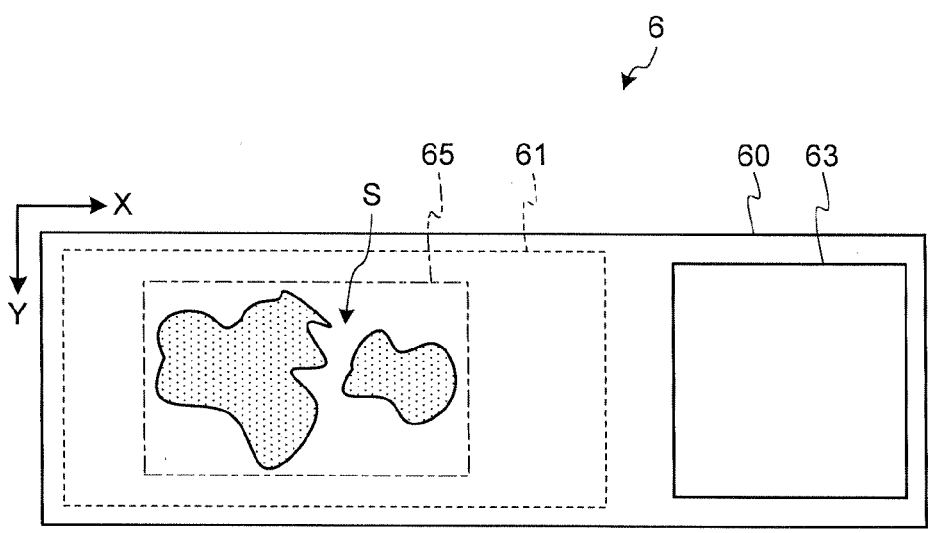
FIG. 10 is a diagram illustrating an example of a slide glass specimen.

FIG. 10 is a figure illustrating an example of a slide glass specimen 6 loaded on the electromotive stage 20. The target specimen S on the electromotive stage 20 illustrated in FIG. 2 is actually loaded on the electromotive stage 20 as the slide glass specimen 6 where the target specimen S is loaded on a slide glass 60, as illustrated in FIG. 10. The target specimen S is controlled to be loaded in a specimen search range 61 corresponding to a predetermined area (for example, area of the vertical length: 25 mm by the horizontal length: 50 mm of the left side of the slide glass 60 in FIG. 10) on the slide glass 60. In the slide glass 60, a label 63 illustrating information about the target specimen S loaded in the specimen search range 61 is attached to a predetermined area (for example, an area at the right side of the specimen search range 61). In the label 63, for example, a barcode where a slide specimen number corresponding to identification information to specify the target specimen S is coded according to the predetermined standard is printed, and is read by a barcode reader (not illustrated) that constitutes the microscope system 1.

In response to the operation instruction given by the low-resolution image acquisition processing unit 452 in step a5 of FIG. 9, the microscope apparatus 2 captures an image of the specimen search range 61 of the slide glass 60 illustrated in FIG. 10. Specifically, the microscope apparatus 2 divides the specimen search range 61 on the basis of a size of a field range determined according to the magnification of the low-magnification objective lens switched in step a1 (i.e., capturing range of the TV camera 32 when the target specimen S is observed using the low-magnification objective lens), and sequentially captures the specimen image of the specimen search range 61 with the TV camera 32 for each section, while moving the electromotive stage 20 in an XY plane according to each divided section size. In this case, the captured image data are output to the host system 4 and are acquired as a low-resolution image of the specimen image in the low-resolution image acquisition processing unit 452.

As illustrated in FIG. 9, the low-resolution image acquisition processing unit 452 synthesizes the low-resolution images for the individual sections acquired in step a5, and generates an image illustrating the specimen search range 61 of FIG. 10 as the entire image of the slide specimen (step a7).

Subsequently, the high-resolution image acquisition processing unit 453 outputs an instruction, which causes the objective lens 271 used when the target specimen S is observed to be switched into the high-magnification objective lens, to the microscope controller 33 (step a9). In response to the instruction, the microscope controller 33 rotates the revolver 27 and disposes the high-magnification objective lens on the optical path of the observation light.

Subsequently, the high-resolution image acquisition processing unit 453 automatically extracts and determines a specimen area 65 in the specimen search range 61 of FIG. 10 where the target specimen S is actually loaded, on the basis of the entire image of the slide specimen generated in step a7 (step a11). The automatic extraction of the specimen area can be performed by appropriately using the known methods. For example, the high-resolution image acquisition processing unit 453 digitizes a value of each pixel of the entire image of the slide specimen, determines presence/absence of specimen for each pixel, and determines a rectangular area, which surrounds a range of pixels determined as the pixels illustrating the target specimen S, as the specimen area. Alternatively, the high-resolution image acquisition processing unit 453 may receive the selection operation of the specimen area from the user through the input unit 41, and determine the specimen area according to the operation input.

Subsequently, the high-resolution image acquisition processing unit 453 cuts out the image of the specimen area (specimen area image) determined in step a11 from the entire image of the slide specimen, selects a position to actually measure a focused position from the specimen area image, and extracts a focus position (step a13).

Figure 11:
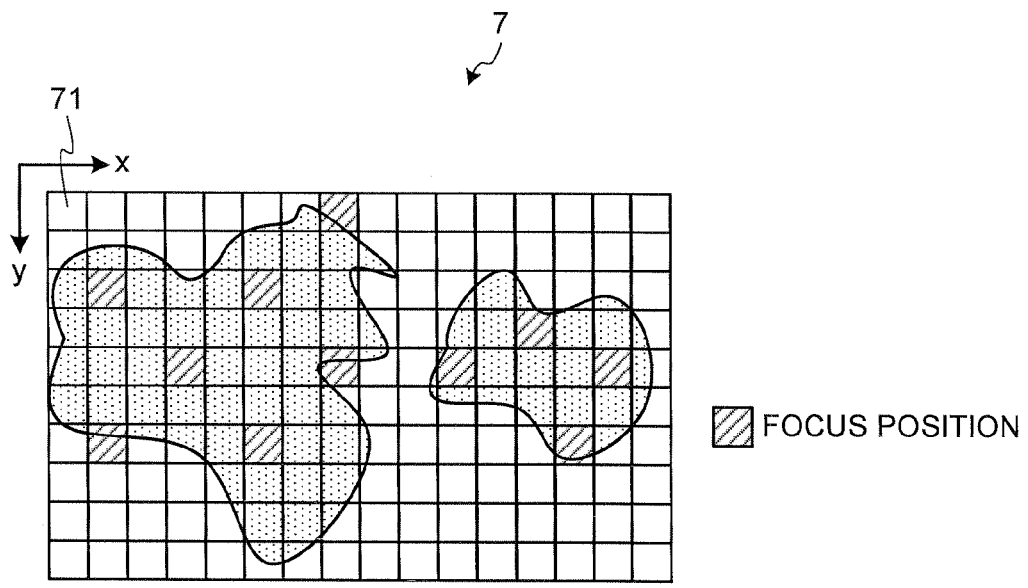
FIG. 11 is a diagram illustrating an example of a specimen area image.

FIG. 11 illustrates an example of a specimen area image 7 that is cut from the entire image of the slide specimen, which specifically illustrates an image of the specimen area 65 of FIG. 10. As illustrated in FIG. 11, first, the high-resolution image acquisition processing unit 453 divides the specimen area image 7 into a lattice shape and forms a plurality of small sections. In this case, a size of each small section corresponds to a size of a field range (that is, capturing range of the TV camera 32 when the target specimen S is observed using the high-magnification objective lens) that is determined according to the magnification of the high-magnification objective lens switched in step a9.

Subsequently, the high-resolution image acquisition processing unit 453 selects the small sections becoming the focus positions from the plurality of formed small sections as illustrated in FIG. 11. This is because a process time may increase if a focused position is actually measured with respect to all of the small sections. For example, the predetermined number of small sections are randomly selected from the small sections. Alternatively, the small sections becoming the focus positions may be selected from the small sections with a predetermined number of intervals. In other words, the small sections may be selected according to a predetermined rule. When the number of small sections is small, all of the small sections may be selected as the focus positions. Then, the high-resolution image acquisition processing unit 453 calculates the central coordinates of the small section selected in a coordinate system (x, y) of the specimen area image 7, converts the calculated central coordinates into the coordinates of a coordinate system (X, Y) of the electromotive stage 20 of the microscope apparatus 2, and obtains the focus positions. It should be noted that this coordinate conversion is performed on the basis of the magnification of the objective lens 271 used when the target specimen S is observed or the number or the sizes of pixels of imaging elements constituting the TV camera 32, and can be realized by applying the known technology disclosed in, for example, Japanese Laid-open Patent Publication No. 9-281405.

Subsequently, as illustrated in FIG. 9, the high-resolution image acquisition processing unit 453 outputs an operation instruction of each unit of the microscope apparatus 2 to the microscope controller 33 or the TV camera controller 34, and measures the focused position of the focus position (step a15). At this time, the high-resolution image acquisition processing unit 453 outputs each extracted focus position to the microscope controller 33. In response to the output, the microscope apparatus 2 moves the electromotive stage 20 in the XY plane and sequentially moves each focus position to the optical axis position of the objective lens 271. Then, the microscope apparatus 2 receives image data of each focus position from the TV camera 32 while moving the electromotive stage 20 in a Z direction at each focus position. The received image data is output to the host system 4 and is acquired in the high-resolution image acquisition processing unit 453. The high-resolution image acquisition processing unit 453 evaluates a contrast of image data at each Z position and measures a focused position (Z position) of the target specimen S at each focus position.

In this way, if the high-resolution image acquisition processing unit 453 measures the focused position at each focus position as described above, the high-resolution image acquisition processing unit 453 creates a focus map on the basis of the measurement result of the focused position of each focus position, and records the focus map in the recording unit 47 (step a17). More specifically, the high-resolution image acquisition processing unit 453 interpolates the focused position of the small section not extracted as the focus position in step a13 using the focused position of the surrounding focus position, sets the focused positions to all of the small sections, and creates the focus map.

Figures 12, 13:
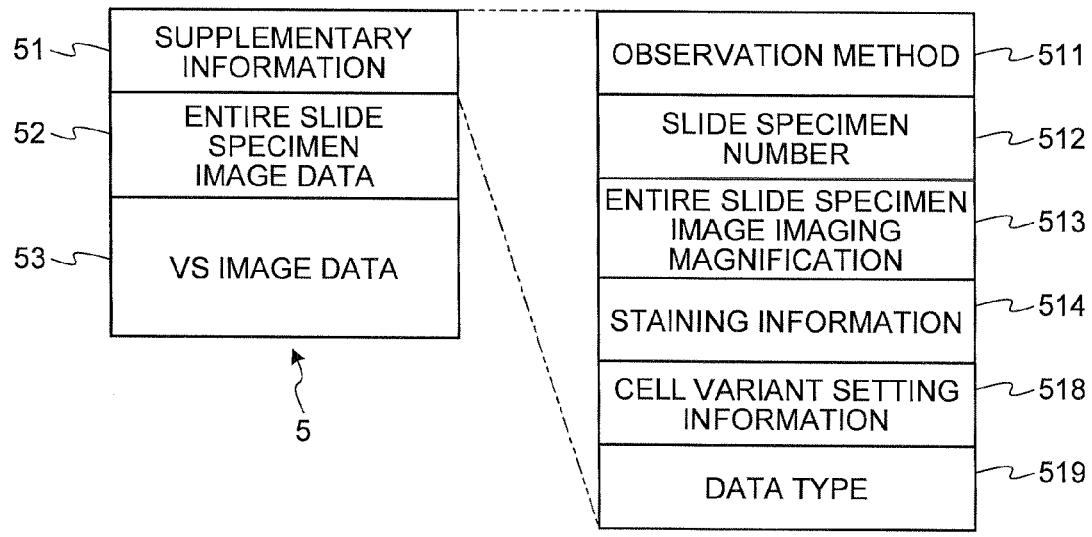
FIG. 12 is a diagram illustrating an example of the data configuration of a focus map.
FIG. 13 is a diagram illustrating an example of the data configuration of a VS image file.

FIG. 12 is a diagram illustrating an example of the data configuration of the focus map. As illustrated in FIG. 12, the focus map is a data table where arrangement numbers and electromotive stage positions are associated with each other. The arrangement numbers indicate the individual small sections of the specimen area image 7 illustrated in FIG. 11, respectively. More specifically, the arrangement numbers indicated by x are serial numbers that are sequentially assigned to individual columns along an x direction starting from a left end, and the arrangement numbers indicated by y are serial numbers that are sequentially assigned to individual rows along a y direction starting from an uppermost stage. The arrangement numbers indicated by z are values that are set when the VS image is generated as a three-dimensional image. The electromotive stage positions are positions of X, Y, and Z of the electromotive stage 20 set as the focused positions with respect to the small sections of the specimen area image indicated by the corresponding arrangement numbers. For example, the arrangement number of (x, y, z)=(1, 1, –) indicates a small section 71 of FIG. 11, and a X position and a Y position when the central coordinates of the small section 71 in the coordinate system (x, y) are converted into the coordinates of the coordinate system (X, Y) of the electromotive stage 20 correspond to $X_{11}$ and $Y_{11}$, respectively. The focused position (Z position) that is set to the small section corresponds to $Z_{11}$.

Subsequently, as illustrated in FIG. 9, the high-resolution image acquisition processing unit 453 sequentially output instructions, which cause the filter unit 30 to be switched into the optical filters 303a and 303b, to the microscope controller 33. Then, the high-resolution image acquisition processing unit 453 outputs an operation instruction of each unit of the microscope apparatus 2 to the microscope controller 33 or the TV camera controller 34 while referring to the focus map, captures the specimen image with multi-bands for each small section of the specimen area image, and acquires a high-resolution image (hereinafter, referred to as "specimen area section image") (step a19).

In response to this, the microscope apparatus 2 rotates the optical filter switching unit 301 of the filter unit 30, and sequentially captures a specimen image for each small section of the specimen area image with the TV camera 32 at each focused position, while moving the electromotive stage 20 in a state where the optical filter 303a is first disposed on the optical path of the observation light. Subsequently, the optical filter 303a is switched into the optical filter 303b, the optical filter 303b is disposed on the optical path of the observation light, and the specimen image for each small section of the specimen area image is captured, similar to the above case. In this case, the captured image data are output to the host system 4 and acquired as a high-resolution image (specimen area section image) of the specimen image in the high-resolution image acquisition processing unit 453.

Subsequently, the high-resolution image acquisition processing unit 453 synthesizes the specimen area section images that correspond to the high-resolution images acquired in step a19, and generates one image in which the entire area of the specimen area 65 of FIG. 10 is illustrated as a VS image (step a21).

In steps a13 to a21, the specimen area image is divided into the small sections that correspond to the field range of the high-magnification objective lens. Then, the specimen images are captured for the individual small sections to acquire the specimen area section images, and the specimen area section images are synthesized with each other to generate the VS image. In contrast, the small sections may be set such that the surrounding specimen area section images partially overlap each other at the surrounding positions. Then, the specimen area section images may be bonded to each other according to the positional relationship between the surrounding specimen area section images and synthesized with each other, and one VS image may be generated. The specific process can be realized by applying the known technology disclosed in, for example, Japanese Laid-open Patent Publication No. 9-281405 or 2006-343573. In this case, the section size of the small sections is set to a size smaller than the field range of the high-magnification objective lens, such that end portions of the acquired specimen area section images overlap the surrounding specimen area section images. In this way, even when movement control precision of the electromotive stage 20 is low and the surrounding specimen area section images become discontinuous, a natural VS image in which a joint is made continuous by the overlapping portions can be generated.

As the result of the VS image generating process described above, a multi-band image having high resolution and a wide field in which the entire area of the target specimen S is illustrated is obtained. In this case, the processes of steps a1 to a21 are automatically executed. For this reason, the user may load the target specimen S (more specifically, slide glass specimen 6 of FIG. 10) on the electromotive stage 20, and input a start instruction of the VS image generating process through the input unit 41. It should be noted that the process of each of steps a1 to a21 may be stopped as necessary, and the user may be allowed to perform the operation. For example, a process of switching the used high-magnification objective lens into an objective lens having a different magnification according to the operation input after step a9, a process of modifying the determined specimen area according to the operation input after step a11, and a process of changing, adding or deleting the extracted focus position according to the operation input after step a13 may be executed as necessary.

Figure 14:
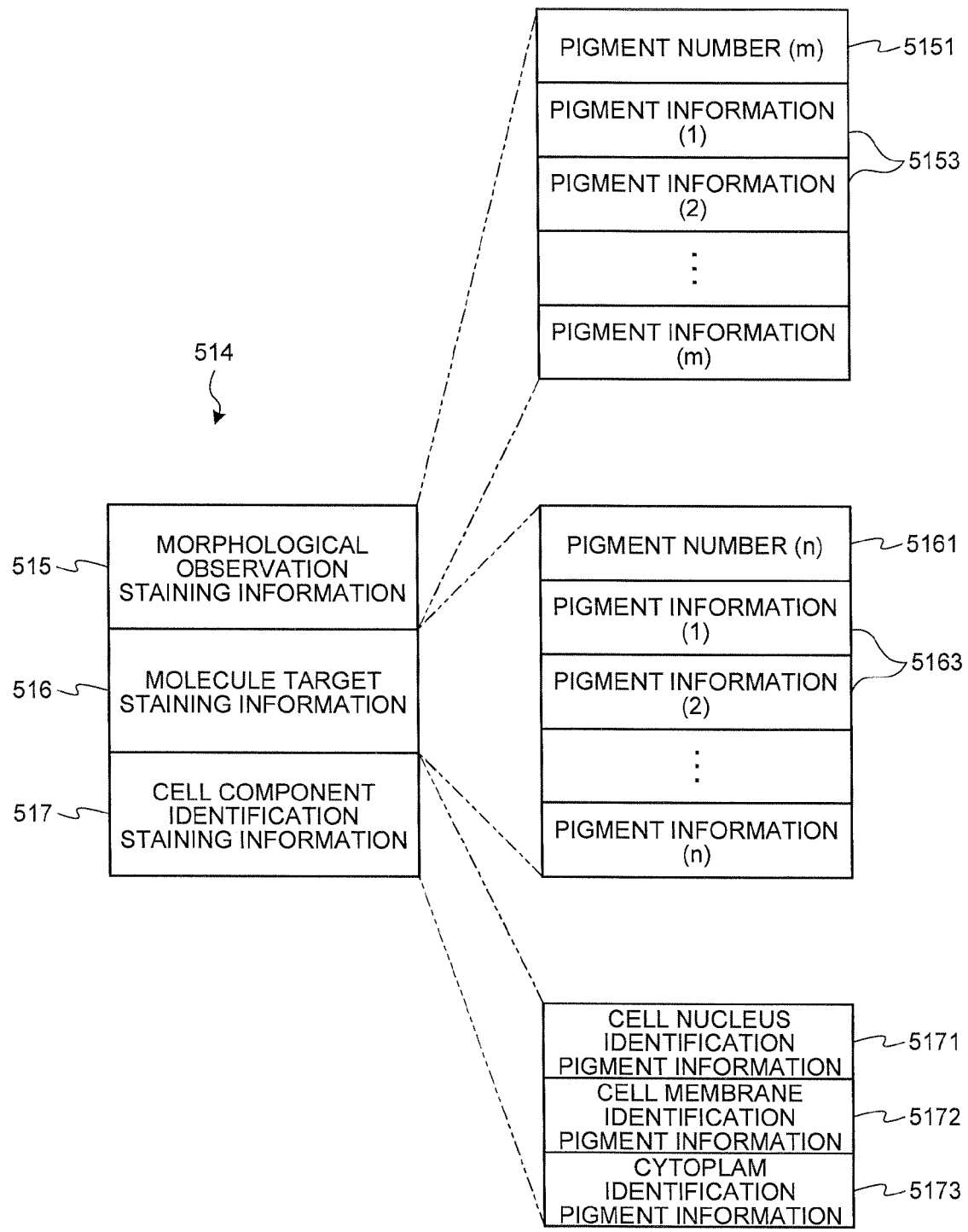
FIG. 14 is a diagram illustrating an example of the data configuration of staining information.
Figure 15:
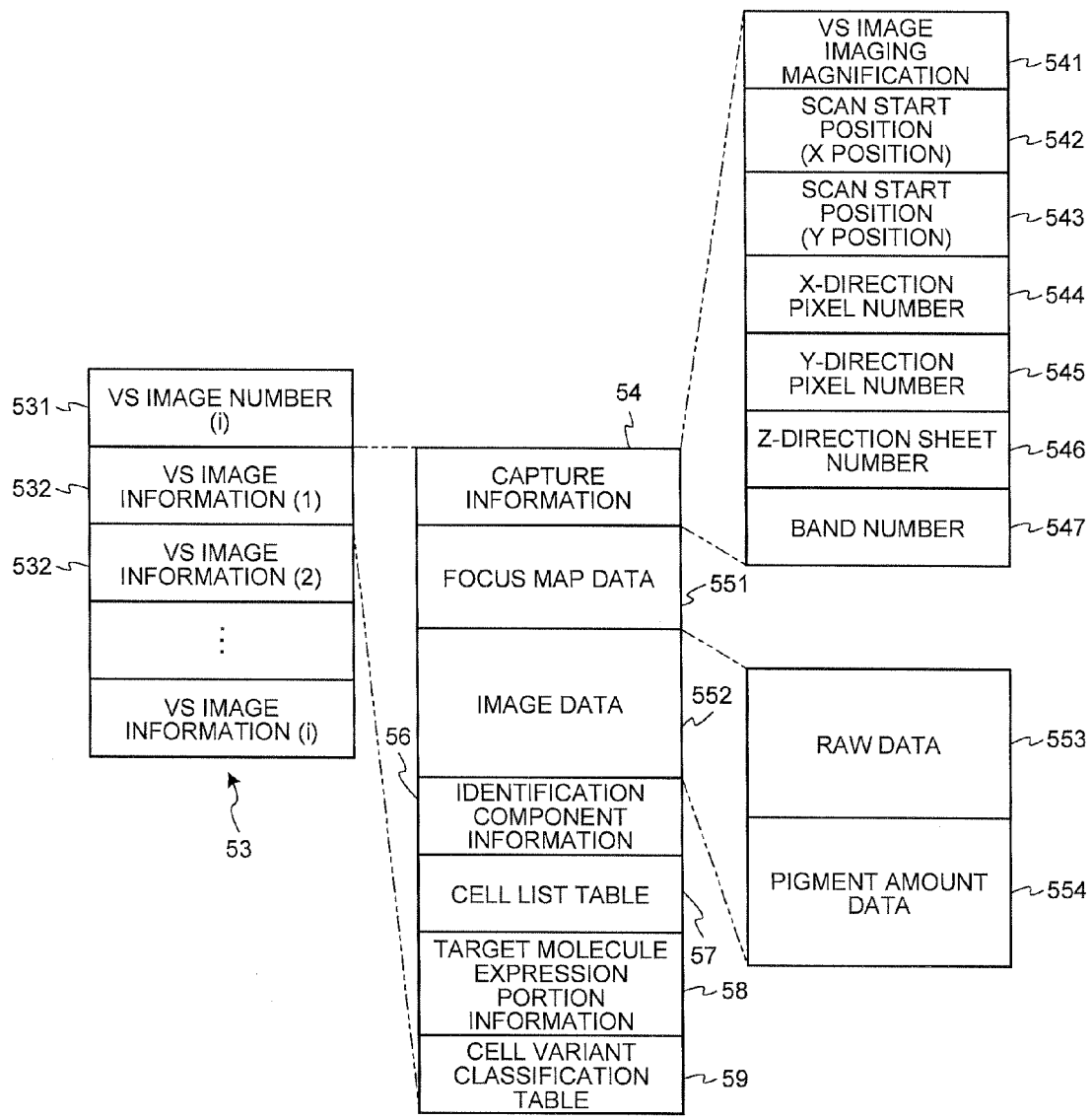
FIG. 15 is a diagram illustrating an example of the data configuration of VS image data.

FIGS. 13 to 15 are diagrams illustrating examples of the data configuration of the VS image file 5 that is obtained as the result of the VS image generating process and is recorded in the recording unit 47. As illustrated in FIG. 13, the VS image file 5 includes supplementary information 51, entire slide specimen image data 52, and VS image data 53.

In the supplementary information 51, an observation method 511 or a slide specimen number 512, an entire slide specimen image imaging magnification 513, staining information 514, a cell variant setting information 518, data type 519, and the like are set.

The observation method 511 is an observation method of the microscope apparatus 2 that is used to generate the VS image. In the first embodiment, a "bright field observation method" is set, for example. When a microscope apparatus that enables an observation of a specimen using another observation method, such as a dark field observation method, a fluorescent observation method, or a differential interference observation method, is used, an observation method when the VS image is generated is set.

In the slide specimen number 512, a slide specimen number that is read from the label 63 of the slide glass specimen 6 illustrated in FIG. 10 is set, for example. The slide specimen number is an ID that is uniquely allocated to the slide glass specimen 6, and the target specimen S can be individually identified using the ID. In the entire slide specimen image imaging magnification 513, the magnification of the low-magnification objective lens that is used at the time of acquiring the entire slide specimen image is set. The entire slide specimen image data 52 is image data of the entire slide specimen image.

In the staining information 514, a staining pigment that stains the target specimen S is set. That is, in the first embodiment, the H pigment, the E pigment, the DAB pigment, the VV pigment, and the VR pigment are set. However, the staining information 514 is set when the user inputs the pigment staining the target specimen S and registers the pigment, in the course of the VS image display process to be described in detail below.

More specifically, as illustrated FIG. 14, the staining information 514 includes morphological observation staining information 515 in which a morphological observation pigment among the staining pigments is set, molecule target staining information 516 in which a molecule target pigment is set, and cell component identification staining information 517 selected and set from among staining pigments (morphological observation pigment or molecule target pigment) set in the morphological observation staining information 515 or the molecule target staining information 516.

The morphological observation staining information 515 includes a pigment number 5151, and pigment information (1) to (m) 5153 of the number that corresponds to the pigment number 5151. In the pigment number 5151, the number of morphological observation pigments staining the target specimen S is set. In the pigment information (1) to (m) 5153, for example, pigment names of the morphological observation pigments are set, respectively. In the first embodiment, "2" is set as the pigment number 5151 and the "H pigment" and the "E pigment" are set as the two pigment information 5153.

The molecule target staining information 516 is configured in the same way as the morphological observation staining information 515. The molecule target staining information 516 includes a pigment number 5161, and pigment information (1) to (n) 5163 of the number that corresponds to the pigment number 5161. In the pigment number 5161, the number of molecule target pigments staining the target specimen S is set. In the pigment information (1) to (n) 5163, for example, pigment names of the molecule target pigments are set, respectively. In the pigment information (1) to (n) 5163, comment information is set as necessary. The comment information is input with respect to a corresponding molecule target pigment by the user in a pigment registration screen (see FIG. 23) explained later. In the first embodiment, "3" is set as the pigment number 5161, and "DAB pigment", "VV pigment", and "VR pigment" are set as three pieces of pigment information 5163.

The cell component identification staining information 517 includes cell nucleus identification pigment information 5171, cell membrane identification pigment information 5172, and cytoplam identification pigment information 5173. In the cell nucleus identification pigment information 5171, a pigment name of a cell nucleus identification pigment and a pigment amount threshold value used as reference for identifying a cell nucleus are set. In the cell membrane identification pigment information 5172, a pigment name of a cell membrane identification pigment and a pigment amount threshold value used as reference for identifying a cell membrane are set. In the cytoplam identification pigment information 5173, a pigment name of a cytoplam identification pigment and a pigment amount threshold value used as reference for identifying a cytoplam are set. In the pigment amount threshold value, a value is set, which is input with respect to a corresponding cell component (cell nucleus, cell membrane, or cytoplam) by the user in an identification pigment selection screen (see FIG. 19) explained later. In the first embodiment, "H pigment" and a pigment amount threshold value input with respect to a cell nucleus identification pigment, i.e., H pigment, by the user are set as the cell nucleus identification pigment information 5171. "VR pigment" and a pigment amount threshold value input with respect to a cell membrane identification pigment, i.e., VR pigment, by the user are set as the cell membrane identification pigment information 5172. In the first embodiment, cytoplam is not identified. Accordingly, "not used" is set as the cytoplam identification pigment information 5173 (or nothing is set).

In the cell variant setting information 518 as illustrated in FIG. 13, a user records the name of a cell variant, an expression pattern of a target molecule classified in a corresponding cell variant, and the like, in the course of the VS image display process to be described in detail below. The cell variant setting information 518 will be explained later with reference to FIG. 33 in detail.

The data type 519 represents the data type of the VS image. For example, in the VS image data 53 as illustrated in FIG. 15, the data type 519 distinguishes whether only the image data of a VS image (raw data) 553 are recorded as image data 552 or the pigment amount for each pixel is already calculated and pigment amount data 554 are recorded. For example, during execution of the VS image generation processing, only the raw data 553 are recorded as the image data 552, and accordingly, identification information representing raw data is set in the data type 519. When the VS image display process to be described in detail below is executed, the pigment amount of each pigment in each pixel of the VS image is calculated and recorded as the pigment amount data 554. At this time, the data type 519 is updated by identification information indicating the pigment amount data.

In the VS image data 53, a variety of information that is related to the VS image is set. That is, as illustrated FIG. 15, the VS image data 53 includes a VS image number 531 and VS image information (1) to (i) 532 of the number that corresponds to the VS image number 531. In this case, the VS image number 531 that is the number of VS image information 532 recorded in the VS image data 53 corresponds to i. In the example of the data configuration of the VS image data 53 as illustrated in FIG. 15, the case where a plurality of VS images are generated with respect to one specimen is assumed. More specifically, in the example as illustrated in FIG. 10, the case where one specimen area 65 is extracted as the area where the target specimen S is actually loaded in the slide glass specimen 6 has been described. However, in the slide glass specimen, a plurality of specimens may be distant from each other and scattered. In this case, it is not necessary to generate a VS image of an area where there is no specimen. For this reason, when the plurality of specimens are distant from each other to some degree and scattered, areas of the scattered specimens are individually extracted, and a VS image is generated for each of the areas of the extracted specimens. At this time, however, the number of VS images generated is set as the VS image number 531. A variety of information that is related to the individual VS images is set as the VS image information (1) to (i) 532, respectively. Even in the example of FIG. 10, areas of two specimens are included in the specimen area 65. However, since the positions of the areas of the two specimens are close to each other, the areas are extracted as one specimen area 65.

In each VS image information 532, capture information 54, focus map data 551, the image data 552, identification component information 56, a cell list table 57, target molecule expression portion information 58, a cell variant classification table 59, and the like are set.

In the capture information 54, a VS image imaging magnification 541, a scan start position (X position) 542, a scan start position (Y position) 543, an x-direction pixel number 544, a y-direction pixel number 545, a Z-direction sheet number 546, and a band number 547 are set.

In the VS image imaging magnification 541, the magnification of the high-magnification objective lens that is used when the VS image is acquired is set. The scan start position (X position) 542, the scan start position (Y position) 543, the x-direction pixel number 544, and the y-direction pixel number 545 indicate a capture range of the VS image. That is, the scan start position (X position) 542 is an X position of a scan start position of the electromotive stage 20 when starting to capture each specimen area section image constituting the VS image, and the scan start position (Y position) 543 is a Y position of the scan start position. The x-direction pixel number 544 is the number of pixels of the VS image in an x direction, and the y-direction pixel number 545 is the number of pixels of the VS image in a y direction, which indicates a size of the VS image.

The Z-direction sheet number 546 corresponds to the number of sections in a Z direction. When the VS image is generated as a three-dimensional image, a captured sheet number in the Z direction is set in the Z-direction sheet number 546. In the first embodiment, "1" is set in the Z-direction sheet number 546. The VS image is generated as a multi-band image. The number of bands is set to the band number 547, and in the first embodiment, "6" is set.

The focus map data 551 as illustrated in FIG. 15 is the data of the focus map as illustrated in FIG. 12. The image data 552 is image data of the VS image. For example, the image data 552 includes raw data 553 and pigment amount data 554. In the raw data 553, raw data of 6 bands is set when the VS image generating process is executed. In the pigment amount data 554, data of the pigment amount of each staining pigment calculated for each pixel in the course of the VS image display process to be described in detail below is set.

The identification component information 56 records the map data indicating whether each pixel in the VS image is a pixel of a cell component or not, the morphological characteristic data in which morphological feature amounts of areas identified as cell components are set, a list of pixel positions within the areas of the identified cell components, and the like. The identification component information 56 will be explained later with reference to FIGS. 25 and 26 in detail.

The cell list table 57 records cell information identifying an area of cell constituent elements (cell nucleus, cell membrane, cytoplam, and the like) constituting each cell area recognized in the VS image. The cell list table 57 will be explained later with reference to FIG. 27 in detail.

The target molecule expression portion information 58 records the map data in which areas of target molecule expression portions extracted from the VS image are set and also records a list of pixel positions within areas of cell components (positive cell components) including the target molecule expression portions. The target molecule expression portion information 58 will be explained later with reference to FIG. 30 in detail.

The cell variant classification table 59 records cell variants in each cell area in the VS image. The cell variant classification table 59 will be explained later with reference to FIG. 35 in detail.

Figure 16:
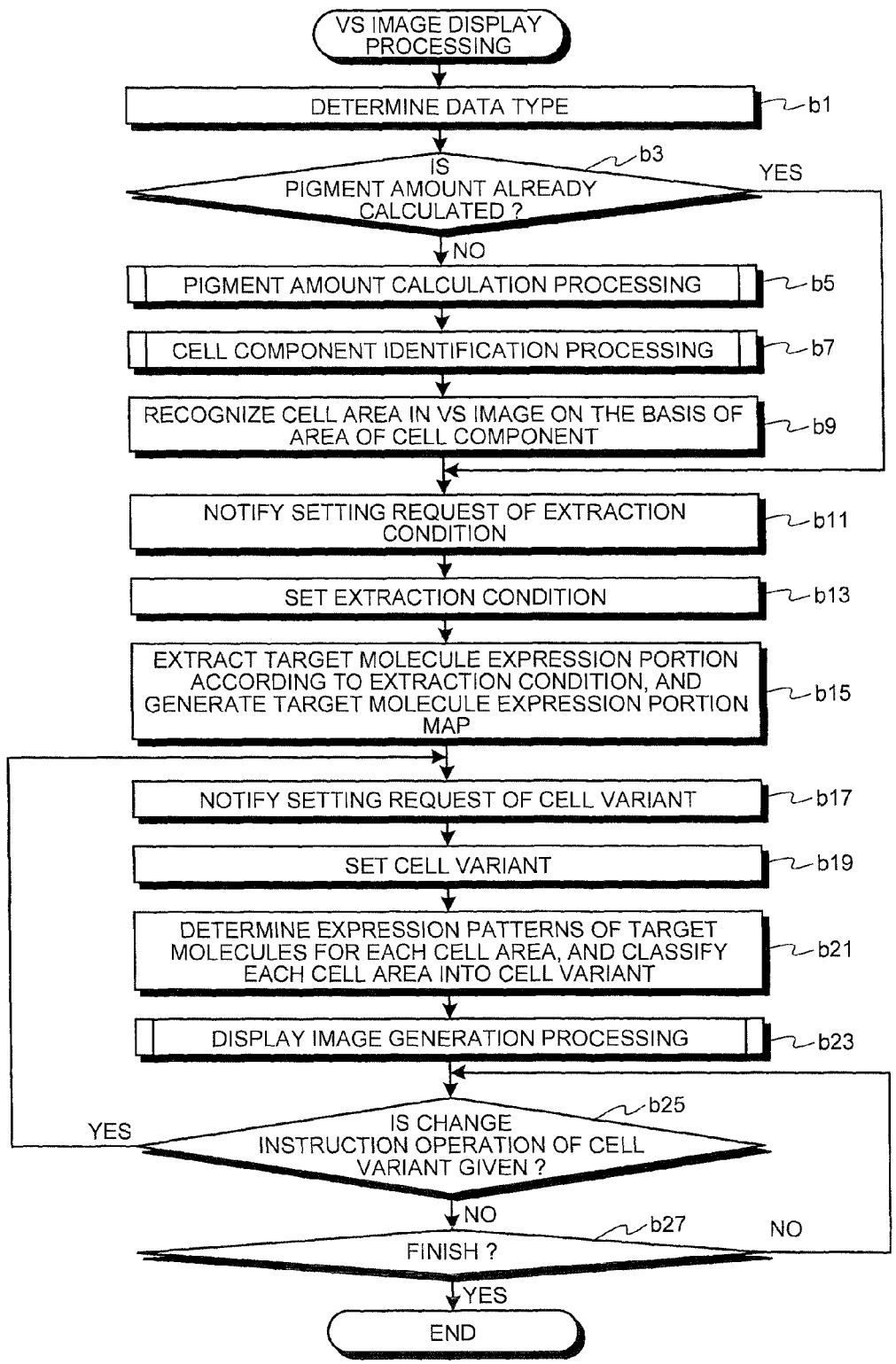
FIG. 16 is a flowchart illustrating a process sequence of VS image display processing in the first embodiment.

Subsequently, the VS image display process according to the first embodiment will be described. FIG. 16 is a flowchart illustrating a process sequence of VS image display processing in the first embodiment. The process that is described is realized when the VS image display processing unit 454 reads the VS image display processing program 473 recorded in the recording unit 47 and executes the VS image display processing program 473.

In the VS image display processing, first, the VS image display processing unit 454 reads the data type 519 from the VS image file 5 (see FIG. 13), and determines the data type of the VS image (step b1). When the identification information indicating pigment amount data is set in the data type 519, and the pigment amount is already calculated for each pixel in the VS image (step b3: Yes), then step b11 is performed.

Figure 17:
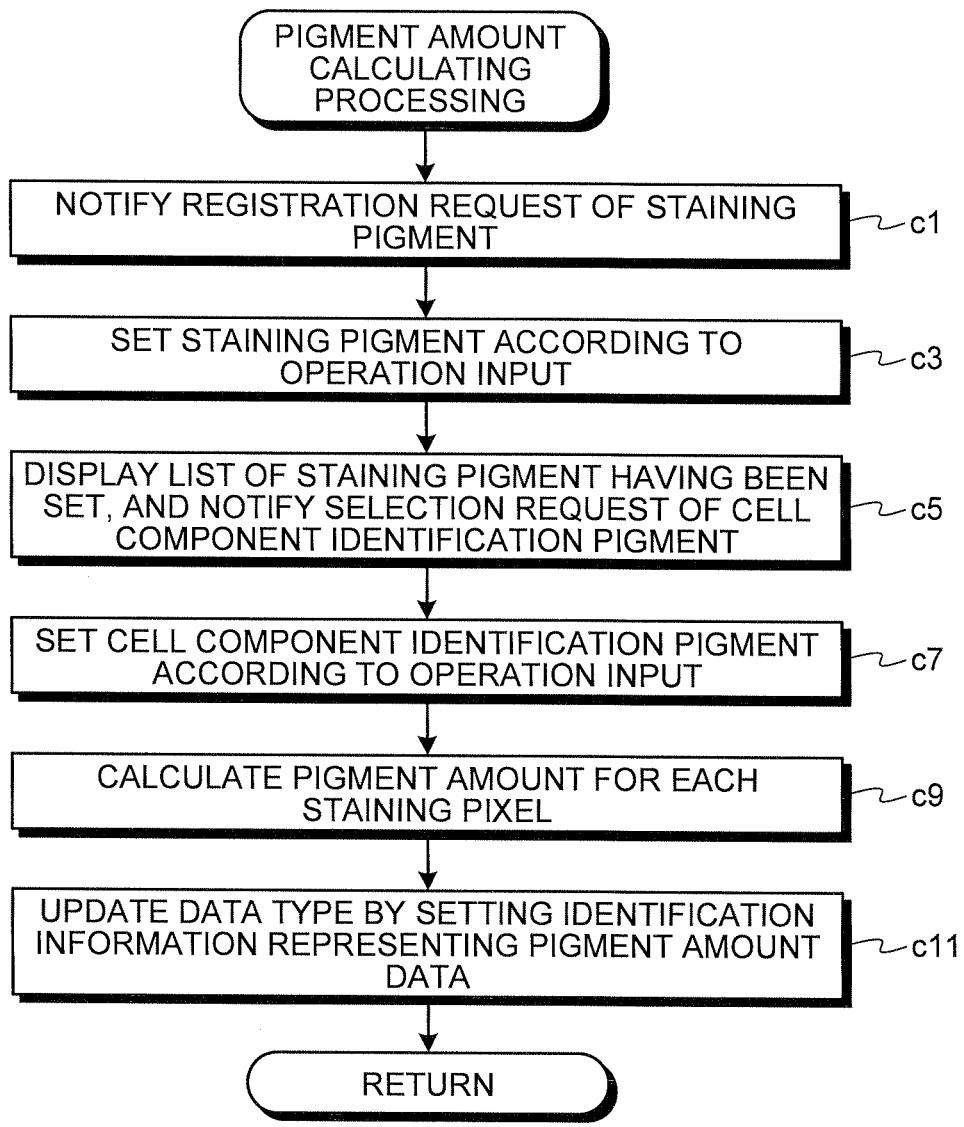
FIG. 17 is a flowchart illustrating a process sequence of pigment amount calculation processing.

On the other hand, when the identification information indicating raw data is set in the data type 519, and the pigment amount has not yet been calculated for each pixel in the VS image (step b3: No), then pigment amount calculation processing is performed (step b5). FIG. 17 is a flowchart illustrating a process sequence of pigment amount calculation processing.

Figure 18:
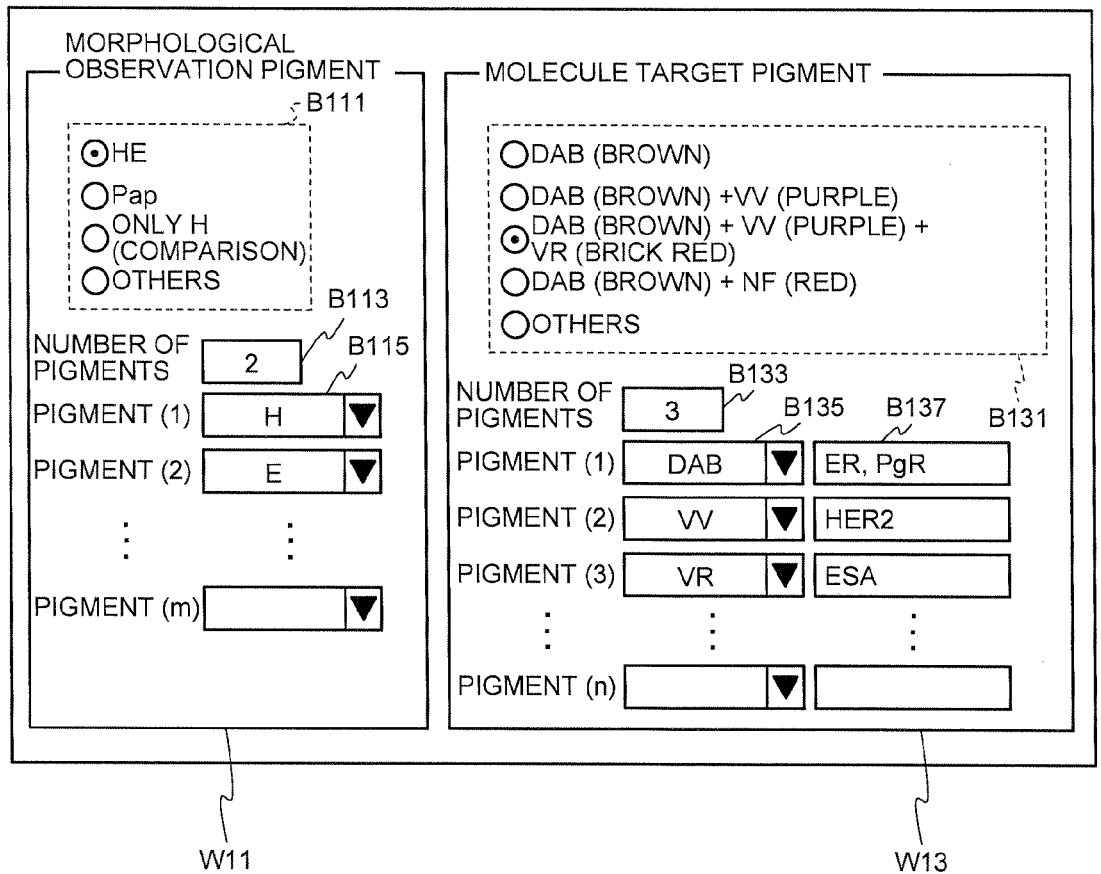
FIG. 18 is a diagram illustrating an example of a pigment registration screen.

In the pigment amount calculating processing, first, the staining pigment setting unit 455 executes a process of displaying a notification of a registration request of a staining pigment staining the target specimen S on the display unit 43 (step c1). For example, a pigment registration screen is displayed on the display unit 43 to notify a registration request of a staining pigment. On the pigment registration screen, the registration operation of the staining pigment performed by the user is received. FIG. 18 is a diagram illustrating an example of a pigment registration screen. As illustrated in FIG. 18, the pigment registration screen includes two screens, i.e., a morphological observation registration screen W11 and a molecule target registration screen W13.

In the morphological observation registration screen W11, an input box B113 that is used to input the number of morphological observation pigments and a plurality (m pieces of) of dropdown boxes B115 that are used to select the morphological observation pigments are disposed. Each of the dropdown boxes B115 provides a list of pigment names as options, and prompts the user to make selection. The provided pigments are not particularly exemplified, but appropriately include pigments known in morphological observation staining. The user operates the input unit 41 to input the number of morphological observation pigments actually staining the target specimen S in the input box B113, selects the pigment names in the dropdown boxes B115, and registers the staining pigments. When the number of morphological observation pigments is two or more, the pigment names thereof are selected by the dropdown boxes B115, respectively.

The morphological observation registration screen W11 includes a standardized staining selector B111. In the standardized staining selector B111, the pigment (HE) that is used in the representative HE staining as the morphological observation staining, the pigment (Pap) that is used in the Pap staining, the pigment (only H) that is used in the H staining, and four other options are presented. The choices that are provided by the standardized staining selector B111 are not limited to the exemplified choices, and may be selected by the user. In this case, with respect to the provided pigments, the pigments can be registered by checking corresponding items, and a registration operation can be simplified. For example, as illustrated in FIG. 18, if "HE" is checked, "2" is automatically input to the input box B113, and "H" and "E" are automatically input to the dropdown boxes B115 of the pigments (1) and (2), respectively. In the first embodiment, since the target specimen S is subjected to the HE staining, the user can check "HE" in the standardized staining selector B111 and register the staining pigment (morphological observation pigment).

On the other hand, in the molecule target registration screen W13, an input box B133 that is used to input the number of molecule target pigments, a plurality of (n pieces of) dropdown boxes B135 that are used to select the molecule target pigments, and a plurality of (n pieces of) comment input fields B137 respectively corresponding to the dropdown boxes B135 are disposed. Each of the dropdown boxes B135 provides a list of pigment names as options, and prompts the user to make selection. The provided pigments are not particularly exemplified, but appropriately include pigments known in molecule target staining. The user operates the input unit 41 to input the number of molecule target pigments actually staining the target specimen S in the input box B133, selects the pigment names in the dropdown boxes B135, and registers staining information. A user freely fills in the comment input field B137 with, for example, matters relating to the molecule target pigment selected in the corresponding dropdown box B135 (comment information). For example, the user inputs the name of an antibody (made visible) stained by the corresponding molecule target pigment, the name of an antigen labeled by the antibody (i.e., target molecule), and the like to the comment input field B137 as comment information as necessary.

Like the morphological observation registration screen W11, the molecule target registration screen W13 includes a standardized staining selector B131 that provides main labeling enzymes or a combination thereof. The choice that is provided by the standardized staining selector B131 is not limited to the exemplified choice, and may be selected by the user. In the first embodiment, the molecule target pigment is the DAB pigment, the VV pigment, and the VR pigment. As illustrated in FIG. 18, when "DAB (brown) +VV (purple) +VR (brick red)" is checked in the standardized staining selector 5131, the staining pigment (molecule target pigment) can be registered. More specifically, at this occasion, "3" is automatically input to the input box B133, and "DAB", "VV", and "VR" are automatically input to the dropdown boxes B135 of the pigment (1), the pigment (2), and the pigment (3), respectively.

Referring back to FIG. 17, in the pigment registration screen, the staining pigment setting unit 455 adopts the information about the morphological observation pigment registered in response to user's operation input as the morphological observation staining information 515 (see FIG. 14) of the staining information 514 (see FIG. 13) as described above, and sets the information about the molecule target pigment in the VS image file 5 as the molecule target staining information 516 (see FIG. 14) (step c3). In the first embodiment, as a result of the above processing, the H pigment, the E pigment, the DAB pigment, the VV pigment, and the VR pigment are set as staining pigments.

Figure 19:
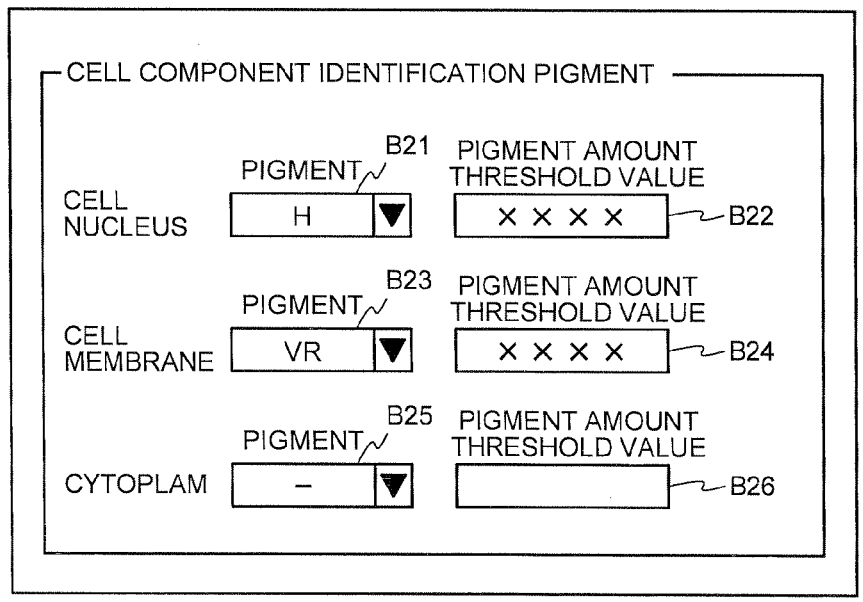
FIG. 19 is a diagram illustrating an example of an identification pigment selection screen.

Subsequently, the cell component identification pigment setting unit 456 executes a process of displaying a notification of a selection request of the cell component identification pigment on the display unit 43 (step c5). For example, an identification pigment selection screen is displayed on the display unit 43 to notify a selection request of a cell component identification pigment. On the identification pigment selection screen, the selection operation of the cell component identification pigment performed by the user is received. At this occasion, the list of staining pigments set in step c3 is presented, and the selection operation of the cell component identification pigment from among the list is received. FIG. 19 is a diagram illustrating an example of an identification pigment selection screen.

As illustrated in FIG. 19, the identification pigment selection screen is arranged with a dropdown box B21 for selecting a cell nucleus identification pigment, an input box B22 for inputting a pigment amount threshold value thereof, a dropdown box B23 for selecting a cell membrane identification pigment, an input box B24 for inputting a pigment amount threshold value thereof, a dropdown box B25 for selecting a cytoplam identification pigment, and an input box B26 for inputting a pigment amount threshold value thereof.

In this case, the dropdown boxes B21, B23, B25 illustrate, as options, the list of morphological observation pigments and molecule target pigments set as the staining pigments in step c3 of FIG. 17. The pigment amount threshold values input to the input boxes B22, B24, B26 are used as reference when a corresponding cell component is identified in the subsequent processings. For example, when the cell nucleus is identified, pixels whose pigment amounts of the cell nucleus identification pigments selected in the dropdown box B21 are more than the value input in the input box B22 are selected as candidate pixels of the cell nucleus. Likewise, when the cell membrane is identified, pixels whose pigment amounts of the cell membrane identification pigments selected in the dropdown box B23 are more than the value input in the input box B24 are selected as candidate pixels of the cell membrane. When the cytoplam is identified, pixels whose pigment amounts of the cytoplam identification pigments selected in the dropdown box B25 are more than the value input in the input box B26 are selected as candidate pixels of the cytoplam.

The user operates the input unit 41 to select staining pigments used as the cell nucleus identification pigment, the cell membrane identification pigment, or the cytoplam identification pigment from among the staining pigments in the dropdown boxes B21, B23, B25, and the pigment amount threshold values used for identifying the corresponding cell component are input in the input boxes B22, B24, B26. In the first embodiment, for example, "H", i.e., the cell nucleus identification pigment, is selected in the dropdown box B21, and a pigment amount threshold value thereof is input "VR", i.e., the cell membrane identification pigment, is selected in the dropdown box B23, and a pigment amount threshold value thereof is input.

In FIG. 19, one type of cell component identification pigment is set for each cell component. However, the cell component identification pigment is not necessarily limited to one type. For example, in Papanicolaou staining known as a morphological observation staining of cytological diagnosis used for uterine cervix cytological diagnosis specimen, cell nucleus is stained by hematoxylin into a dark purple color. On the other hand, in the Papanicolaou staining, cytoplam is stained according to the types of cells by three types of pigments, i.e., orange G, eosin Y, and light green SFY. More specifically, in a case of basal cell, it is stained in dark blue green. In a case of middle cell, it is stained in light sea green. In a case of superficial cell, it is stained in orange-red to pale yellow. Accordingly, in FIG. 19, a plurality of sets of dropdown boxes B21, B23, B25 and input boxes B22, B24, B26 may be arranged, and a plurality of cell component identification pigments may be set for each cell component, so that a plurality of cell component identification pigments can be set in such case (For example, in the above example, three types of pigments, i.e., orange G, eosin Y, and light green SFY can be set as cytoplam identification pigments).

Referring back to FIG. 17, the cell component identification pigment setting unit 456 sets the pigment names and the pigment amount threshold values set by the user in the identification pigment selection screen as described above, to the VS image file 5 as the cell component identification staining information 517 (see FIG. 14) (step c7). In the first embodiment, as a result of the above processing, the H pigment and the pigment amount threshold value thereof are set as the cell nucleus identification pigment information 5171, and the VR pigment and the pigment amount threshold value thereof are set as the cell membrane identification pigment information 5172. Then, in the processing subsequent thereto (cell component identification processing in FIG. 20), the cell nucleus and the cell membrane are identified.

Subsequently, the pigment amount calculating unit 457 calculates the pigment amount at each specimen position on the target specimen S for each staining pigment set in step c3, on the basis of a pixel value of each pixel of the generated VS image (step c9). The calculation of the pigment amount can be realized by applying the known technology disclosed in Japanese Laid-open Patent Publication No. 2008-51654, for example.

The process sequence will be simply described. First, the pigment amount calculating unit 457 estimates a spectrum (estimation spectrum) at each specimen position on the target specimen S for each pixel, on the basis of the pixel value of the VS image. As a method of estimating a spectrum from a multi-band image, for example, Wiener estimation may be used. Subsequently, the pigment amount calculating unit 457 estimates (calculates) the pigment amount of the target specimen S for each pixel, by using a reference pigment spectrum of a calculation target pigment (staining pigment) that is measured in advance and recorded in the recording unit 47.

In this case, the calculation of the pigment amount will be simply described. In general, in a material that transmits light, a rule of Lambert-Beer represented by the following Formula (1) is known to be satisfied between intensity $I_0(\lambda)$ of incident light and intensity $I(\lambda)$ of emitted light for every wavelength $\lambda$.

$$\frac{I(\lambda)}{I_0(\lambda)} = e^{-k(\lambda) \cdot d} \qquad (1)$$

where k(λ) indicates a unique value of a material that is determined depending on a wavelength, and d indicates the thickness of the material. The left side of Formula (1) means spectral transmittance t(λ).

For example, when the specimen is stained by pigments of n kinds including a pigment 1, a pigment 2, . . . , and a pigment n, the following Formula (2) is satisfied in each wavelength λ according to the rule of Lambert-Beer.

$$\frac{I(\lambda)}{I_0(\lambda)} = e^{-(k_1(\lambda) \cdot d_1 + k_2(\lambda) \cdot d_2 + \ldots k_n(\lambda) \cdot d_n)} \qquad (2)$$

where $k_1(\lambda), k_2(\lambda), \ldots$ and $k_n(\lambda)$ indicate k(λ) that correspond to the pigment 1, the pigment 2, . . . , and the pigment n, respectively, and are, for example, reference pigment spectrums of the pigments that stain the specimen, respectively. Further, $d_1, d_2, \ldots$ and $d_n$ indicate virtual thicknesses of the pigment 1, the pigment 2, . . . , and the pigment n at the specimen positions on the target specimen S that correspond to the individual image positions of the multi-band image, respectively. Since the pigment originally exists to be dispersed in the specimen, the concept of the thickness is not accurate. However, as compared with the case where it is assumed that the specimen is stained by a single pigment, the thickness becomes an index of the relative pigment amount that approximately indicates how much pigment exists. That is, $d_1, d_2, \ldots$ and $d_n$ indicate the pigment amounts of the pigment 1, the pigment 2, . . . , and the pigment n, respectively. Further, $k_1(\lambda), k_2(\lambda), \ldots$ and $k_n(\lambda)$ can be easily calculated from the rule of Lambert-Beer by preparing the specimens individually stained using the individual pigments of the pigment 1, the pigment 2, . . . , and the pigment n and measuring spectral transmittance thereof by using a spectroscope.

If a logarithm of both sides of Formula (2) is taken, the following Equation (3) is obtained.

$$-\log \frac{I(\lambda)}{I_0(\lambda)} = k_1(\lambda) \cdot d_1 + k_2(\lambda) \cdot d_2 \ldots k_n(\lambda) \cdot d_n \qquad (3)$$

In the above-described way, if an element corresponding to the wavelength λ of the estimation spectrum estimated for each pixel of the VS image is defined as $\hat{t}(x, \lambda)$ and this expression is substituted into Equation (3), the following Equation (4) is obtained.

$$-\log \hat{t}(x,\lambda) = k_1(\lambda) \cdot d_1 + k_2(\lambda) \cdot d_2 \ldots k_n(\lambda) \cdot d_n \qquad (4)$$

In Equation (4), since n unknown variables that include $d_1, d_2, \ldots$ and $d_n$ exist, Equation (4) can be solved simultaneously with respect to at least n different wavelengths λ. In order to improve precision, a multiple regression analysis may be performed by simultaneously setting Equation (4) with respect to at least n different wavelengths λ.

The simple process sequence of the pigment amount calculating processing has been described. However, in the first embodiment, the staining pigments that become the calculation targets are the H pigment, the E pigment, the DAB pigment, the VV pigment, and the VR pigment, and n=5 holds. The pigment amount calculating unit 457 estimates the individual pigment amounts of the H pigment, the E pigment, the DAB pigment, the VV pigment, and the VR pigment that are fixed to the individual specimen positions, on the basis of the estimation spectrums estimated with respect to the individual pixels of the VS image.

Figure 20:
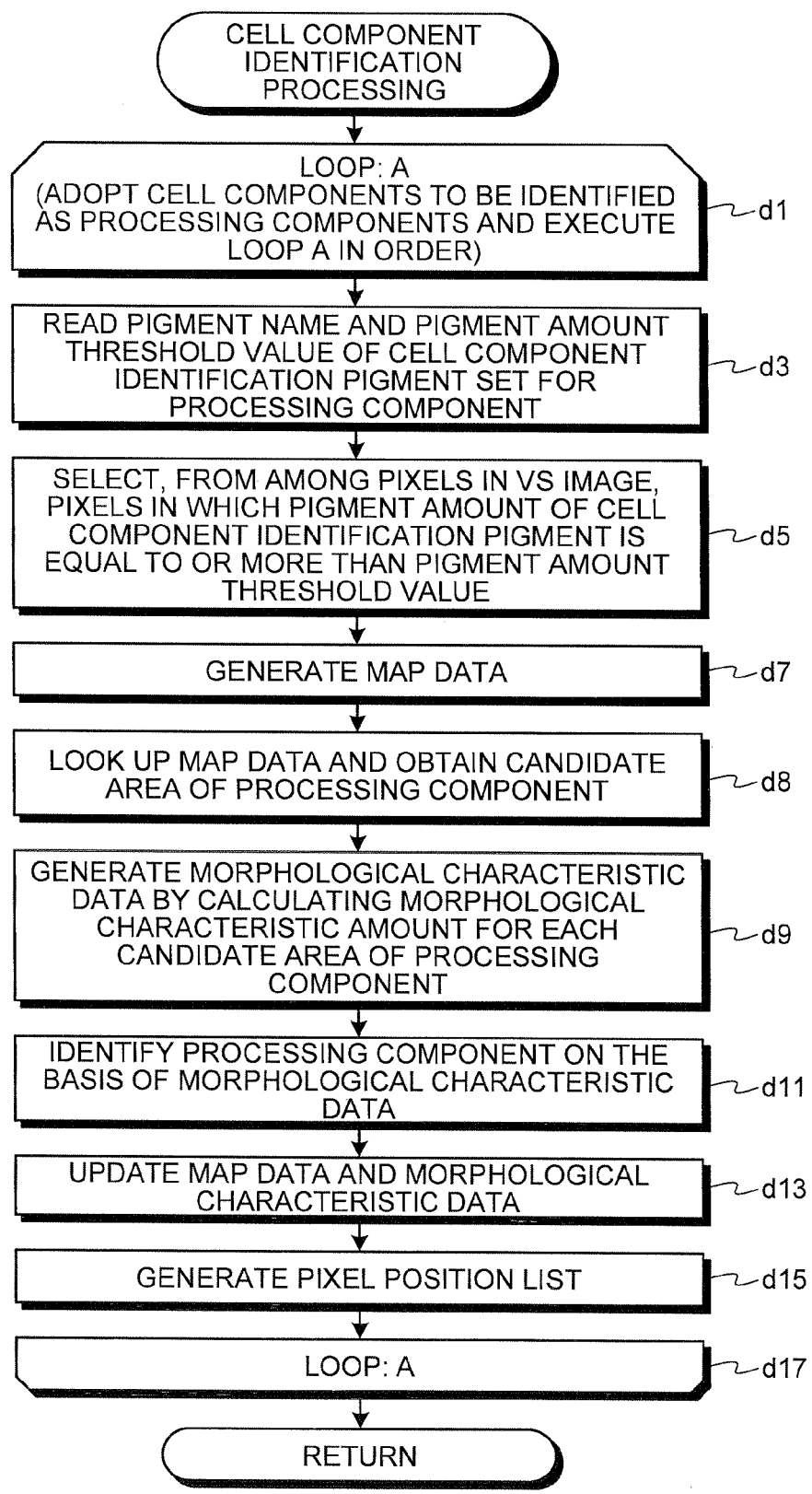
FIG. 20 is a flowchart illustrating a process sequence of cell component identification processing.

When the pigment amount of each staining pigment is calculated as described above, the pigment amount calculating unit 457 updates the data type by setting identification information indicating the pigment amount data (step c11), and finishes the pigment amount calculation processing. Then, returning back to step b5 of FIG. 16, and the cell component identification processing in step b7 is thereafter performed. FIG. 20 is a flowchart illustrating a process sequence of cell component identification processing.

In the cell component identification processing, the cell component identification processing unit 458 adopts, as identification target, the cell components for which the pigment names and the pigment amount threshold values are set in step c7 of FIG. 17, and performs processing of loop A for each cell component to be identified (step d1 to step d17). Hereinafter, the cell components to be processed in the loop A will be referred to as "processing components". In the first embodiment, the cell nucleus and the cell membrane are successively adopted as the processing component, and the processing of the loop A is performed.

That is, in the loop A, the cell component identification processing unit 458 first reads the pigment name and the pigment amount threshold value of the cell component identification pigment set for the processing component from the cell component identification staining information 517 (step d3). For example, when the cell nucleus is processed as the processing component, the pigment name (H pigment in the first embodiment) and the pigment amount threshold value thereof are read from the cell nucleus identification pigment information 5171. Likewise, when the cell membrane is processed as the processing component, the pigment name (VR pigment in the first embodiment) and the pigment amount threshold value thereof are read from the cell membrane identification pigment information 5172. It should be noted that cytoplam is not included in the identification target in the first embodiment. However, when the cytoplam is processed as the processing component, the pigment name and the pigment amount threshold value thereof are read from the cytoplam identification pigment information 5173. For example, the cytoplam identification pigment includes E pigment that stains cytoplam, connective tissue, and the like.

Subsequently, the cell component identification processing unit 458 looks up the pigment amount data 554 and selects, from among the pixels in the VS image, pixels in which the pigment amount of the cell component identification pigment whose pigment name is read in step d3 is equal to or more than the pigment amount threshold value read in step d3 (step d5). Then, the cell component identification processing unit 458 generates map data in which the selection result is set (step d7).

Figures 21, 22:
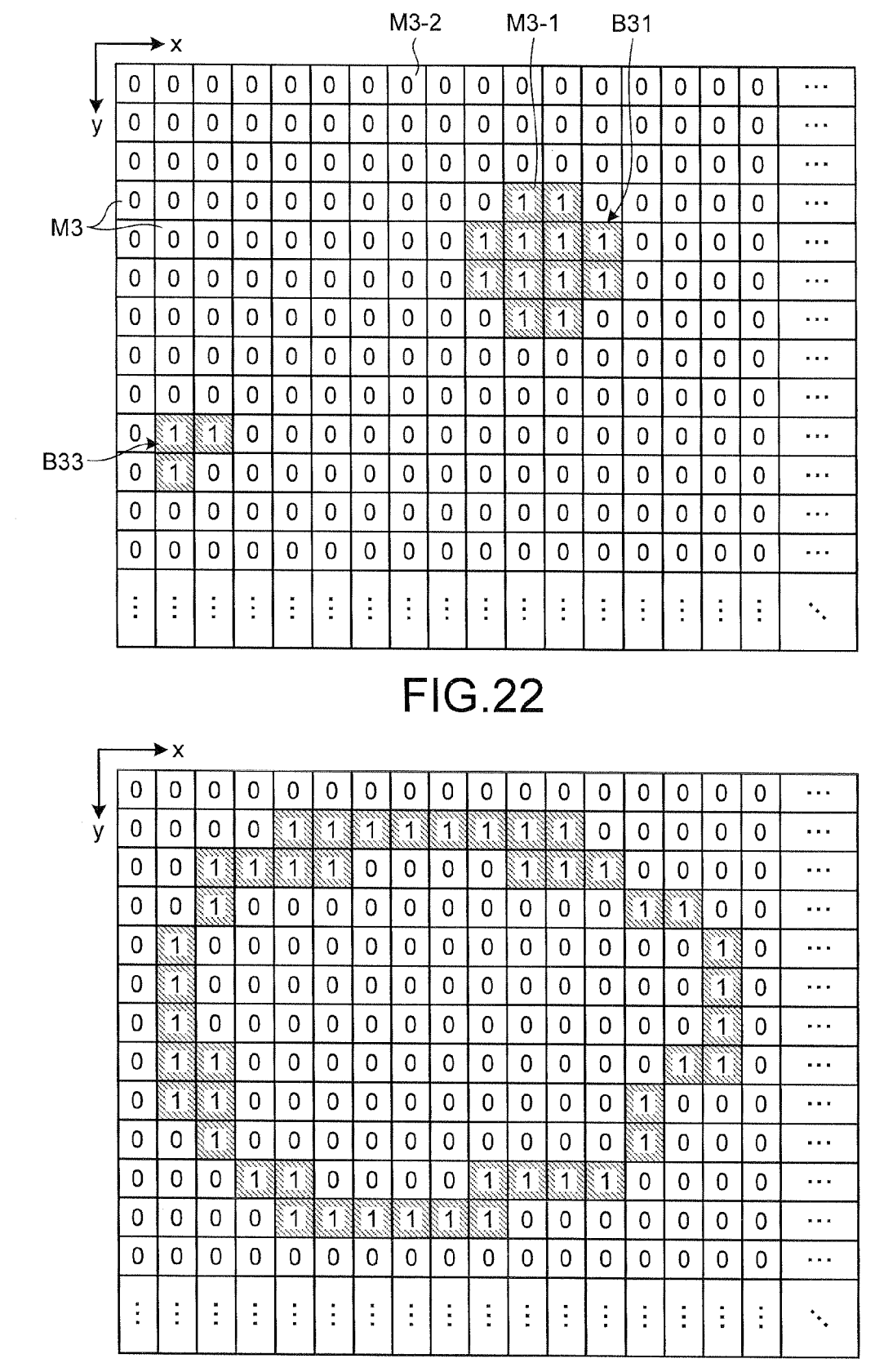

FIG. 21 is a schematic diagram illustrating an example of the data configuration of map data of cell nucleus that is generated as a result of the processings from steps d3 to d7 as illustrated in FIG. 20 in which the cell nucleus is adopted as the processing component. As illustrated in FIG. 21, the map data of the cell nucleus has such data configuration that either "0" or "1" is set in each square M3 corresponding to a pixel position constituting the VS image. For example, "1" is set in squares (data cells) M3 corresponding to the pixels selected in step d5, as illustrated in the squares M3-1. For example, as illustrated in a square M3-2, "0"'s are set to squares M3 corresponding to pixels not selected in step d5.

On the other hand, FIG. 22 is a schematic diagram illustrating an example of the data configuration of map data of cell membrane that is generated as a result of the processings from steps d3 to d7 as illustrated in FIG. 20 in which the cell nucleus is adopted as the processing component. Likewise, as illustrated in FIG. 22, the map data of the cell membrane has such data configuration that either "0" or "1" is set in each of a plurality of squares corresponding to pixel positions constituting the VS image. Then, "1" is set to squares corresponding to the pixels selected in step d5, and "0" is set to squares corresponding to the pixels that are not selected in step d5.

Map data of cytoplam that is generated as a result of the processings from steps d3 to d7 as illustrated in FIG. 20 in which the cytoplam is adopted as the processing component has the same data configuration, which is not illustrated. In the map data, among the squares corresponding to the respective pixel positions constituting the VS image, "1" is set to squares corresponding to the pixels selected in step d5. On the other hand, "0" is set to squares corresponding to the pixels that are not selected in step d5.

Referring back to FIG. 20, subsequently, the cell component identification processing unit 458 looks up the map data generated in step d7, divides the pixels selected in step d5 for each connection component, and attaches a unique label for identifying each processing component to each divided pixel group, thus obtaining each pixel group as a candidate area of the processing component (step d8). Subsequently, the cell component identification processing unit 458 generates morphological characteristic data for each candidate area of the processing component obtained in step d8 (step d9). Then, the cell component identification processing unit 458 determines whether the candidate area of the processing component is the area of the processing component or not on the basis of the generated morphological characteristic data, thus identifying the corresponding processing component (step d11). It should be noted that this identification of the processing component can be realized by applying the known technology disclosed in Japanese Laid-open Patent Publication No. 2009-175334, for example. Thereafter, the cell component identification processing unit 458 corrects and updates the map data and the morphological characteristic data on the basis of the result of the identification of the processing component (step d13).

Now, the processings from step d8 to step d13 will be briefly explained in each of the cases where the processing component is a cell nucleus, a cell membrane, and a cytoplam.

When the processing component is a cell nucleus, first, the map data of the cell nucleus is looked up, and the candidate area (cell nucleus candidate area) of the cell nucleus is obtained as the processing of step d8. More specifically, for example, a unique label (cell nucleus identification label) is attached to a pixel (square) group in which "1" is set in a continuous manner, and the pixel group having the same label (cell nucleus identification label) is obtained as one cell nucleus candidate area.

Subsequently, as the processing of step d9, for example, first, a contour is extracted for each of the obtained cell nucleus candidate area by applying a known method such as contour tracing. Then, on the basis of the contour of the extracted cell nucleus candidate area, a morphological feature amount representing a morphological feature thereof is calculated, and the calculated morphological feature amount is set. Then, morphological characteristic data of the cell nucleus are generated.

FIG. 23 is a diagram illustrating an example of the data configuration of morphological characteristic data of a cell nucleus. As illustrated in FIG. 23, examples of morphological feature amounts of cell nucleus include a circumscribing rectangle, a barycenter, a size of an area, a peripheral length, a roundness, a length of a major axis, a length of a minor axis, and an aspect ratio.

In this case, the circumscribing rectangle circumscribes the cell nucleus candidate area. The circumscribing rectangle is a rectangle in which a direction of each side is parallel to x coordinate axis or y coordinate axis, and is calculated as, for example, x coordinate and y coordinate of the upper left apex, a width in x direction (the number of pixels in x direction: W), and a height in y direction (the number of pixels in y direction: H) in a VS image.

The barycenter is calculated as an x coordinate and a y coordinate in the VS image. The size of the area is a size of the cell nucleus candidate area. The peripheral length is calculated as a length of an outer contour of the cell nucleus candidate area.

The roundness is calculated according to the following Formula (5), for example. In this case, the value calculated from Formula (5) is the largest (=1) when the contour shape of the cell nucleus candidate area is a perfect circle. As the contour shape becomes more complex, the value is obtained as a smaller value.

$$\text{Roundness} = 4\pi \times \text{size of area}/\text{peripheral length} \quad (5)$$

The length of the major axis and the length of the minor axis are calculated as a length of the major axis and a length of the minor axis when the circumscribing rectangle circumscribing the cell nucleus candidate area has the smallest size of area.

The aspect ratio is a ratio between the length of the major axis and the length of the minor axis. For example, it is calculated according to the following Formula (6).

$$\text{aspect ratio} = \text{length of major axis}/\text{length of minor axis} \quad (6)$$

The cell component identification processing unit 458 generates morphological characteristic data by associating each value of the morphological feature amount with the label (cell nucleus identification label) attached to the cell nucleus candidate area. For example, in the example of FIG. 21, labels (cell nucleus identification labels) which are different from each other are attached to two pixel groups B31, B33, and each of these pixel groups B31, B33 is obtained as the cell nucleus candidate area. Then, the morphological feature amount is calculated for each of these two cell nucleus candidate areas, and two records of morphological characteristic data are generated.

Subsequently, a determination is made as to whether the cell nucleus candidate area is an area of a cell nucleus on the basis of the generated morphological characteristic data as the processing of step d11. In general, the size of the cell nucleus is said to be about 10 μm. Accordingly, in the first embodiment, for example, when the value of each morphological feature amount corresponds to this size, the cell nucleus candidate area is determined to be an area of a cell nucleus. When the value of each morphological feature amount does not correspond to this size, the cell nucleus candidate area is determined not to be an area of a cell nucleus. In this case, the actual size of one pixel of the VS image can be obtained from the observation magnification and the size of one pixel (assumed to be square pixel) of the TV camera 32, and it is easy to convert the number of pixels into the actual size. A determination as to whether the cell nucleus candidate area is the area of the cell nucleus or not may be made by setting a standard value of the morphological feature amount of the cell nucleus appearing in the VS image as a reference value in advance and comparing the morphological feature amount with this reference value.

Subsequently, the following processings are performed as the processing of step d13. On the basis of the cell nucleus candidate area determined not to be an area of a cell nucleus, the map data of the cell nucleus are corrected, the morphological characteristic data of the cell nucleus candidate area thereof is deleted, and the map data of the cell nucleus and the morphological characteristic data are updated. For example, the pixel groups B31, B33 as illustrated in FIG. 21 are assumed to be as follows. The cell nucleus candidate area of the pixel group B31 is determined to be an area of a cell nucleus, but the cell nucleus candidate area of the pixel group B33 is determined not to be an area of a cell nucleus. That is, only the cell nucleus candidate area of the pixel group B31 is identified as the cell nucleus. In this case, the value of each pixel (square) constituting the pixel group B33 of FIG. 21 is corrected from "1" to "0" and the map data are updated. Then, one record of morphological characteristic data including the morphological characteristic data generated in step d9 of FIG. 20 and the label (cell nucleus identification label) of the cell nucleus candidate area of the pixel group B33 is deleted, and the morphological characteristic data are updated.

Subsequently, a case where the processing component is a cell membrane will be explained. The cell membrane is identified according to the same process sequence as the above process sequence where the processing component is the cell nucleus. However, when the processing component is a cell membrane, for example, a circumscribing rectangle, a barycenter, a thickness, a peripheral length, a roundness, a length of a major axis, a length of a minor axis, an aspect ratio, presence/absence (number) of nucleus, and the like are calculated as a morphological feature amount in step d9 of FIG. 20, and morphological characteristic data are generated. FIG. 24 is a diagram illustrating an example of the data configuration of morphological characteristic data of a cell membrane. In this case, the cell membrane forms the outermost layer of a cell, and has a predetermined thickness. The thickness calculated as a morphological feature amount of the cell membrane corresponds to the thickness of the cell membrane candidate area in the diameter direction. For example, a circumscribing rectangle, a barycenter, a peripheral length, a roundness, a length of a major axis, a length of a minor axis, and an aspect ratio are calculated on the basis of an outer contour. The method of calculation is the same as the method used for the cell nucleus. The presence/absence of nucleus includes a setting indicating whether there is an area of a cell nucleus inside of a cell membrane candidate area (or indicating the number thereof). When a cell nucleus is included as a cell component to be identified, the presence/absence of nucleus (number) can be set by looking up the map data of the cell nucleus generated according to the above process. More specifically, when an area of a cell nucleus is included inside of a cell membrane candidate area, "present (or the number thereof)" is set in the presence/absence of nucleus. On the other hand, when an area of a cell nucleus is not included inside of a cell membrane candidate area, "absent" is set in the presence/absence of nucleus.

For example, a range of thickness of a standard cell membrane is set in advance, and when the value of the thickness calculated as one of the morphological feature amounts is within this range, the cell membrane candidate area is determined to be an area of a cell membrane. When the value of the thickness is not included in this range, the cell membrane candidate area is determined not to be an area of a cell membrane. Alternatively, a range of a size of a standard cell may be set in advance, and when the value of each morphological feature amount corresponds to this size, the cell membrane candidate area may be determined to be an area of a cell membrane. When the value of each morphological feature amount does not correspond to this size, the cell membrane candidate area may be determined not to be an area of a cell membrane. Alternatively, when the cell component to be identified includes a cell nucleus, and the presence/absence of nucleus is already obtained as a morphological feature amount, the determination may be made as follows. When "present" is set, it is determined to be an area of a cell membrane. When "absent" is set, it is determined not to be an area of a cell membrane.

Subsequently, a case where the processing component is a cytoplam will be explained. The cytoplam is identified according to the same process sequence as the above process sequence where the processing component is the cell nucleus or the cell membrane. However, when the processing component is a cytoplam, for example, a circumscribing rectangle, a barycenter, a size of an area, a peripheral length, a roundness, a length of a major axis, a length of a minor axis, an aspect ratio, presence/absence (number) of nucleus, and the like are calculated as a morphological feature amount in step d9 of FIG. 20, and morphological characteristic data are generated. In this case, the cytoplam is inside of the cell membrane, and forms an area except the area of the cell nucleus. Therefore, for example, each of the values of the morphological feature amounts is calculated on the basis of an outer contour. The method of calculation is the same as the method used for the cell nucleus or the cell membrane.

For example, the area of the cytoplam can be determined by looking up the map data of the cell nucleus and/or the map data of the cell membrane generated according to the above process. This method of determination is based on the assumption that at least the cell nucleus or the cell membrane is included as the component to be identified. More specifically, when there is an area of a cell membrane outside of the cytoplam candidate area, the cytoplam candidate area is determined to be an area of a cytoplam. When there is no area of a cell membrane outside of the cytoplam candidate area, the cytoplam candidate area is determined not to be an area of a cytoplam. Alternatively, when there is an area of a cell nucleus inside of the cytoplam candidate area, the cytoplam candidate area is determined to be an area of a cytoplam. When there is no area of a cell nucleus inside of the cytoplam candidate area, the cytoplam candidate area is determined not to be an area of a cytoplam. Alternatively, when there is an area of a cell membrane outside of the cytoplam candidate area, and there is an area of a cell nucleus inside of the cytoplam candidate area, the cytoplam candidate area may be determined to be an area of a cytoplam.

Referring back to FIG. 20, subsequently, the cell component identification processing unit 458 generates a list of position coordinates of pixels in which "1" is set in the map data (pixel position list) for each allocated label (step d15), and finishes the processing of the loop A with respect to the processing component.

Then, when the processing of the loop A is performed adopting all the cell components to be identified as the processing components, the cell component identification processing is finished. Then, step b7 of FIG. 16 is subsequently performed, and then step b9 is subsequently performed.

Figure 25:
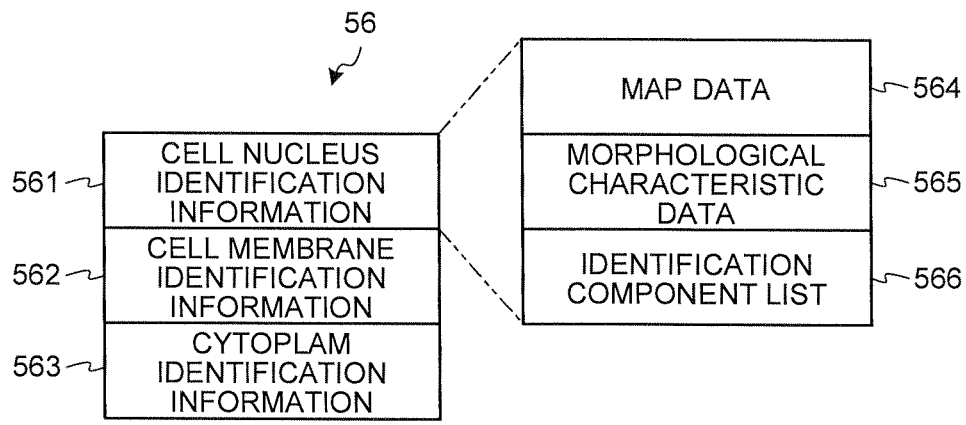
FIG. 25 is a diagram illustrating an example of the data configuration of identification component information.

FIG. 25 is a diagram illustrating an example of the data configuration of the identification component information 56 (see FIG. 15) set in the VS image file 5 that is obtained as the result of the cell component identification processing. As illustrated in FIG. 25, the identification component information 56 includes cell nucleus identification information 561, cell membrane identification information 562, and cytoplam identification information 563. These cell nucleus identification information 561, the cell membrane identification information 562, and the cytoplam identification information 563 have the same data configuration, and as illustrated in FIG. 25, each includes map data 564, morphological characteristic data 565, and an identification component list 566.

Figure 26:
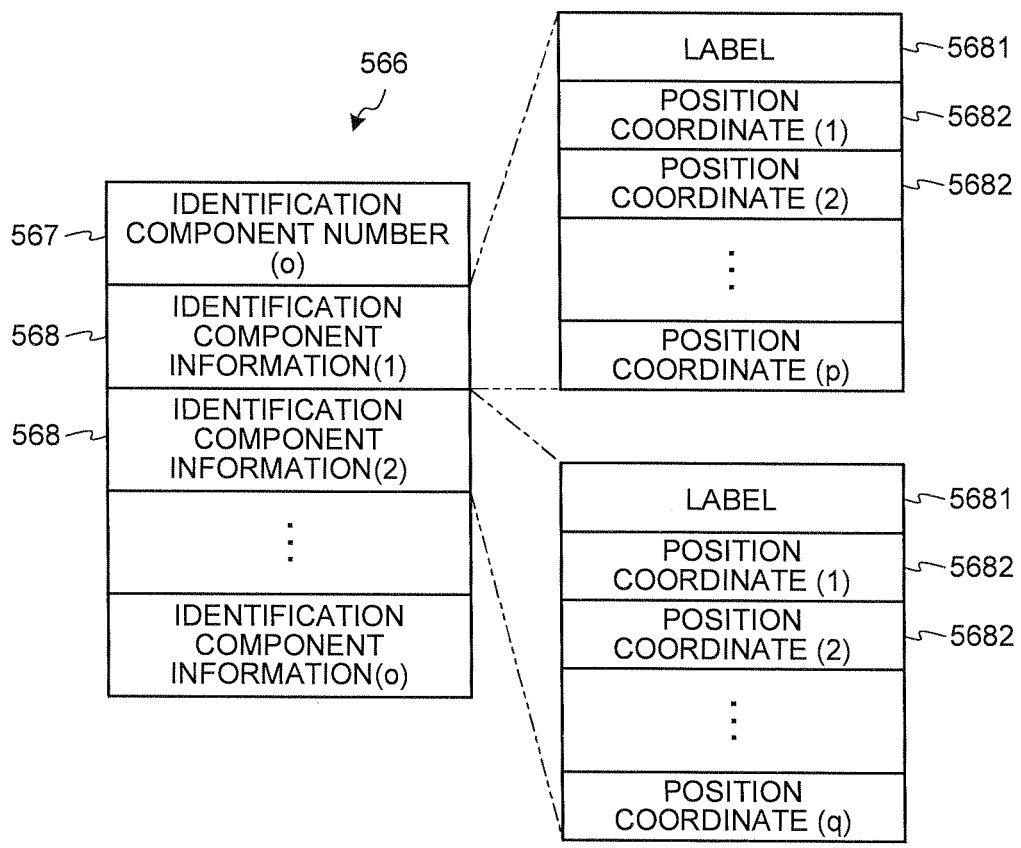
FIG. 26 is a diagram illustrating an example of the data configuration of a list of identification components.

FIG. 26 is a diagram illustrating an example of the data configuration of the identification component list 566. As illustrated in FIG. 26, the identification component list 566 includes an identification component number 567 and identification component information (1) to (o) 568 of the number that corresponds to the identification component number 567.

In the identification component number 567, the number of identified, corresponding cell components is set. For example, the identification component number 567 set in the identification component list 566 of the cell nucleus identification information 561 includes the number of areas determined to be the area of the cell nucleus. Information about the area of cell nucleus are set in the identification component information (1) to (o) 568. More specifically, in each of the identification component information (1) to (o) 568, a label (cell nucleus identification label) 5681 attached to the area of the cell nucleus and position coordinates (1) to (p)/(1) to (q) 5682, i.e., pixel position list within the area of the cell nucleus, are set.

In the first embodiment, the morphological characteristic data 565 of the cell nucleus and the map data 564 of the cell nucleus that is generated in steps d7 and d9 and is corrected and updated in step d13 are set as the cell nucleus identification information 561. In the identification component list 566, the area number of the cell nucleus is set as the identification component number 567. In each of the identification component information (1) to (o) 568, the label (cell nucleus identification label) 5681 attached to the area of the cell nucleus is set, and the pixel positions list of the cell nucleus generated in step d15 are set as the position coordinates (1) to (p)/(1) to (q) 5682. Likewise, the morphological characteristic data 565 of the cell membrane and the map data 564 of the cell membrane that is generated in steps d7 and d9 and is corrected and updated in step d13 are set as the cell membrane identification information 562. In the identification component list 566, the area number of the cell membrane is set as the identification component number 567. In each of the identification component information (1) to (o) 568, the label (cell membrane identification label) 5681 attached to the area of the cell membrane is set, and the pixel position list of the cell membrane generated in step d15 is set as the position coordinates (1) to (p)/(1) to (q) 5682. It should be noted that in the first embodiment, the cell nucleus and the cell membrane are identified. Accordingly, no particular value is set in the cytoplam identification information 563.

Referring back to FIG. 16, in step b9 subsequent thereto, the cell recognizing unit 459 recognizes the cell area of the VS image on the basis of the area in the cell component identified by the cell component identification processing unit 458 in step b7 of FIG. 16.

In this case, the cell has a cytoplam inside of the cell membrane forming the outermost layer. In the cytoplam, there is one cell nucleus in general. When a plurality of cells are fused and a portion of a cell membrane disappears, a cell clump enclosed by one cell membrane may be formed. Therefore, in the target specimen S, such cell clump may exist. In other words, a plurality of cell nucleuses may exist inside of one cell membrane. In the first embodiment, the cell membrane, the cell nucleus and the cytoplam existing inside of the cell membrane are adopted as one cell, and the area enclosed by the cell membrane is recognized as one cell area (including the area of the cell clump).

The process sequence is as follows. The map data 564 of the cell nucleus identification information 561, the cell membrane identification information 562, and the cytoplam identification information 563 generated about the cell nucleus, the cell membrane, and the cytoplam or the position coordinates (1) to (p)/(1) to (q) 5682 (see FIGS. 25 and 26) are looked up to recognize one cell area, and the unique label (cell identification label) for identifying each cell is attached to each cell area.

Figure 27:
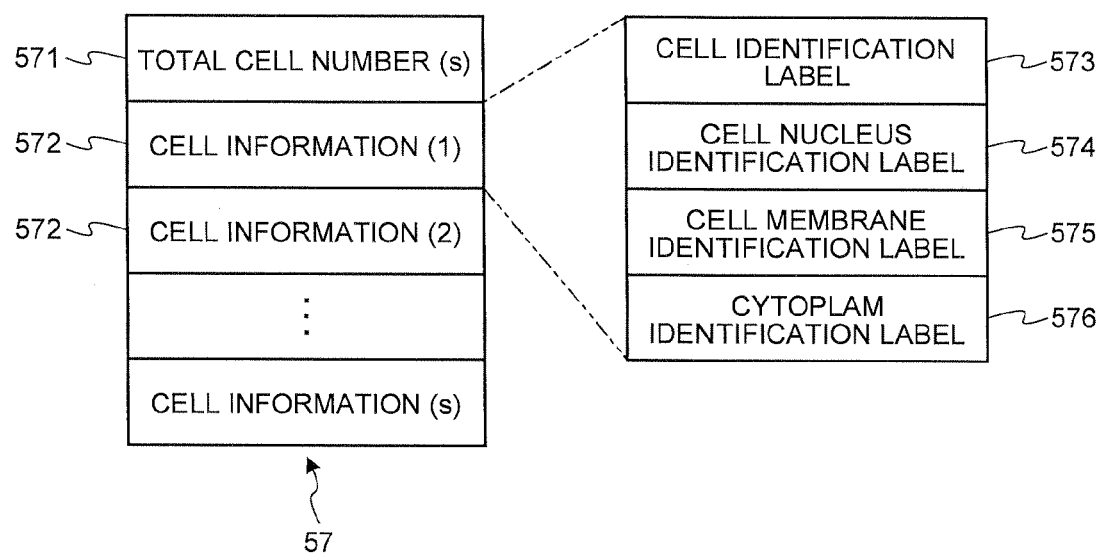
FIG. 27 is a diagram illustrating an example of the data configuration of a cell list table.

FIG. 27 is a diagram illustrating an example of the data configuration of the cell list table 57 (see FIG. 15) set in the VS image file 5 that is obtained as the result of the processing of step b9. As illustrated in FIG. 27, the cell list table 57 includes a total cell number 571 and cell information (1) to (s) 572 of the number that corresponds to the total cell number 571.

In the total cell number 571, the number of recognized cell areas in the VS image is set. Information about the areas of the cell nucleuses is set in the cell information (1) to (s) 572, respectively. More specifically, in the cell information (1) to (s) 572, a cell identification label 573, a cell nucleus identification label 574, a cell membrane identification label 575, and a cytoplam identification label 576 are set. In the cell identification label 573, the cell identification label attached to the cell is set. In the cell nucleus identification label 574, the label (cell nucleus identification label) attached in the cell component identification processing in step b7 of FIG. 16 to the cell nucleus constituting the cell is set. In the cell membrane identification label 575, the label (cell membrane identification label) attached in the cell component identification processing in step b7 of FIG. 16 to the cell membrane constituting the cell is set. In the cytoplam identification label 576, the label (cytoplam identification label) attached in the cell component identification processing in step b7 of FIG. 16 to the cytoplam constituting the cell is set.

Figure 28:
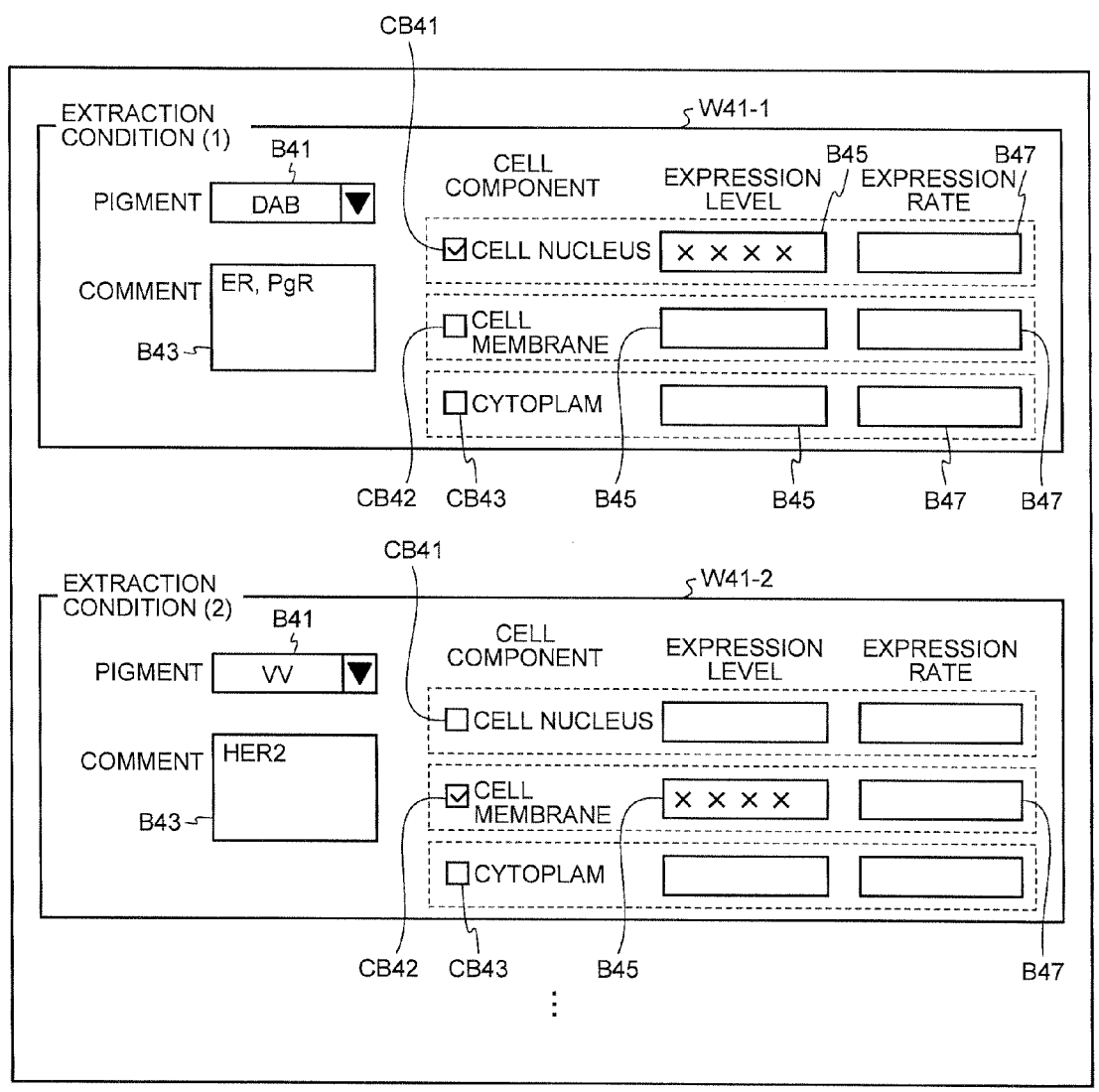
FIG. 28 is a diagram illustrating an example of an extraction condition setting screen.

Subsequently, as illustrated in FIG. 16, the target molecule expression portion extraction unit 460 executes a process of displaying, on the display unit 43, a notification of a setting request of an extraction condition with which a target molecule expression portion is extracted (step b11). For example, an extraction condition setting screen is displayed on the display unit 43, and the setting request of the extraction condition is notified. On the extraction, condition setting screen, the setting operation of the extraction condition is received from the user. FIG. 28 is a diagram illustrating an example of the extraction condition setting screen.

As illustrated in FIG. 28, the extraction condition setting screen includes a plurality of extraction target molecule setting screens W41 having the same configuration (in FIG. 28, two extraction target molecule setting screens W41-1, W41-2). In this extraction target molecule setting screen W41, the user sets an expression state of the target molecule as the extraction condition. One or more extraction target molecule setting screens W41 may be provided. When an appropriate number of extraction target molecule setting screens W41 are provided, a screen configuration can be achieved in which the expression state can be set as the extraction condition for one or more target molecules.

The extraction target molecule setting screen W41 has a dropdown box B41 for selecting a pigment (molecule target pigment) of a molecule target staining applied to the target specimen S in order to label the target molecule, and also has a comment display field B43 below the dropdown box B41.

The dropdown box B41 provides a list of molecule target pigments set as the staining pigments in step c3 of FIG. 17 as options, and prompts the user to make selection. In the first embodiment, the DAB pigment, the VV pigment, and the VR pigment are presented as three options. In the dropdown box B41, the user sets which staining pigment of staining pigments staining the target specimen S is the molecule target pigment for labeling the target molecule. When the molecule target pigment set as the staining pigment includes the cell component identification pigment, the options may be presented in such a manner that this cell component identification pigment is excluded from the options. In this configuration, in the first embodiment, two pigments, i.e., the DAB pigment and the VV pigment are presented as options. This makes user's operation easier.

The comment display field B43 illustrates the comment information such as the names of the antibody and the antigen (target molecule) that is input in the above pigment registration screen (see FIG. 18) with respect to the molecule target pigment selected in the dropdown box B41. Therefore, even when a plurality of different molecule target stainings are applied to the target specimen to be observed and diagnosed, and different target molecules a labeled, the user can select a molecule target pigment for labeling a desired target molecule in the corresponding dropdown box B41 in view of the comment display field B43.

The extraction target molecule setting screen W41 has three check boxes CB41, CB42, CB43 for selecting a cell component in which the target molecule is expressed, and for each of these three check boxes CB41, CB42, CB43, two input boxes B45, B47 are provided. It should be noted that those that can be checked in these check boxes CB41, CB42, CB43 are limited to the cell components treated as the identification targets in the cell component identification processing explained with reference to FIG. 20. Therefore, a check box for a cell component that is not an identification target (for example, cytoplam in the first embodiment) may be configured to be unselectable. This improves user's ease of operation.

The input box B45 is prepared to set an expression level of the target molecule on the corresponding cell component as an extraction condition. When the target molecule expression portion is extracted in step b13 of FIG. 16 explained later, this expression level is used as a reference for determining whether the target molecule is expressed or not. For example, the user inputs, to this input box B45, the value of the pigment amount of the selected molecule target pigment as the expression level of the target molecule. According to this, pixels in the corresponding cell component area whose pigment amounts of the selected molecule target pigment are equal to or more than the desired pigment amount can be extracted as the pixels in which the target molecule is expressed.

When the target molecule expressed within the target specimen S is observed and diagnosed, not only the cell component on which the target molecule is expressed but also the expression level may be important in some cases. For example, even a target molecule expressed on a predetermined cell component may cause problem if the expression level is high, and may not cause problem if the expression level is low, and vice versa. In such case, for example, the user inputs, into the input box B45, a range of the pigment amount of the selected molecule target pigment, as the expression level of the target molecule. In this case, an area in which the target molecule is expressed on the corresponding cell component with the desired expression level (i.e., pixels in the corresponding cell component area whose pigment amounts of the selected molecule target pigment are within the pigment amount input into the input box B45) can be extracted as the target molecule expression portion. It should be noted that when the user wants to simply extract pixels including the pigment amount of the molecule target pigment as the target molecule expression portion, the user may not input any value into the input box B45.

The input box B47 is used to set an expression rate of the target molecule on the corresponding cell component as an extraction condition. When the target molecule expressed within the target specimen S is observed and diagnosed, not only the expression level but also approximately how much area on the predetermined cell component is occupied by the target molecule may be important in some cases. In such case, the user inputs the value of the expression rate of the target molecule on the cell component into the input box B47. For example, when the user wants to use a condition where the target molecules are expressed in 10% of the area or more in the cell membrane, the check box CB42 of the cell membrane is checked, and "10% or more" is input to the corresponding input box B47. It should be noted that when the user wants to simply extract target molecules expressed on the cell component, the user may not input any value into the input box B47.

In the extraction condition setting screen having the above configuration, the user sets the extraction condition for each target molecule expression portion to be extracted. More specifically, the user sets the extraction condition by selecting the molecule target pigment for labeling the target molecule, selecting the cell component on which the target molecule is expressed, and inputting the expression level and the expression rate on the cell component selected as necessary.

As described above, the target specimen S to be observed and diagnosed in the first embodiment is labeled by color formation though the DAB reaction using the anti-ER antibody for recognizing estrogen receptor (ER) and the anti-PgR antibody for recognizing progesterone receptor (PgR) as molecule target staining, and labeled by VV pigment with using the anti-HER2 antibody for recognizing HER2 receptor (HER2). Then, each cell area in the VS image obtained by capturing the target specimen S is classified into a cell variant defined by a combination of presence/absence of expression of the ER and/or PgR on the cell nucleus and presence/absence of expression of the HER2 on the cell membrane. Accordingly, in the first embodiment, a portion where the ER and/or PgR is expressed on the cell nucleus is adopted as the first target molecule expression portion, and a portion where the HER2 is expressed on the cell membrane is adopted as the second target molecule expression portion. Then, as an extraction condition (1) corresponding to the first target molecule expression portion, the DAB pigment is selected in the dropdown box B41 of the extraction target molecule setting screen W41-1. The check box CB41 is checked to select the cell nucleus, and the value of the pigment amount of the DAB pigment at which the target molecule is determined to be expressed is input to the input box B45. If necessary, the value of the expression rate is input to the input box B47. Further, as an extraction condition (2) corresponding to the second target molecule expression portion, the VV pigment is selected in the dropdown box B41 of the extraction target molecule setting screen W41-2. The check box CB42 is checked to select the cell membrane, and the value of the pigment amount of the VV pigment at which the target molecule is determined to be expressed is input to the input box B45. If necessary, the value of the expression rate is input to the input box B47.

The extraction condition setting screen does not prohibit the user from selecting the same molecule target pigment in the dropdown boxes B41 of different extraction target molecule setting screens W41. In other words, for example, the user may want to respectively extract both of the same target molecules expressed on the cell membrane and expressed on the cytoplam as the target molecule expression portions. In such case, for example, the molecule target pigment for labeling the target molecule is selected in the dropdown box B41 of the extraction target molecule setting screen W41-1, and the check box CB42 is checked to select the cell membrane. Further, the same molecule target pigment is selected in the dropdown box B41 of the extraction target molecule setting screen W41-2, and the check box CB43 is checked to select the cytoplam.

Referring back to FIG. 16, the target molecule expression portion extraction unit 460 sets the extraction condition on the basis of the contents input by the user on the extraction condition setting screen as described above (step b13). In the first embodiment, two extraction conditions are set. The two extraction condition includes the extraction condition (1) and extraction condition (2). In the extraction condition (1), the molecule target pigment is the DAB pigment, the cell component is the cell nucleus, and the expression level on the cell nucleus is an input value. In the extraction condition (2), the molecule target pigment is the VV pigment, the cell component is the cell membrane, and the expression level on the cell membrane is the input value. When there is an input to the input box B47 in the extraction condition setting screen of FIG. 28, the extraction condition may be set using the input value as the expression rate on the cell nucleus or the cell membrane.

Then, the target molecule expression portion extraction unit 460 performs processing for extracting the target molecule expression portion according to the extraction condition set in step b11 (target molecule expression portion extraction processing), and generates a target molecule expression portion map (step b15).

Now, the principle of the target molecule expression portion extraction processing will be explained. In the target molecule expression portion extraction processing, the target molecule expression portion extraction unit 460 first reads, according to the extraction condition, the map data 564 of the cell component having been set (see FIG. 25).

Subsequently, the target molecule expression portion extraction unit 460 generates, according to the extraction condition, an expression state map on the basis of the pigment amount of the molecule target pigment having been set. More specifically, a pixel that include the pigment amount of the molecule target pigment having been set and in which the value of the pigment amount is equal to or more than the value of the expression level having been set is selected as an expression portion candidate pixel. Alternatively, a pixel that include the pigment amount of the molecule target pigment having been set and in which the value of the pigment amount is within the value of the expression level having been set is selected as an expression portion candidate pixel. When the expression level is not set, a pixel that includes the pigment amount of the molecule target pigment having been set may be selected as an expression portion candidate pixel. Then, an expression state map in which "1" is set to the selected pixel position is generated.

Then, each expression portion candidate pixel having "1" in the map data 564 of the cell component having been set and having "1" in the expression state map is extracted as a pixel of the target molecule expression portion, and thus, a target molecule expression portion map is generated. In this case, when the expression rate is set as the extraction condition, the expression rate is calculated for each cell component attached with the same label (cell nucleus identification label/cell membrane identification label/sebaceous identification label). More specifically, the cell component attached with the same label are adopted as the process target in order, and on the basis of the pixel number in the area of the cell component to be processed, the ratio of the expression portion candidate pixels number in the area of the cell component to be processed is calculated, whereby the expression rate in the cell component to be processed is obtained. It should be noted that the expression rate may be calculated in view of the expression level. That is, in the area of the cell component to be processed, the number of expression portion candidate pixels whose expression levels are equal to or more than the predetermined expression level set in advance (i.e., the value of the pigment amount is equal to or more than a predetermined value set in advance) may be counted. It may be possible to obtain the expression rate by calculating a ratio of the counted number with respect to the number of pixels in the area of the cell component to be processed. When the value of the calculated expression rate is determined to be equal to or more than the value of the expression rate having been set, the expression portion candidate pixel in the area of the cell component to be processed is extracted as a pixel in the area of the target molecule expression portion.

Figure 29C:
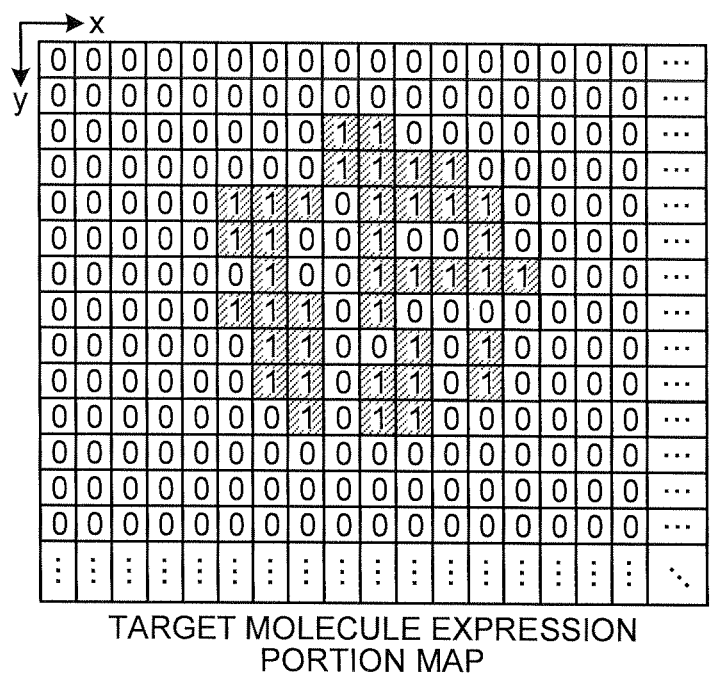

FIGS. 29A to 29C are explanatory diagrams illustrating the principle of target molecule expression portion extraction processing according to the first embodiment. FIG. 29A illustrates an example of the map data 564 of the cell nucleus. FIG. 29B is an example of an expression state map generated according to the extraction condition (1). FIG. 29C is an example of a target molecule expression portion map.

In the first embodiment, first, the map data 564 of the cell nucleus as illustrated in FIG. 29A is read according to the extraction condition (1). Subsequently, as illustrated in FIG. 29B, an expression portion candidate pixel that includes the pigment amount of the DAB pigment and in which the value thereof is equal to or more than the value of the expression level having been set is selected from among the pixels of the VS image, and an expression state map is generated in which "1"s are set in the selected expression portion candidate pixels. Then, as illustrated in FIG. 29C, each expression portion candidate pixel having "1" in the map data 564 of the cell nucleus and having "1" in the expression state map is extracted as a pixel in the area of the target molecule expression portion. As a result, the target molecule expression portion map about the extraction condition (1) in which "1"s are set in the pixels in the area of the target molecule expression portion can be obtained. According to the same process, an expression state map for the VV pigment is also generated, which is not illustrated. Then, on the basis of the map data 564 of the cell membrane and the generated expression state map, the pixels in the area of the target molecule expression portion are extracted, and a target molecule expression portion map about the extraction condition (2) is obtained.

The principle of the target molecule expression portion extraction processing has been hereinabove explained. However, in the actual target molecule expression portion extraction processing, the target molecule expression portion is extracted for each cell component attached with the same label (cell nucleus identification label/cell membrane identification label/cytoplam identification label). More specifically, when an expression portion candidate pixel is included in an area of a cell component, the cell component is adopted as a cell component including a target molecule expression portion (hereinafter referred to as "positive cell component"), and the expression portion candidate pixel is extracted as a pixel in the area of the target molecule expression portion. For example, when the cell component having been set is a cell membrane, the cell membrane identification information 562

(see FIG. 25) is looked up. Then, for each identification component information (1) to (o) 568 (see FIG. 26) set in the identification component list 566, a pixel in the area of the target molecule expression portion is extracted according to whether each pixel in the position coordinates (1) to (p)/(1) to (q) 5682 has been extracted as an expression portion candidate pixel or not.

FIG. 30 is a diagram illustrating an example of the data configuration of the target molecule expression portion information 58 (see FIG. 15) set in the VS image file 5 that is obtained as the result of the target molecule expression portion extraction processing. As illustrated in FIG. 30, the target molecule expression portion information 58 includes an extraction target molecule number 581 and extraction target molecule information (1) to (j) 582 of the number that corresponds to the extraction target molecule number 581.

In the extraction target molecule number 581, the number of extracted target molecule expression portions, i.e., the number of extracted conditions set in step b13, is set. Then, information about each target molecule expression portion is respectively set in the extraction target molecule information (1) to (j) 582. More specifically, in the extraction target molecule information (1) to (j) 582, a target molecule expression portion map 583, and a positive cell component list 584 are set.

The positive cell component list 584 includes a positive cell component number 585 and positive cell component information (1) to (k) 586 of the number that corresponds to the positive cell component number 585.

In the positive cell component number 585, the number of cell components (positive cell components) including the target molecule expression portion is set. Then, information about each positive cell component is set to the positive cell component information (1) to (k) 586. More specifically, in each of the positive cell component information (1) to (k) 586, the label attached to the area of a positive cell component 587 (when the cell component including the target molecule expression portion is the cell nucleus, the cell nucleus identification label attached to the cell nucleus is set. When the cell component including the target molecule expression portion is the cell membrane, the cell membrane identification label is set. When the cell component including the target molecule expression portion is the cytoplam, the cytoplam identification label is set) and the position coordinates (1) to (l) 588, i.e., pixel position list of the target molecule expression portion within the area of the cell component, are set.

Figures 31, 32:
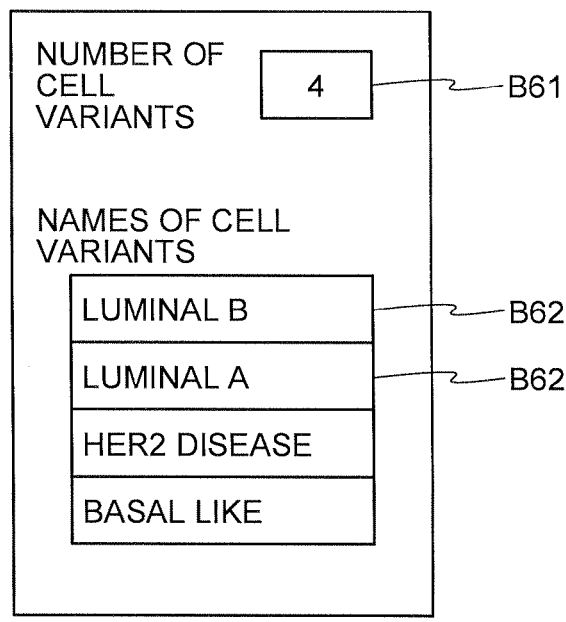
FIG. 31 is a diagram illustrating an example of a name setting screen.
FIG. 32 is a diagram illustrating an example of expression pattern setting screen.

Subsequently, as illustrated in FIG. 16, the cell variant setting unit 461 executes a process of displaying, on the display unit 43, a notification of a setting request of a cell variant (step b17). For example, the name setting screen and the expression pattern setting screen are displayed on the display unit 43 as the cell variant setting screen in order. Then, a setting request of a cell variant is notified, and on the name setting screen and the expression pattern setting screen, user's setting operation of a cell variant is received. FIG. 31 is a diagram illustrating an example of a name setting screen. FIG. 32 is a diagram illustrating an example of an expression pattern setting screen.

The name setting screen as illustrated in FIG. 31 has an input box B61 for inputting the number of cell variants to be set, and also has an input box B62 for inputting the names of cell variants to be set (cell variant names). In this case, for example, the input boxes B62 as many as the number of cell variants input into the input box B61 are displayed, and input of the cell variant names of the cell variants is received. In the first embodiment, as illustrated in FIG. 31, "4" is input to the input box B61, and the cell variant names are respectively input into the four input boxes B62, so that each cell area in the VS image is classified into four cell variants, i.e., "Luminal B", "Luminal A", "HER2 disease", and "Basal like" as described above.

Dropdown boxes B63 for selecting presence/absence of expression of the target molecules labeled by the molecule target pigments set in step c3 of FIG. 17 are arranged in the expression pattern setting screen as illustrated in FIG. 32 for each cell variant whose cell variant name is input in the name setting screen of FIG. 31. The dropdown box B63 illustrates three options, i.e., "O: target molecule is expressed", "X: target molecule is not expressed", "–: irrelevant", and prompts the user to make selection.

In the expression pattern setting screen, for each of the four cell variants, the user selects presence/absence of expressions of the ER and/or PgR labeled by the DAB pigment, the HER2 labeled by the VV pigment, and the ESA labeled by the VR pigment, using the dropdown boxes B63 corresponding thereto, and sets an expression pattern of the target molecule for each cell variant. For example, the "Luminal B" is a cell variant for classifying a cell area in which the ER and/or PgR is expressed on the cell nucleus and the HER2 is expressed on the cell membrane. As illustrated in FIG. 32, in the "Luminal B", "O" is selected in the dropdown box B63-1 for selecting presence/absence of the expression of the ER and/or PgR, and "O" is selected in the dropdown box B63-2 for selecting presence/absence of the expression of the HER2. In the first embodiment, the VR pigment is a cell component identification pigment (more specifically, cell membrane identification pigment), and "–" is selected in the dropdown box B63-3 for selecting presence/absence of the expression of the ESA. Likewise, for the "Luminal A", the "HER2 disease", and the "Basal like", presence/absence of the expression of each target molecule is selected in the corresponding dropdown box B63 as illustrated in FIG. 32.

In FIG. 32, one set of expression pattern of target molecule is set for each cell variant. However, in some cases, a cell variant may be set to classify any one of corresponding cell area among a plurality of expression patterns of target molecule. In such case, a plurality of dropdown boxes B63 may be arranged for each cell variant in FIG. 32 so as to set a plurality of expression patterns of target molecules for one cell variant, so that a plurality of expression patterns of target molecules can be set for each cell variant.

Referring back to FIG. 16, the cell variant setting unit 461 sets the cell variants on the basis of the contents input by the user on the cell variant setting screen as described above (step b19). More specifically, the cell variant setting information 518 is generated in which the cell variant names and the expression patterns of target molecules of the cell variants are set, and the cell variant setting information 518 is set in the VS image file 5 (see FIG. 13).

Figure 33:
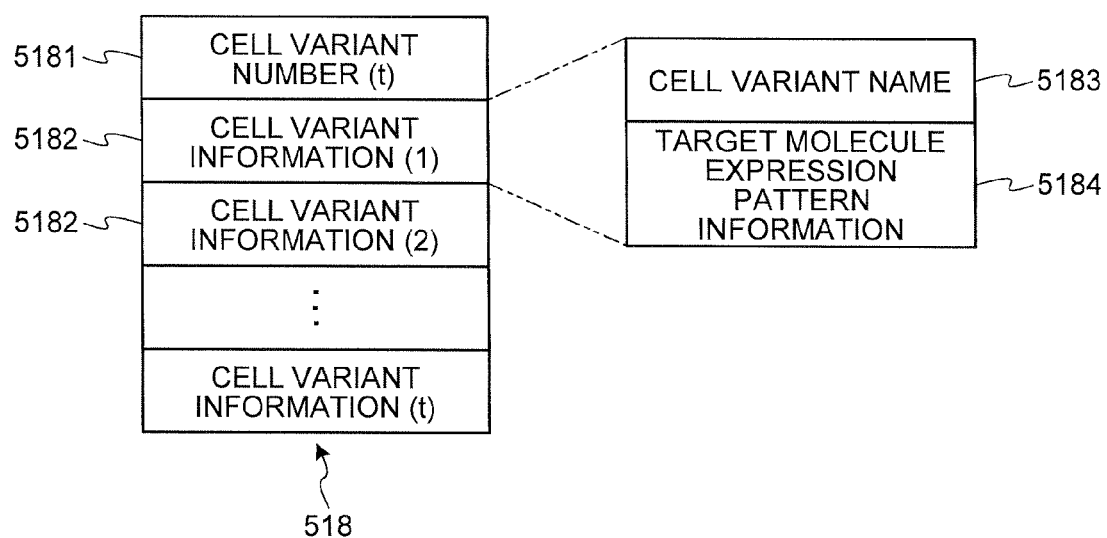
FIG. 33 is a diagram illustrating an example of the data configuration of a cell variant setting screen.

FIG. 33 is a diagram illustrating an example of the data configuration of the cell variant setting information 518. As illustrated in FIG. 33, the cell variant setting information 518 includes a cell variant number 5181 and cell variant information (1) to (t) 5182 of the number that corresponds to the cell variant number 5181. In the cell variant number 5181, a value input to the input box B61 is set in the name setting screen of FIG. 31. Each of cell variant information (1) to (t) 5182 includes a cell variant name 5183 and target molecule expression pattern information 5184. In the name setting screen of FIG. 31, the cell variant name input into the input box B62 is set in the cell variant name 5183. In the expression pattern setting screen of FIG. 32, a combination of presence/absence of the plurality of expressions of target molecules selected in the corresponding dropdown box B63 for the cell variant of the cell variant name 5183 is set in the target molecule expression pattern information 5184.

Subsequently, as illustrated in FIG. 16, the cell variant classification determining unit 462 determines the expression patterns of the target molecules for each cell area recognized in step b9, and performs processing for classifying each cell area into the cell variants set in step b19 (cell variant classification processing) (step b21).

Figure 34:
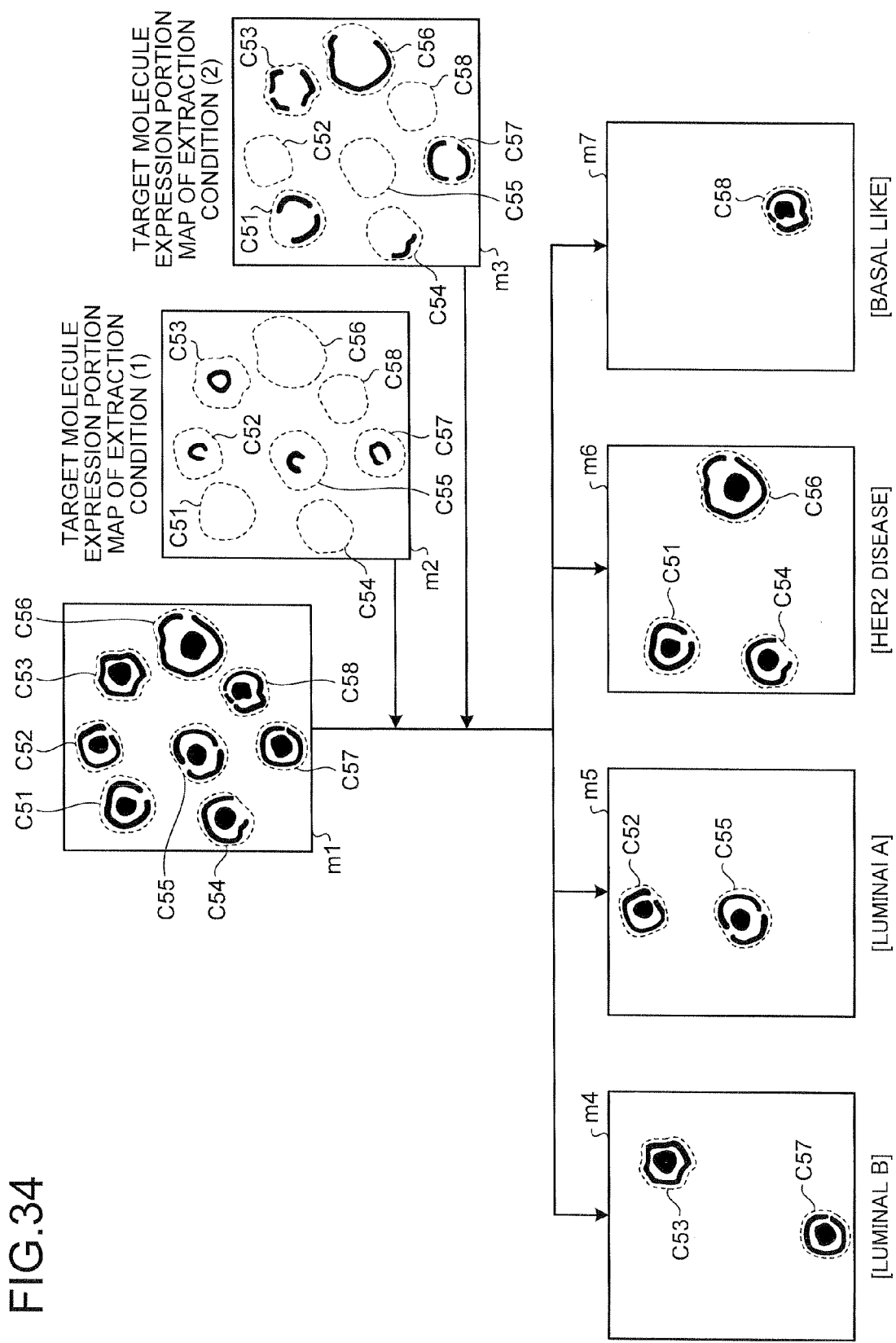
FIG. 34 is an explanatory diagram illustrating the principle of cell variant classification processing according to the first embodiment.

FIG. 34 is an explanatory diagram illustrating the principle of the cell variant classification processing according to the first embodiment. In this case, in a map m1, the map data 564 of the cell nucleus identification information 561 and the map data 564 of the cell membrane identification information 562 are overlaid, and eight cell areas C51 to C58 recognized using these map data 564 are illustrated by broken lines. A map m2 illustrates an example of a target molecule expression portion map of the extraction condition (1) (portions where the ER and/or PgR is expressed on the cell nucleus). A map m3 illustrates an example of a target molecule expression portion map of the extraction condition (2) (portions where the HER2 is expressed on the cell membrane).

In step b15 of FIG. 16, which is processing in a previous stage, portions in which a predetermined target molecule is expressed on a predetermined cell component are extracted as target molecule expression portion. In the cell variant classification processing of step b21, the cell variant classification determining unit 462 determines the expression patterns of the target molecules in each cell area according to the combination of the target molecule expression portions included in each cell area, and classifies each cell area into a cell variant corresponding to the expression patterns of the target molecules.

For example, a cell area C53 includes the target molecule expression portion in which the ER and/or PgR is expressed on the cell nucleus as illustrated in the map m2, and includes the target molecule expression portion in which the HER2 is expressed on the cell membrane as illustrated in the map m3. Therefore, as illustrated in the map m4, the cell area C53 is classified into "Luminal B". A cell area C57 is the same as above.

As illustrated in the map m2, a cell area C52 includes the target molecule expression portion in which the ER and/or PgR is expressed on the cell nucleus. On the other hand, as illustrated in the map m3, the cell area C52 does not include the target molecule expression portion in which the HER2 is expressed on the cell membrane. Therefore, the cell area C52 is classified into "Luminal A" as illustrated in the map m5. A cell area C55 is the same as above.

As illustrated in the map m2, a cell area C51 does not include the target molecule expression portion in which the ER and/or PgR is expressed on the cell nucleus. On the other hand, as illustrated in the map m3, the cell area C51 includes the target molecule expression portion in which the HER2 is expressed on the cell membrane. Therefore, the cell area C51 is classified into "HER2 disease" as illustrated in the map m6. Cell areas C54, C56 are the same as above.

A cell area C58 does not include the target molecule expression portion in which the ER and/or PgR is expressed on the cell nucleus as illustrated, in the map m2, and does not include the target molecule expression portion in which the HER2 is expressed on the cell membrane as illustrated in the map m3. Therefore, as illustrated in the map m7, the cell area C58 is classified into "Basal like".

In the first embodiment, all the cell areas are classified into any one of the cell variants, but depending on the expression patterns of the target molecules set as the cell variant, there may exist a cell area that is classified into none of the above. In such case, the cell area that is classified into none of the above is treated as, for example, "Others", and the subsequent processings are performed accordingly.

The principle of the cell variant classification processing has been hereinabove explained. However, in the actual cell variant classification processing, the expression patterns of the target molecules is determined for each cell area attached with the same cell identification label. More specifically, the cell variant classification determining unit 462 looks up the cell information (1) to (s) 572 (see FIG. 27) set in the cell list table 57 in order. Then, when the cell nucleus identification label 574, the cell membrane identification label 575, and the cytoplam identification label 576 respectively attached to the areas of the cell nucleus, the cell membrane, and the cytoplam constituting the cell area are set as any one of the labels 587 of the positive cell component information (1) to (k) 586 (see FIG. 30) in the positive cell component list 584 of the extraction target molecule information (1) to (j) 582 of the target molecule expression portion information 58, the cell area is determined to include the target molecule expression portion corresponding to the positive cell component information having been set. Then, on the basis of the combination of the target molecule expression portions that are determined to be included, a cell area that includes the target molecule expression portion of the target molecule set as "expressed" but does not include the target molecule expression portion of the target molecule set as "not expressed" in the target molecule expression pattern information 5184 (see FIG. 33) of the cell variant information (1) to (t) 5182 set in the cell variant setting information 518 is classified into the cell variant thereof.

Figure 35:
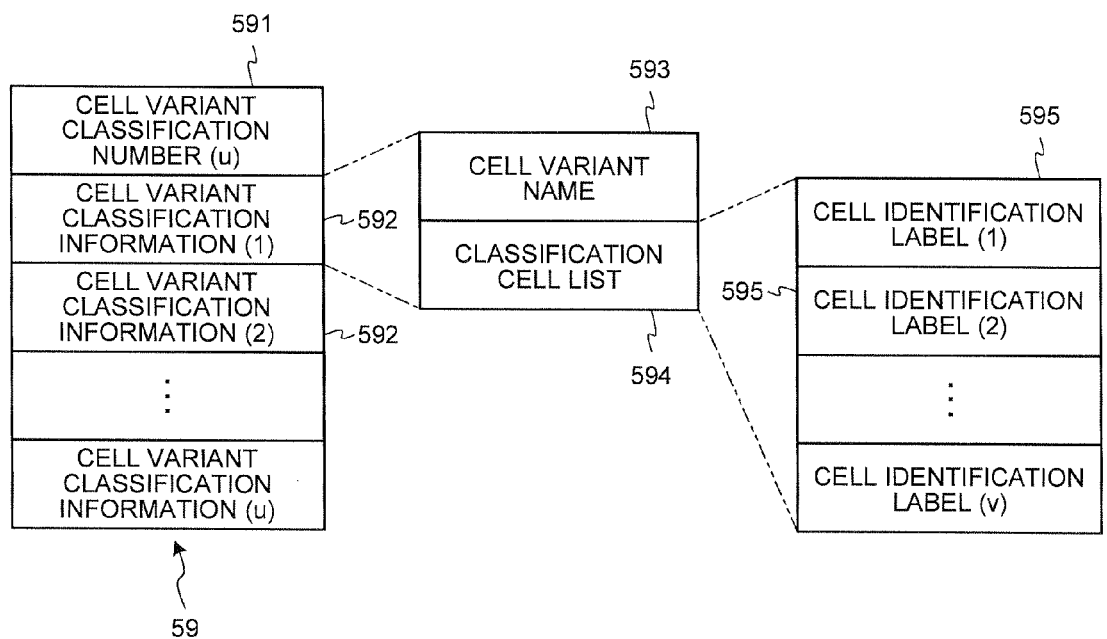
FIG. 35 is a diagram illustrating an example of the data configuration of a cell variant classification table.

FIG. 35 is a diagram illustrating an example of the data configuration of the cell variant classification table 59 (see FIG. 15) set in the VS image file 5 that is obtained as the result of the cell variant classification processing. As illustrated in FIG. 35, the cell variant classification table 59 includes a cell variant classification number 591 and cell variant classification information (1) to (u) 592 of the number that corresponds to the cell variant classification number 591.

In the cell variant, classification number 591, the number of cell variants set in step b19 of FIG. 16, i.e., the cell variant number 5181 as illustrated in FIG. 33, is set. Information about the cell areas classified into cell variants is set in the cell variant classification information (1) to (u) 592, respectively. More specifically, in each of the cell variant classification information (1) to (u) 592, a cell variant name 593 and a classification cell list 594 are set as illustrated in FIG. 35. In the classification cell, list 594, cell identification labels (1) to (v) 595 attached to cell areas classified into corresponding cell variants are set as the list of cell areas classified into cell variants of the cell variant name 593.

Figure 36:
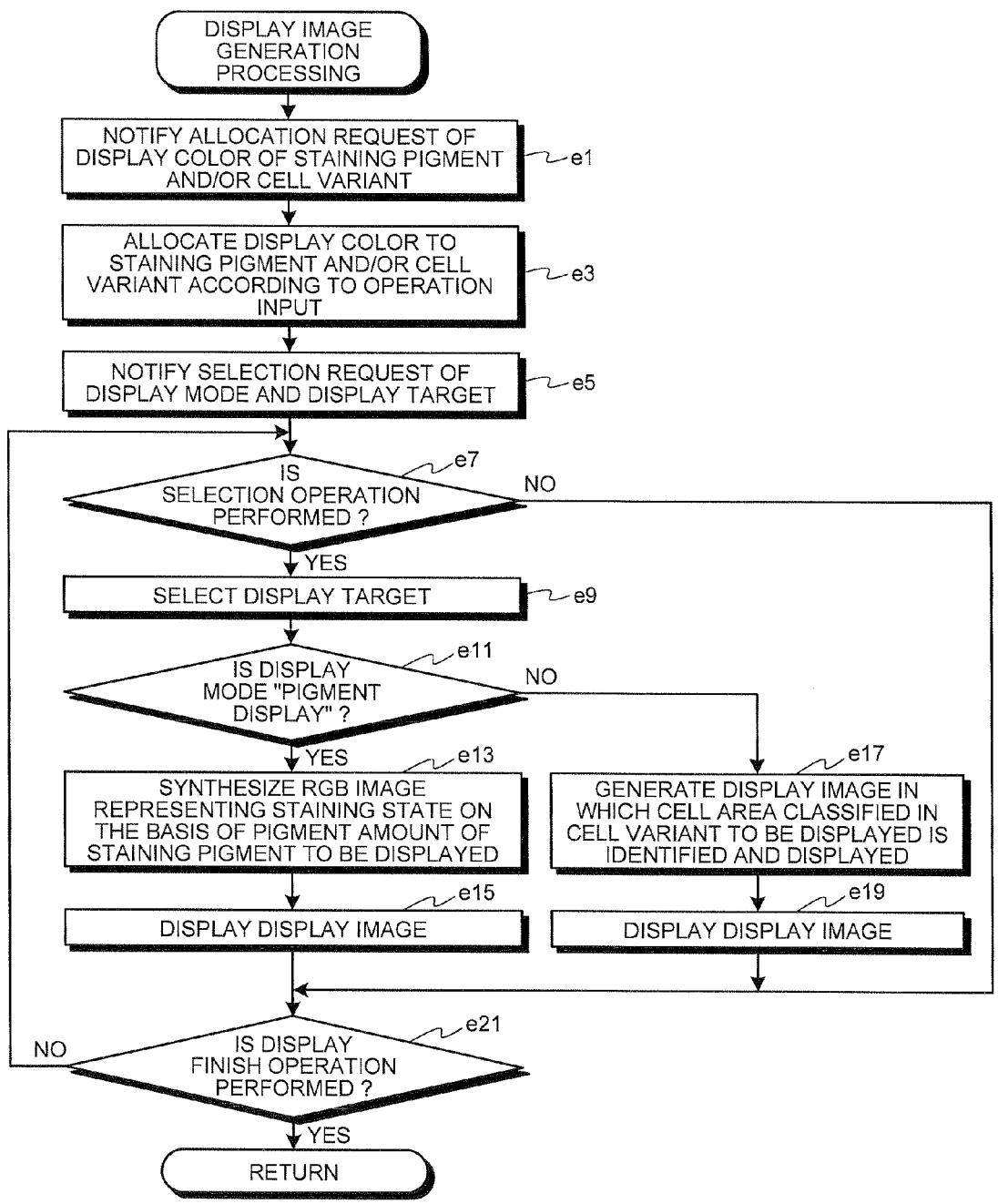
FIG. 36 is a flowchart illustrating a process sequence of display image generation processing.

When each cell area in the VS image is classified into the cell variants as described above, the display image generation processing is subsequently performed as illustrated in FIG. 16 (step b23). FIG. 36 is a flowchart illustrating a process sequence of display image generation processing.

As illustrated in FIG. 36, in the display image generation processing, first, the display image generating unit 463 executes a process of displaying a notification of an allocation request of a display color of a staining pigment and/or cell variant on the display unit 43 (step e1). For example, the display image generating unit 463 notifies a selection request of a display color by performing processing for displaying a display color selection screen on the display unit 43, and on the display color selection screen, user's selection operation of a display color is received.

Figure 37:
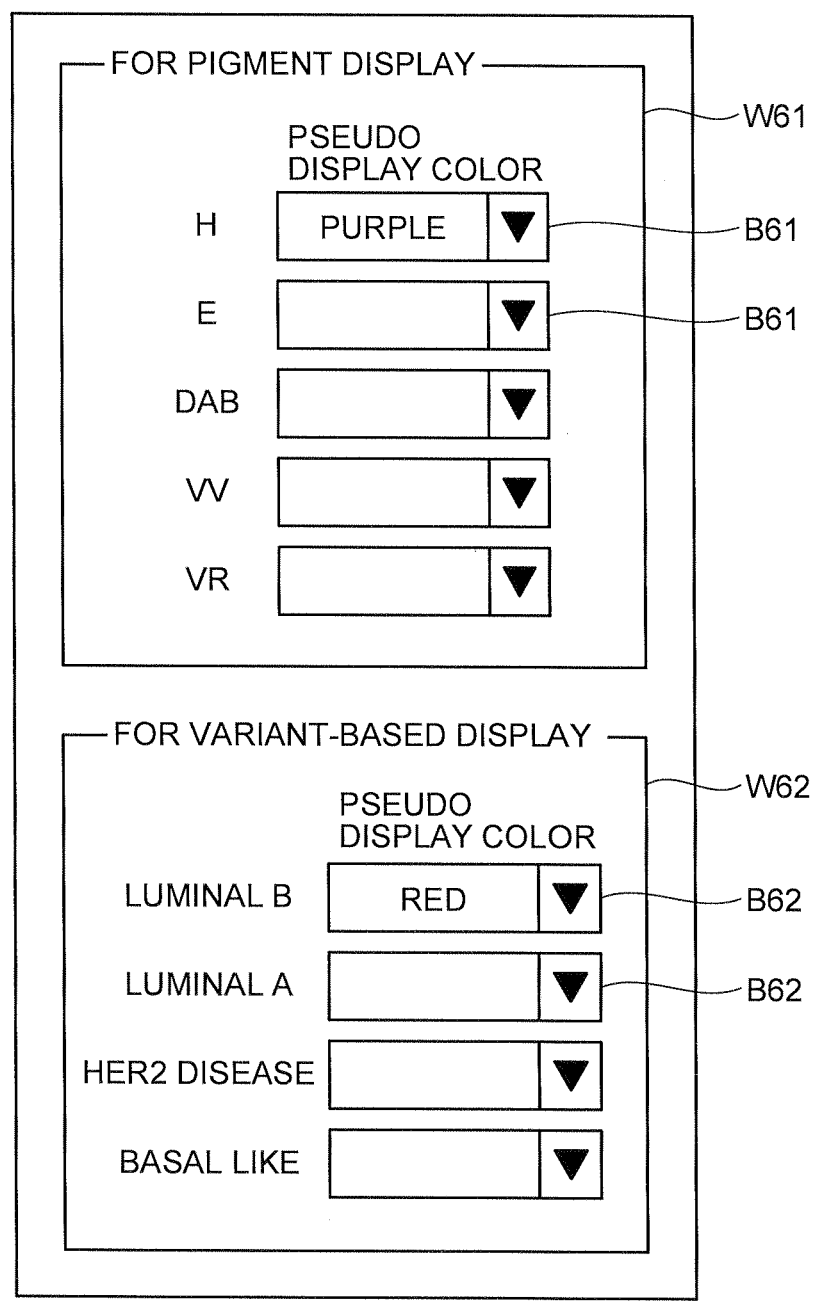
FIG. 37 is a diagram illustrating an example of a display color selection screen.

FIG. 37 is a diagram illustrating an example of a display color selection screen. As illustrated in FIG. 37, the display color selection screen includes display color selection screen W61 for displaying pigment and a display color selection screen W62 for displaying variant.

As explained later with reference to FIGS. 38 and 39, in the first embodiment, "pigment display" and "variant-based display" can be selected as a display mode. For example, when the "pigment display" is selected, and a staining pigment of a display target is selected, a display image representing the staining state of the staining pigment adopted as the display target is displayed. The cell variant adopted as the display target can be selected with a combination with this "pigment display". When the cell variant is selected, a display image representing the staining state of the staining pigment adopted as the display target is displayed with respect to the cell area classified into the cell variant adopted as the display target. In the display color selection screen W61 for pigment display as illustrated in FIG. 37, a display color is selected for a staining pigment whose staining state is to be represented in a color different from the color of the actual staining pigment. When the user wants to display the staining state in the same color as the color of the staining pigment, the display color may not be selected. In this configuration, even when the staining pigments are visualized in colors similar to each other, they can be displayed in such a manner that they can be easily identified, which enhances the visibility during observation.

On the other hand, when the "variant-based display" is selected to select the cell variant to be displayed, a display image is displayed in which the cell area classified into the cell variant adopted as the display target is identified and displayed in the display color. When the user selects the "variant-based display" and wants to display the cell areas in the VS image in different colors according to the classified cell variants, the display color is selected for each cell variant in the display color selection screen W62 for variant-based display. It should be noted that the staining pigment adopted as the display target can be selected with a combination with this "variant-based display". When the staining pigment is selected, a display image is displayed in which the cell area classified into the cell variant adopted as the display target is identified and displayed in the display color, on the display image representing the staining state of the staining pigment adopted as the display target.

More specifically, as illustrated in FIG. 37, the display color selection screen W61 for pigment display has dropdown boxes B61 for selecting display colors corresponding to the staining pigments. The dropdown box B61 provides a list of pseudo display colors whose spectrums are recorded in the pseudo display color data 475 as options, and prompts the user to make selection. In the first embodiment, five staining pigments, i.e., the H pigment, the E pigment, the DAB pigment, the VV pigment, and the VR pigment are adopted as the staining pigments, and in FIG. 37, five dropdown boxes B61 are respectively provided for the five staining pigments.

On the other hand, the display color selection screen W62 for variant-based display has dropdown boxes B62 for selecting display colors corresponding to the cell variants. The dropdown box B62 provides a list of display colors prepared in advance for displaying variants as options, and prompts the user to make selection. In the first embodiment, four cell variants, i.e., "Luminal B", "Luminal A", "HER2 disease", and "Basal like" are illustrated as cell variants, for example. In FIG. 37, the four dropdown boxes B62 are respectively provided for the four cell variants.

Then, as illustrated in FIG. 36, the display image generating unit 463 allocates a display color to the staining pigment and/or cell variant according to the user's operation input in response to the notification of the allocation request (step e3). Subsequently, the display image generating unit 463 performs processing for displaying, on the display unit 43, the notification of the selection request of the display mode and the notification of the selection request of the staining pigment and/or cell variant adopted as the display target (step e5). In response to the notification of the selection request, the user selects the display mode, and selects one or a plurality of staining pigments and/or cell variants as display targets.

In this case, when the user does not input selection operation in response to the notification of the selection request (step e7: No), step e21 is subsequently performed. On the other hand, when selection operation of the display mode and/or display target is input (step e7: Yes), the display image generating unit 463 selects a display mode according to operation input, and selects a display target (step e9).

Subsequently, the display image generating unit 463 determines the display mode selected in step e9. Then, when the "pigment display" is selected as the display mode (step e11: Yes), the display image generating unit 463 synthesizes an RGB image of the VS image representing the staining state, on the basis of the pigment amount of the staining pigment to be displayed (step e13). More specifically, the RGB image is synthesized by calculating RGB values of each pixel on the basis of the pigment amount of the staining pigment to be displayed in each pixel.

At this occasion, when the staining pigment to be displayed includes a staining pigment to which a display color (pseudo display color) is allocated in step e3, the spectrum of the corresponding pseudo display color is read and obtained from the pseudo display color data 475. Then, RGB values are calculated using the spectrum of the pseudo display color obtained as the reference pigment spectrum of the staining pigment. More specifically, when the RGB values are calculated, the reference pigment spectrum $k_n(\lambda)$ of the corresponding molecule target pigment is replaced with the spectrum of the pseudo display color, and thereby the spectrum is estimated. The RGB values are calculated on the basis of the estimation result.

When one or a plurality of cell variants are selected as display targets together with the staining pigment, the RGB image is synthesized by calculating RGB values of each pixel within the cell area classified into the cell variant to be displayed, on the basis of the pigment amount of the staining pigment to be displayed in each pixel in the cell area classified into the cell variant to be displayed. Accordingly, a display image representing the staining state of the staining pigment to be displayed within the cell area classified into the cell variant to be displayed is generated.

In this case, the processing for synthesizing the RGB image by calculating the RGB values on the basis of the pigment amounts can be realized by applying the known technology disclosed in Japanese Laid-open Patent Publication No. 2008-51654, for example. The process sequence will be simply described. First, if the pigment amounts $d_1, d_2, \ldots$ and $d_n$ (calculated in step c9 of FIG. 17) set in the pigment amount data 554 are multiplied by selection coefficients $\alpha_1, \alpha_2,$ and $\alpha_n$, respectively, and the calculated result is substituted into Formula (2), the following Equation (7) is obtained. If the selection coefficient $\alpha_n$ by which the staining pigment to be displayed is multiplied is set as 1 and the selection coefficient $\alpha_n$ by which the staining pigment not adopted as the display target is multiplied is set as 0, the spectral transmittance $t^*(x, \lambda)$ for only the pigment amount of the staining pigment to be displayed is obtained.

$$t^*(x,\lambda)=e^{-(k_1(\lambda)\cdot\alpha_1 d_1+k_2(\lambda)\cdot\alpha_2 d_2+\ldots k_n(\lambda)\cdot\alpha_n d_n)} \quad (7)$$

With respect to any given point (pixel) x of the captured multi-band image, a relationship of the following Equation (8) based on a response system of a camera is satisfied between a pixel value g (x, b) at a band b and the spectral transmittance t(x, λ) of a corresponding point on the specimen.

$$g(x, b) = \int_\lambda f(b, \lambda)s(\lambda)e(\lambda)t(x, \lambda)d\lambda + n(b) \quad (8)$$

where λ indicates a wavelength, f(b, λ) indicates spectral transmittance of a b-th filter, s(λ) indicates a spectral sensitivity characteristic of the camera, e(λ) indicates a spectral radiation characteristic of illumination, and n(b) indicates an observation noise at the band b. In addition, b is a serial number used to identify a band. In this case, b is an integer that satisfies the condition 1≤b≤6.

Accordingly, if expression (7) is substituted into expression (8) and a pixel value is calculated according to the following expression (9), a pixel value g*(x, b) of a display image displaying the pigment amount of the staining pigment to be displayed (display image representing the staining state of the staining pigment to be displayed) can be calculated. In this case, the observation noise n(b) may be calculated as zero.

$$g^*(x, b) = \int_\lambda f(b, \lambda)s(\lambda)e(\lambda)t^*(x, \lambda)d\lambda \quad (9)$$

The cell area classified into the cell variant to be displayed is identified as follows. First, the cell variant classification table 59 is looked up, and the classification cell list 594 (see FIG. 35) is read from the cell variant classification number 591 in which the cell variant names 593 to be displayed are set, and the cell identification label attached to the cell area classified into the cell variant to be displayed is obtained. Subsequently, the cell list table 57 is looked up to obtain the cell nucleus identification label 574, the cell membrane identification label 575, and the cytoplam identification label 576 (see FIG. 27) respectively attached to the areas of the cell nucleus, the cell membrane, and the cytoplam constituting the cell area to which the obtained cell identification label is attached. Then, the identification component information 56 is looked up, and the position coordinates (1) to (p)/(1) to (q) 5682 (see FIGS. 25 and 26) where the cell nucleus identification label, the cell membrane identification label, and the cytoplam identification label thus obtained are associated as the label 5681 are read from the identification component list 566.

Thereafter, a VS image display processing unit 454 performs processing for displaying the RGB image synthesized in step e13 as the display image of the VS image on the display unit 43 (step e15). Thereafter, step e21 is performed.

On the other hand, when the display mode selected in step e9 is not "pigment display", i.e., when the display mode is "variant-based display" (step e11: No), a display image of the VS image in which the cell area classified in the cell variant selected as the display target is identified and displayed is generated (step e17). More specifically, first, the cell area classified into the cell variant to be displayed is identified. Subsequently, the display image is generated in which the pixel values of the pixels in the identified cell area are the value of the display color allocated to the cell variant to be displayed in step e3 (display color for displaying variant).

When one or a plurality of staining pigments are selected as the display targets together with the cell variant, first, an RGB image of the VS image representing the staining state is synthesized on the basis of the pigment amount of the staining pigment to be displayed. Then, a display image is generated by replacing the pixel values of the pixels within the cell area classified into the cell variant to be displayed with the value of the display color allocated to the cell variant to be displayed in the synthesized RGB image.

Then, the VS image display processing unit 454 performs processing for displaying the display image generated in step e17 on the display unit 43 (step e19). Thereafter, step e21 is performed.

In step e21, the VS image display processing unit 454 determines whether the VS image display processing is finished or not. For example, when display finish operation is received but the display finish operation is not input (step e21: No), step e7 is subsequently performed. On the other hand, when the display finish operation is input (step e21: Yes), step b23 of FIG. 16 is subsequently performed, and then step b25 is performed.

In step b25, a change instruction operation of cell variant is monitored, and when the change instruction operation is input (step b25: Yes), step b17 is subsequently performed. On the other hand, when the change instruction operation of cell variant is not input (step b25: No), a determination is made as to whether the VS image display processing is finished or not, and when the VS image display processing is determined to be finished (step b27: Yes), this processing is terminated. When the VS image display processing is determined not to be finished (step b27: No), step b25 is subsequently performed.

Subsequently, an operation example when the display image is displayed on the display unit 43 and the VS image is observed will be described. FIG. 38 is a diagram illustrating an example of a VS image observation screen. FIG. 39 is a diagram illustrating an example of a main screen W71-2 that is switched by pressing a display switching button B77. As illustrated in FIG. 38, the VS image observation screen includes a main screen W71, an entire specimen image navigation screen W73, a magnification selector B71, an observation range selector B73, a display switching button B77, a display color change button B78, and a display quit button B79.

In the main screen W71 of FIG. 38 and the main screen W71-2 of FIG. 39 (more specifically, divided screens W711, W713 of the main screen W71-2 explained later), a display image that is generated for display is displayed on the basis of a VS image obtained by synthesizing specimen area section images corresponding to high-resolution images. The user can observe the entire target specimen S or each of individual parts of the target specimen S with a high resolution on the main screen W71 and the like, as if the user were actually observing the target specimen S using the microscope apparatus 2 with the high-magnification objective lens.

In the entire specimen image navigation screen W73, an entire image of a slide specimen is reduced and displayed. On the entire image of the slide specimen, a cursor K731 that indicates an observation range corresponding to a range of the display images displayed on the current main screens W71, W71-2 is displayed. The user can easily understand a current observation portion of the target specimen S, in the entire specimen image navigation screen W73.

The magnification selector B71 selects a display magnification of the display images of the main screens W71, W71-2.

In the example illustrated in the figure, magnification changing buttons B711 that are used to select individual display magnifications of "entire image", "1×", "2×", "4×", "10×", and "20×" are disposed. In the magnification selector B71, for example, the magnification of the high-magnification objective lens that is used to observe the target specimen S is provided as the maximum display magnification. If the user uses the mouse constituting the input unit 41 to click the desired magnification changing button B711, the display images that are displayed on the main screens W71, W71-2 are expanded and reduced according to the selected display magnification and are displayed.

The observation range selector B73 moves the observation ranges of the main screens W71, W71-2. For example, if the user clicks arrows of the upper, lower, left, and right using the mouse, display images where the observation ranges are moved in a desired movement direction is displayed on the main screens W71, W71-2. For example, the observation ranges may be configured to be moved according to an operation of arrow keys included in a keyboard constituting the input unit 41 or a drag operation of the mouse on the main screens W71, W71-2. For example, the user operates the observation range selector B73 and moves the observation ranges of the main screens W71, W71-2, thereby observing the individual portions of the target specimen S in the main screens W71, W71-2.

The display switching button 577 switches the displays of the main screens W71, W71-2. More specifically, as illustrated in the main screen W71 of FIG. 38 and the main screen W71-2 of the FIG. 39, if the display switching button B77 is pressed, a single mode where one display image is displayed on the main screen W71 and a multi mode where the main screen W71-2 is divided into two or more screens and a plurality of display images are displayed can be switched. In FIG. 39, the main screen W71-2 of the configuration of the two screens as the multi mode is exemplified. However, the main screen may be divided into three or more screens and three or more display images may be displayed.

Figure 38:
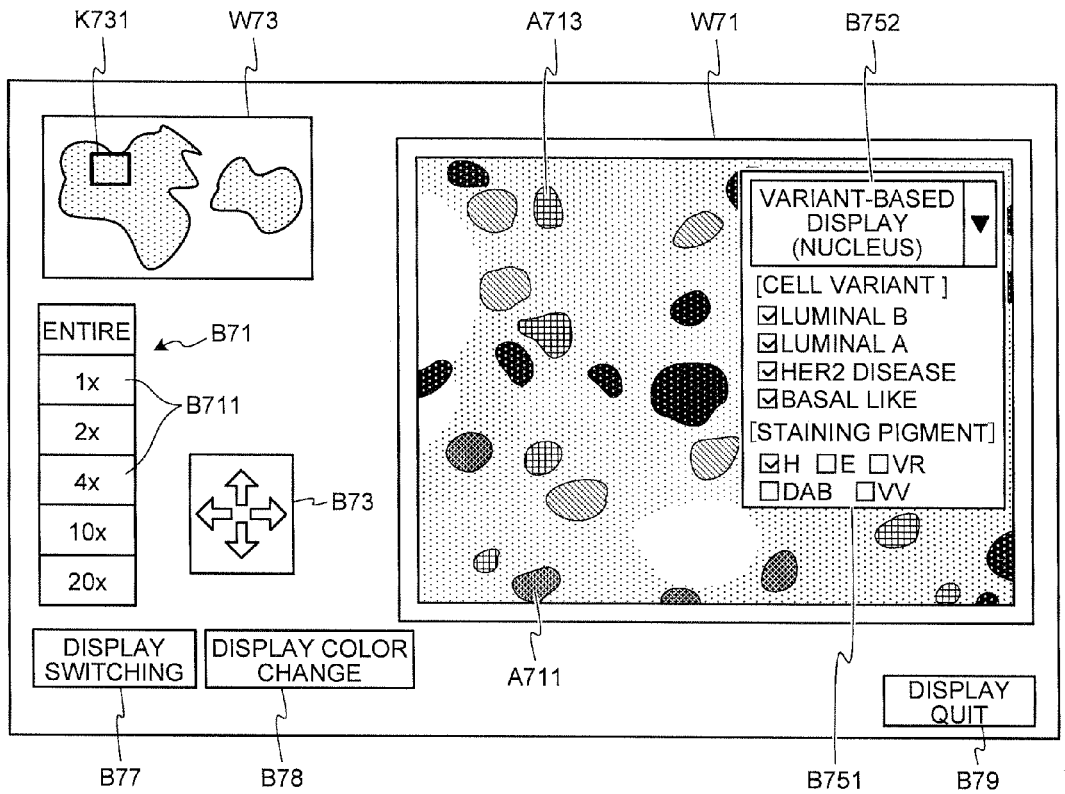
FIG. 38 is a diagram illustrating an example of a VS image observation screen.
Figure 39:
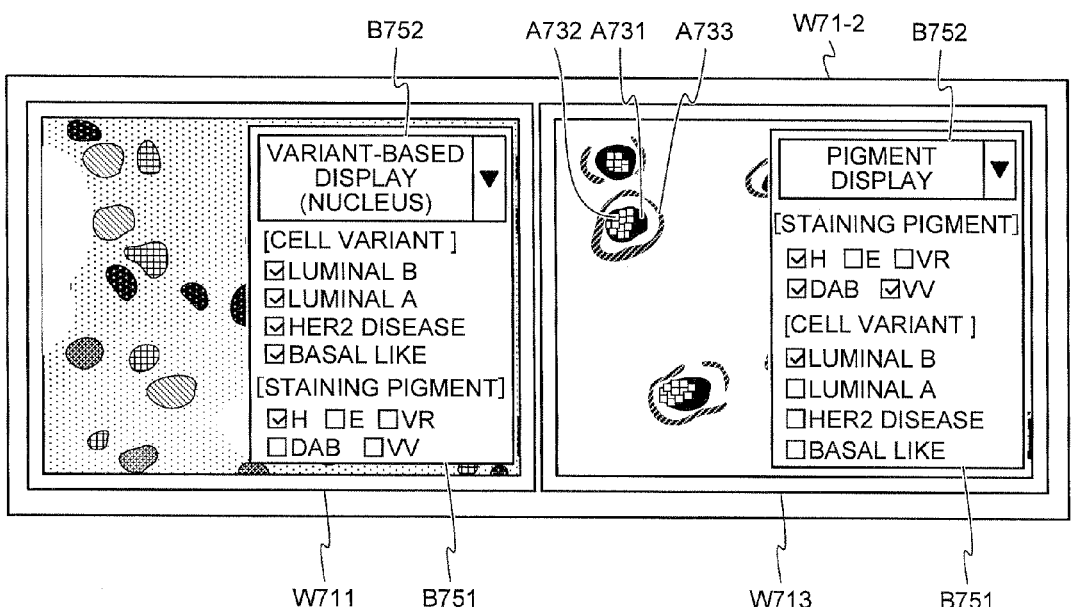
FIG. 39 is a diagram illustrating an example of a main screen that is switched by pressing a display switching button.

If the user clicks the right button of the mouse on the display images displayed on the divided screens W711, W713 of the main screen W71 or the main screen W71-2, a selection menu B751 for allowing selection of the staining pigment and/or cell variant as illustrated in FIGS. 38 and 39 (hereinafter simply referred to as "display target selection menu") is displayed. The display target selection menu 5751 has a dropdown box B752 for selecting a display mode. The dropdown box B752 provides a list of display modes as options, and prompts the user to make selection. As described above, examples of display modes include two modes, i.e., "pigment display" and "variant-based display". In FIGS. 38 and 39, two modes, i.e., "variant-based display (cell)" and "variant-based display (nucleus)" are illustrated as the "variant-based displays". In this case, in the "variant-based display (cell)", a display image is displayed in which the entire cell area classified into the cell variant to be displayed is labeled and displayed in the display color allocated to the cell variant to be displayed. On the other hand, in the "variant-based display (nucleus)", a display image is displayed in which the area of the cell nucleus constituting the cell area classified into the cell variant to be displayed is labeled and displayed in the display color allocated to the cell variant to be displayed.

The main screen W71 of FIG. 38 illustrates the display target selection menu B751 when the "pigment display" is selected as the display mode. The divided screen W713 of FIG. 39 illustrates the display target selection menu B751 when the "variant-based display (nucleus)" is selected as the display mode. Even when any of the display modes is selected in the dropdown box B752, the display target selection menu B751 illustrates a list of staining pigments and a list of cell variants as options, and the staining pigment and/or cell variant checked in the display target selection menu B751 is selected as the display target. In the first embodiment, five options, i.e., "H", "E", "DAB", "VV", and "VR" are provided as options of staining pigments, and four options, i.e., "Luminal B", "Luminal A", "HER2 disease", and "Basal like" are provided as options of cell variants.

When a display mode is selected in the display target selection menu B751, and a staining pigment and/or cell variant adopted as the display target is checked, the processings from steps e9 to e19 as illustrated in FIG. 36 are executed. As a result, in each of the divided screens W711, W713 in the main screen W71 of FIG. 38 and the main screen W71-2 of the FIG. 39, a display image illustrating the staining state of the desired staining pigment (illustrating the pigment amount of the desired staining pigment) can be displayed, or a display image in which the desired cell variant is labeled and displayed can be displayed.

For example, in the display target selection menu B751 as illustrated in FIG. 38, the "variant-based display (nucleus)" is selected as the display mode, and all four cell variants are checked as cell variants to be displayed, and "H" is checked as the staining pigment to be displayed. In this case, the display image generating unit 463 synthesizes an RGB image representing the staining state of the H pigment on the basis of the pigment amount of the H pigment in each pixel in a current observation range of the VS image. Then, the display image generating unit 463 generates a display image in which the areas of the cell nucleuses constituting the cell areas classified into the four cell variants in the synthesized RGB image are labeled and displayed in the display colors allocated to the respective cell variants. H pigment mainly stains cell nucleus, and therefore, the display image in the main screen W71 represents a distribution (state of presence) of the cell areas classified into the respective cell variants wherein the cell nucleuses are counterstained. Thereafter, the VS image display processing unit 454 displays the display image on the display unit 43 (more specifically, main screen W71). This is applicable to the case where a combination of display targets is changed. In this case, the cell areas classified into the respective cell variants are labeled and displayed in different display colors. However, the mode of labeling and displaying is not limited thereto. Any mode may be employed as long as the cell areas classified into the respective cell variants can be visually recognized.

In this case, in the main screen W71, an area A711 and an area A713 illustrated with different types of hatchings indicate cell areas classified into different cell variants. In this configuration, the display image in which each cell area in the VS image is labeled and displayed for each desired cell variant can be presented to the user. Further, when any one of the cell variants is selected as a display target, a display image in which only the cell areas in the target specimen S that are classified into the desired cell variant are labeled and displayed can be presented to the user. In this configuration, a distribution of cell areas classified into respective cell variants or a classification of each cell variant can be displayed in an easy to see manner. Therefore, a user such as a doctor can easily, visually confirm how the cells classified into a desired cell variant are distributed within the target specimen S and how the cells classified into different cell variants are distributed (existing in a mixed manner) within the target specimen S, and this improves the efficiency of diagnosis.

In FIG. 39, in the display target selection menu B751 at the right side of the divided screen W713, "pigment display" is selected as the display mode, "H", "DAB", and "VV" are checked as the staining pigments to be displayed, and "Luminal B" is checked as the cell variant to be displayed. In this case, the display image generating unit 463 synthesizes, as a display image, an RGB image representing the staining state of these three staining pigments on the basis of the pigment amounts of the H pigment, the DAB pigment, and the VV pigment in the pixels within the cell area in which the cell variant is classified into "Luminal B" in a current observation range of the VS image. Thereafter, the VS image display processing unit 454 displays the display image on the display unit 43 (more specifically, the divided screen W713). This is applicable to the case where a combination of display targets is changed. The divided screen W711 at the left side illustrates selection of the same display targets in the same display mode as the main screen W71 of FIG. 38.

In this case, for example, in the divided screen W713, an area A731 represents the staining state of the H pigment, an area A732 represents the staining state of the DAB pigment, and an area A733 represents the staining state of the VV pigment. In this configuration the staining state of the target specimen S with the desired staining pigments which is represented for each cell area classified into the desired cell variant can be presented to the user. Further, in the multi mode, display images having different display modes and display targets are arranged side by side, so that they can be observed while they are compared with each other. For example, in the example of FIG. 39, while the distribution of each cell area for each cell variant is seen in the divided screen W711 at the left side, the expression state of the target molecule in the cell area classified into each cell variant can be observed in detail in the divided screen W713 at the right side.

When the user wants to allocate a pseudo display color as a display color of a staining pigment, or when the user wants to allocate or change a display color with respect to a cell variant, the user presses the display color change button B78 as illustrated in FIG. 38 to display the display color selection screen as illustrated in FIG. 37, and the user performs operation to select a display color allocated to the staining pigment and/or cell variant. When the user terminates observation of the VS image, the user presses the display quit button B79.

As described above, in the first embodiment, a combination of presence/absence of predetermined target molecules expressed on a predetermined cell component is set as a cell variant. In order to determine the expression pattern of target molecules corresponding to the cell variant having been set, a portion where the predetermined target molecule is expressed on the cell component (target molecule expression portion) is extracted. Then, the expression patterns of the target molecules in each cell area is determined according to the combination of the target molecule expression portions included in each cell area, and each cell area is classified into a corresponding cell variant. Then, a display image in the VS image is displayed, in which cell areas are labeled and displayed in display colors according to the cell variants into which the cell areas are classified. In this configuration, the expression pattern of the plurality of target molecules in a cell within the target specimen S can be represented in an easy-to-see manner, and the display image in which a distribution of cell areas classified into a desired cell variant and a distribution of cell areas of each cell variant can be easily recognized can be presented to the user. Therefore, this can improve the efficiency of diagnosis given by a user such as a doctor, and the observation/diagnosis result can be used for selection of a treatment method, prognostification, definitive diagnosis, and the like.

Modification of First Embodiment

In the explanation about the first embodiment, using the expression of the estrogen receptor (ER), the progesterone receptor (PgR), or the HER2 receptor (HER2), i.e., hormone receptors, the expression patterns of these target molecules are classified into four cell variants. However, the above target molecules are merely examples. The types of target molecules and a combination of presence/absence of expressions thereof defined as cell variants can be freely defined.

For example, Ki-67, i.e., cell proliferation marker is known to be related to malignancy grading of a tumor such as differentiation, blood vessel invasion, and lymph-node metastasis, and prognosis. Therefore, for example, in treatment of hormone-sensitive breast cancer, a determination is made as to whether chemotherapy treatment is used in the treatment or not, according to presence/absence of expression of the Ki-67. Accordingly, molecule target staining for recognizing Ki-67 may be further performed on the target specimens illustrated as examples in the first embodiment. Then, cell variants further including a combination of presence/absence of expression of the Ki-67 may be set, and each cell area may be classified accordingly.

More specifically, an anti-Ki-67 antibody for recognizing Ki-67 is used on the target specimen of the first embodiment, and it is labeled by color formation with "PermaGreen" made by Diagnostic BioSystems (hereinafter, referred to as "PG pigment"). In other words, the staining pigments for the target specimen observed and diagnosed in this modification include six types, i.e, H pigment, E pigment, DAB pigment, VV pigment, PF pigment, and VR pigment. In this case, the cell nucleus is stained in blue-violet by the H pigment, the cytoplam and the connective tissue are stained in light red by the E pigment, the ER and the PgR are labeled in dark brown by the DAB pigment, the HER2 is stained in purple by the VV pigment, the Ki-67 is stained in green by the PG pigment, and the cell membrane of the epithelial cell is labeled in brick red by the VR pigment.

FIG. 40 is a diagram illustrating an example of cell variants according to this modification. In this modification, as illustrated in FIG. 40, each cell area in the VS image is classified into eight cell variants, i.e., "Luminal B1", "Luminal B2", "Luminal A1", "Luminal A2", "HER2 disease 1", "HER2 disease 2", "Basal like 1", and "Basal like 2".

For example, in the "Luminal B1", the ER, PgR are expressed, the HER2 is expressed, the Ki-67 is not expressed, and the ESA is irrelevant. On the other hand, in the "Luminal B2", the ER, PgR are expressed, the HER2 is expressed, the Ki-67 is expressed, and the ESA is irrelevant.

In this case, in the target molecule expression portion extraction processing (step b15 of FIG. 16), portions in which the ER and/or PgR is expressed on the cell nucleus, portions in which the HER2 is expressed on the cell membrane, and portions in which the Ki-67 is expressed on the cell nucleus are respectively extracted as the target molecule expression portions. Then, in the cell variant classification processing (step b21 of FIG. 16), the expression patterns of the target molecules in each cell area are determined according to the combination of the three target molecule expression portions included in each cell area, and each cell area is classified into a cell variant corresponding to the expression patterns of the target molecules.

In the VS image observation screen as illustrated in FIGS. 38 and 39, the eight cell variants, i.e., "Luminal B1", "Luminal B2", "Luminal A1", "Luminal A2", "HER2 disease 1", "HER2 disease 2", "Basal like 1", and "Basal like 2", can be selected as the display targets. At this occasion, for example, when different display colors are allocated to "Luminal B1" and "Luminal B2", a cell area having the ER and/or PgR expressed on the cell nucleus, having the HER2 expressed on the cell membrane, and having the Ki-67 expressed on the cell nucleus (Luminal B2) and a cell area having the ER and/or PgR expressed on the cell nucleus, having the HER2 expressed on the cell membrane, and having the Ki-67 not expressed on the cell nucleus (Luminal B1) can be displayed in different display colors. Alternatively, any one of them can be displayed. When the same display color is allocated to "Luminal B1" and "Luminal B2", these two may not be distinguished from each other. In other words, all of the cell areas in which the ER and/or PgR is expressed on the cell nucleus and the HER2 is expressed on the cell membrane can be displayed in the same display color.

In the actual diagnosis, for example, when the ER and/or PgR is expressed on the cell nucleus, the HER2 is expressed on the cell membrane, and the Ki-67 is expressed on the cell nucleus (Luminal B2), it is determined that chemotherapy treatment is effective, and the chemotherapy treatment is used in the treatment. On the other hand, when the Ki-67 is not expressed on the cell nucleus (Luminal B1), it is determined that chemotherapy treatment is not effective. Therefore, according to this modification, the accuracy of diagnosis can be further improved.

Second Embodiment

When the cell nucleus identification information 561, the cell membrane identification information 562, the cytoplam identification information 563 (see FIGS. 25 and 26), the cell list table 57 (see FIG. 27), and the cell variant classification table 59 (see FIG. 35) explained in the first embodiment are used, statistical amounts such as the number of cells corresponding to each cell variant and the ratio thereof can be calculated.

Figure 41:
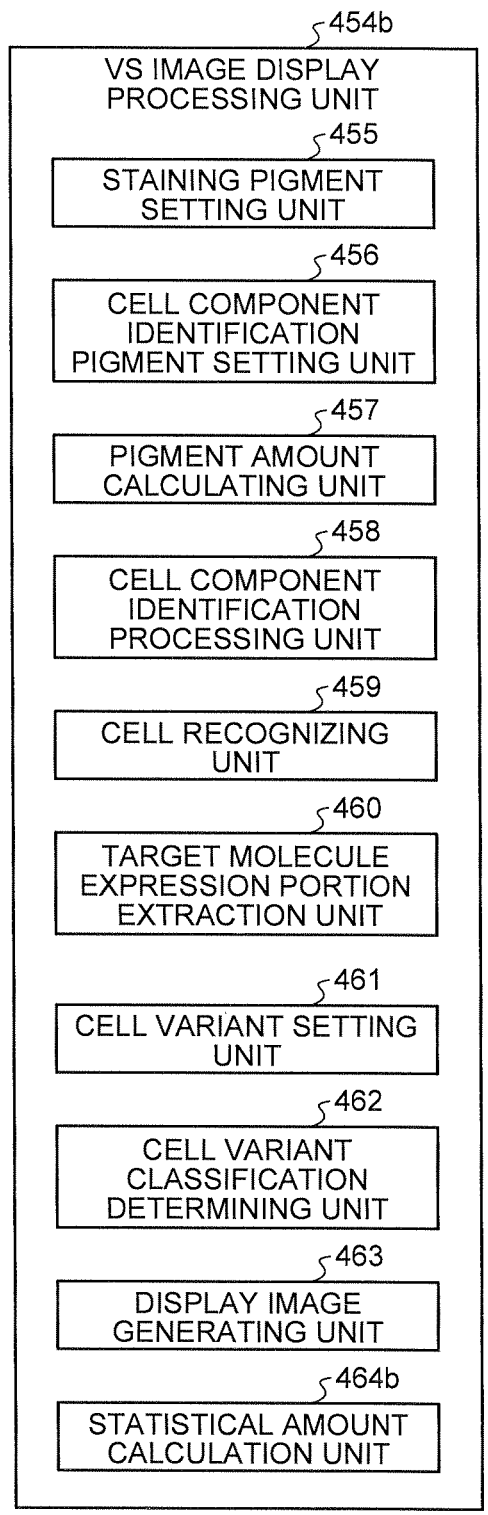
FIG. 41 is a diagram illustrating functional blocks of a VS image display processing unit according to the second embodiment.

FIG. 41 is a diagram illustrating functional blocks of a VS image display processing unit 454*b* constituting a processing unit of a host system according to a second embodiment. The host system according to the second embodiment can be achieved by replacing the VS image display processing unit 454 of the processing unit 45 illustrated in FIG. 3 in the host system 4 according to the first embodiment with the VS image display processing unit 454*b* as illustrated in FIG. 41. In the recording unit 47 (see FIG. 3), a VS image display processing program, not illustrated, is recorded instead of the VS image display processing program 473. The VS image display processing program is configured to cause the processing unit 45 to function as the VS image display processing unit 454*b* and achieve the VS image display processing according to the second embodiment.

As illustrated in FIG. 41, the VS image display processing unit 454*b* according to the second embodiment includes a staining pigment setting unit 455, a cell component identification pigment setting unit 456, a pigment amount calculating unit 457, a cell component identification processing unit 458, a cell recognizing unit 459, a target molecule expression portion extraction unit 460, a cell variant setting unit 461, a cell variant classification determining unit 462, a display image generating unit 463, and a statistical amount calculation unit 464*b*. The statistical amount calculation unit 464*b* calculates a statistical amount of each cell variant on the basis of the cell area for each cell variant classified by the cell variant classification determining unit 462.

Figure 42:
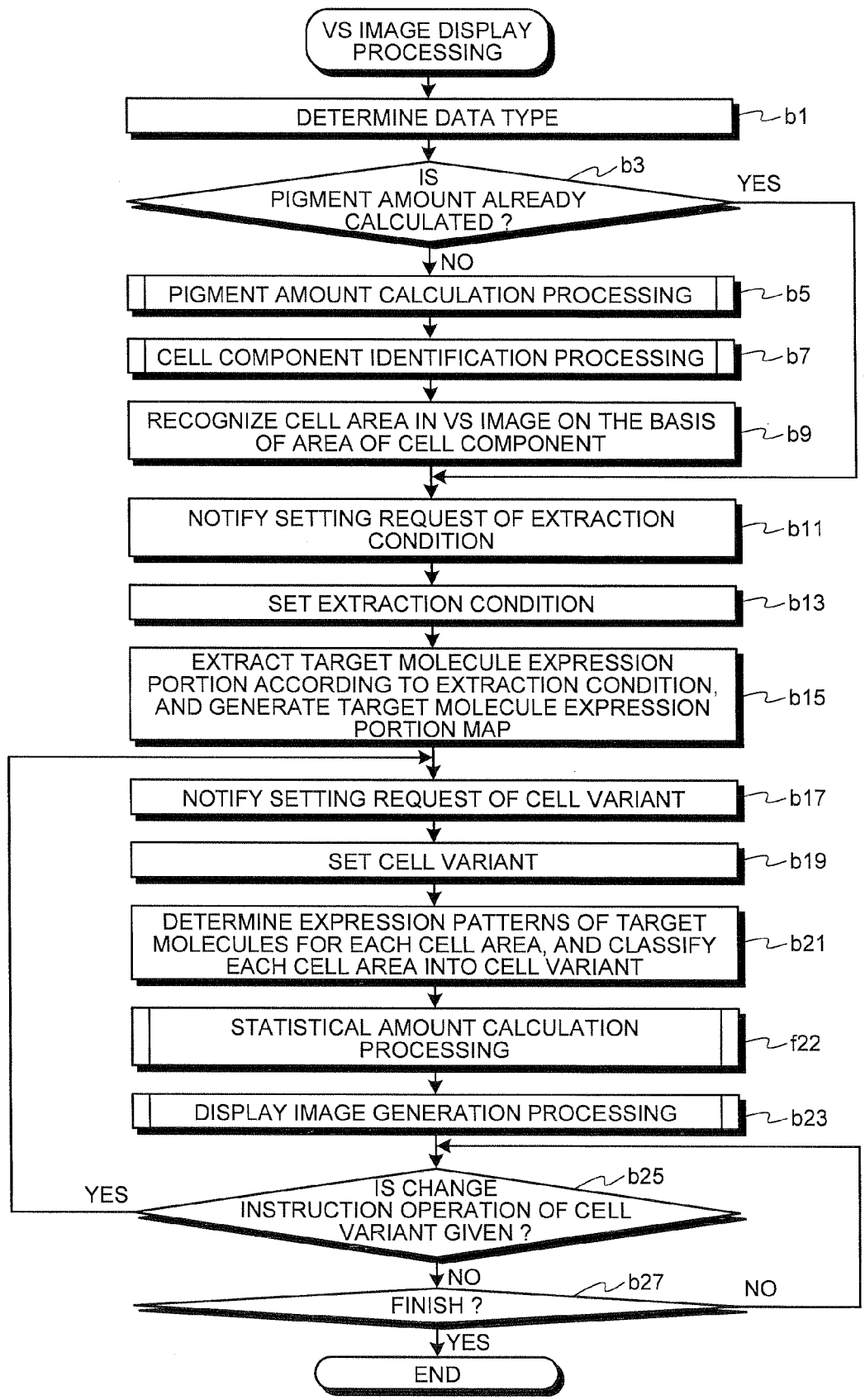
FIG. 42 is a flowchart illustrating a process sequence of VS image display processing according to the second embodiment.
Figure 43:
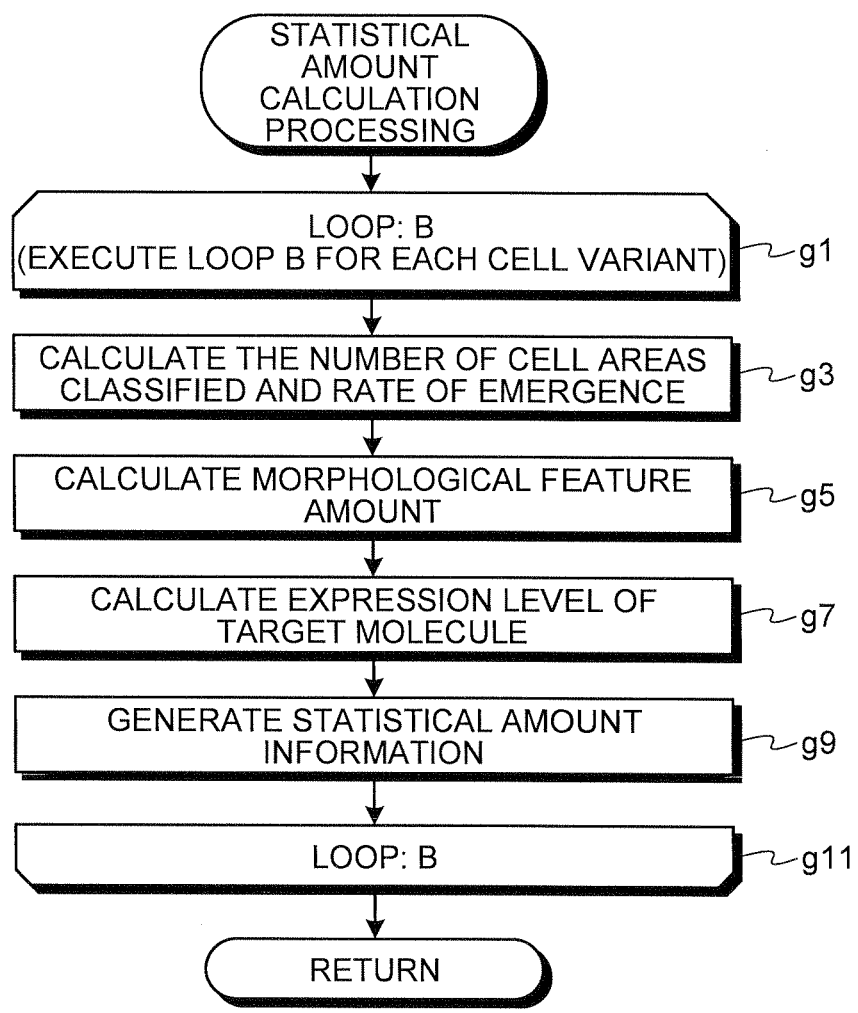
FIG. 43 is a flowchart illustrating a process sequence of statistical amount calculation processing.

FIG. 42 is a flowchart illustrating a process sequence of VS image display processing in the second embodiment. In FIG. 42, the same processing steps as those of the first embodiment are denoted with the same reference numerals. As illustrated in FIG. 42, in the VS image display processing of the second embodiment, the cell variant classification determining unit 462 executes the cell variant classification processing in step b21, and thereafter the statistical amount calculation unit 464*b* executes the statistical amount calculation processing (step f22). FIG. 43 is a flowchart illustrating a process sequence of statistical amount calculation processing.

As illustrated in FIG. 43, in the statistical amount calculation processing, the statistical amount calculation unit 464*b* adopts the cell variants set in step b19 of FIG. 42 as processing targets in order, and performs processing of loop B for each cell variant (step g1 to step g11).

In other words, in the loop B, first, the statistical amount calculation unit 464*b* obtains the number of cell areas classified into the cell variant to be processed, and calculates a rate of emergence of the cell areas (step g3). The number of cell areas classified into the cell variant to be processed are read and obtained from the cell variant classification number 591 set in the cell variant classification table 59 in the VS image file 5 (see FIG. 35). The rate of emergence is calculated according to the following expression (10). In this case, a cell variant classification number is the number of cell areas classified into the cell variant to be processed. A total cell number is the number of cell areas recognized in step b9 in FIG. 42, which is read and obtained from the total cell number 571 set in the cell list table 57 in the VS image file 5 (see FIG. 27). When there is any cell area that is classified into none of the cell variant having been set (Others), the rate of emergence may be calculated using the number of cell areas except these cell areas as the total cell number.

$$\text{rate of emergence (\%)} = (\text{cell variant classification number}/\text{total cell number}) \times 100 \quad (10)$$

Subsequently, the statistical amount calculation unit 464*b* calculates a morphological feature amount of the cell variant to be processed (step g5). More specifically, first, the statistical amount calculation unit 464*b* calculates a morphological feature amount of each cell area classified into the cell variant to be processed. Examples of morphological feature amounts of a cell area includes a circumscribing rectangle, a barycenter, a size of an area, a peripheral length, a roundness, a length of a major axis, a length of a minor axis, an aspect ratio, the number of cell nucleuses, a size of area of a cell nucleus, distribution of the sizes of areas of nucleuses, a roundness of a cell nucleus, and level of H pigment in a cell nucleus. Then, the statistical amount calculation unit 464*b* calculates, for example, an average value or a distribution value of the morphological feature amount calculated for the respective cell areas, and adopts it as a morphological feature amount of the cell variant to be processed.

In this case, each of the circumscribing rectangle, the barycenter, the size of an area, the peripheral length, the roundness, the length of the major axis, the length of the minor axis, and the aspect ratio of each cell area can be calculated by the same calculation method as that used for calculating the morphological feature amount of a cell nucleus explained in the first embodiment, and these values are calculated on the basis of the contour of a cell area. The contour of a cell area can be defined by pixels forming a border of the cell. When the cell area is completely enclosed by the cell membrane, the outer contour of the cell membrane may be adopted as the contour of the cell area. When the cell membrane is discontinuous, the discontinued portion may be interpolated to make a contour.

The number of cell nucleuses is the number of areas of cell nucleuses existing inside of the cell area. The size of area of the cell nucleus is the size of area of the cell nucleus existing inside of the cell area. When there are a plurality of areas of cell nucleuses as in a cell clump, it is calculated as the average value of the sizes of areas of the cell nucleuses. When a plurality of areas of cell nucleuses exist inside of the cell area, the distribution of the sizes of areas of nucleuses is calculated as a distribution value of sizes of areas of the cell nucleuses. The roundness of the cell nucleus corresponds to the roundness calculated with respect to the area of the cell nucleus in the first embodiment. The level of the H pigment in the cell nucleus is calculated as, for example, an average value of pigment amounts of pigment H in pixels constituting the area of the cell nucleus existing inside of the cell area (i.e., cell nucleus identification pigment).

Subsequently, the statistical amount calculation unit 464b calculates the expression level of the target molecule in the cell variant to be processed (step g7). More specifically, first, the statistical amount calculation unit 464b obtains the pigment amount of the molecule target pigment calculated with respect to the pixels in the target molecule expression portion included in the cell area classified into the cell variant to be processed. In the process sequence, the pigment amount of the molecule target pigment labeling the corresponding target molecule is read and obtained from the pigment amount data 554 in the VS image file 5 (see FIG. 15). Then, for example, the average value of the obtained pigment amounts is adopted as the expression level of the target molecule. When the cell area classified into the cell variant to be processed includes a plurality of types of target molecule expression portions, the expression level is calculated for each of these target molecules.

Subsequently, the statistical amount calculation unit 464b generates statistical amount information in which the values calculated in steps g3 to g7 are associated with the cell variant name of the cell variant to be processed (step g9), and finishes the processing of the loop B with respect to the cell variant to be processed. Then, when the processing of the loop B is performed on all the cell variants, the statistical amount calculation processing is finished. Then, step f22 of FIG. 42 is subsequently performed, and then step b23 is subsequently performed.

The statistical amount for each cell variant calculated as described above is displayed on the display unit 43 at any given point of time, e.g., when the user inputs display instruction operation for displaying the statistical amount. The method for displaying the statistical amount for each cell variant is not particularly limited. For example, a statistical amount display button for displaying the statistical amount is provided on the VS image observation screen of FIG. 38. Then, when the statistical amount display button is pressed down, a statistical amount display screen illustrating the statistical amount for each cell variant is displayed beside a side of the main screen W71 of FIG. 38 and the main screen W71-2 of the FIG. 39. In this configuration, a user such as a doctor can check the statistical amount of each cell variant in the statistical amount display screen while seeing a distribution of cell areas classified into a desired cell variant and a distribution of cell areas of each cell variant in the main screen W71 and the main screen W71-2.

As described above, in the second embodiment, the statistical amount of each cell variant can be calculated on the basis of the cell area for each cell variant having been set. Then, the calculated statistical amount can be displayed on the display unit 43 so that it is presented to the user. Therefore, a user such as a doctor can make diagnosis in view of not only the cell variant into which each cell area in the VS image is classified but also the statistical amounts such as the rate of emergence of each cell variant, the morphological feature of the cell area classified into each cell variant, or the expression level of the target molecule in each cell variant. Therefore, this can improve the efficiency of diagnosis given by a user such as a doctor, and the observation/diagnosis result can be used for selection of a treatment method, prognostification, definitive diagnosis, and the like.

Third Embodiment

Figure 44:
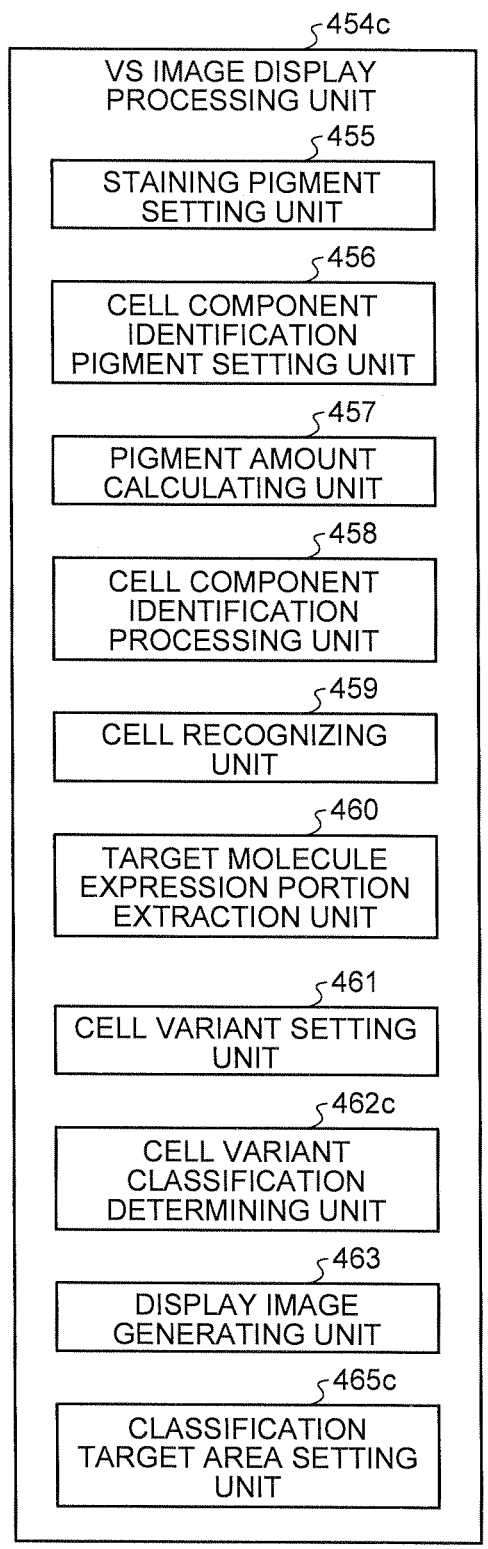
FIG. 44 is a diagram illustrating functional blocks of a VS image display processing unit according to the third embodiment.

FIG. 44 is a diagram illustrating functional blocks of a VS image display processing unit 454c constituting a processing unit of a host system according to a third embodiment. The host system according to the third embodiment can be achieved by replacing the VS image display processing unit 454 of the processing unit 45 illustrated in FIG. 3 in the host system 4 according to the first embodiment with the VS image display processing unit 454c as illustrated in FIG. 44. In the recording unit 47 (see FIG. 3), a VS image display processing program, not illustrated, is recorded instead of the VS image display processing program 473. The VS image display processing program is configured to cause the processing unit 45 to function as the VS image display processing unit 454c and achieve the VS image display processing according to the third embodiment.

As illustrated in FIG. 44, the VS image display processing unit 454c according to the third embodiment includes a staining pigment setting unit 455, a cell component identification pigment setting unit 456, a pigment amount calculating unit 457, a cell component identification processing unit 458, a cell recognizing unit 459, a target molecule expression portion extraction unit 460, a cell variant setting unit 461, a cell variant classification determining unit 462c, a display image generating unit 463, and a classification target area setting unit 465c. The classification target area setting unit 465c sets, as a classification target area, an area in the VS image which is to be subjected to the cell variant classification processing. The cell variant classification determining unit 462c determines an expression pattern of a target molecule in cell areas existing in the classification target area set by the classification target area setting unit 465c, and classifies the cell areas in the classification target area into cell variants corresponding to the expression patterns of the target molecules.

Figure 45:
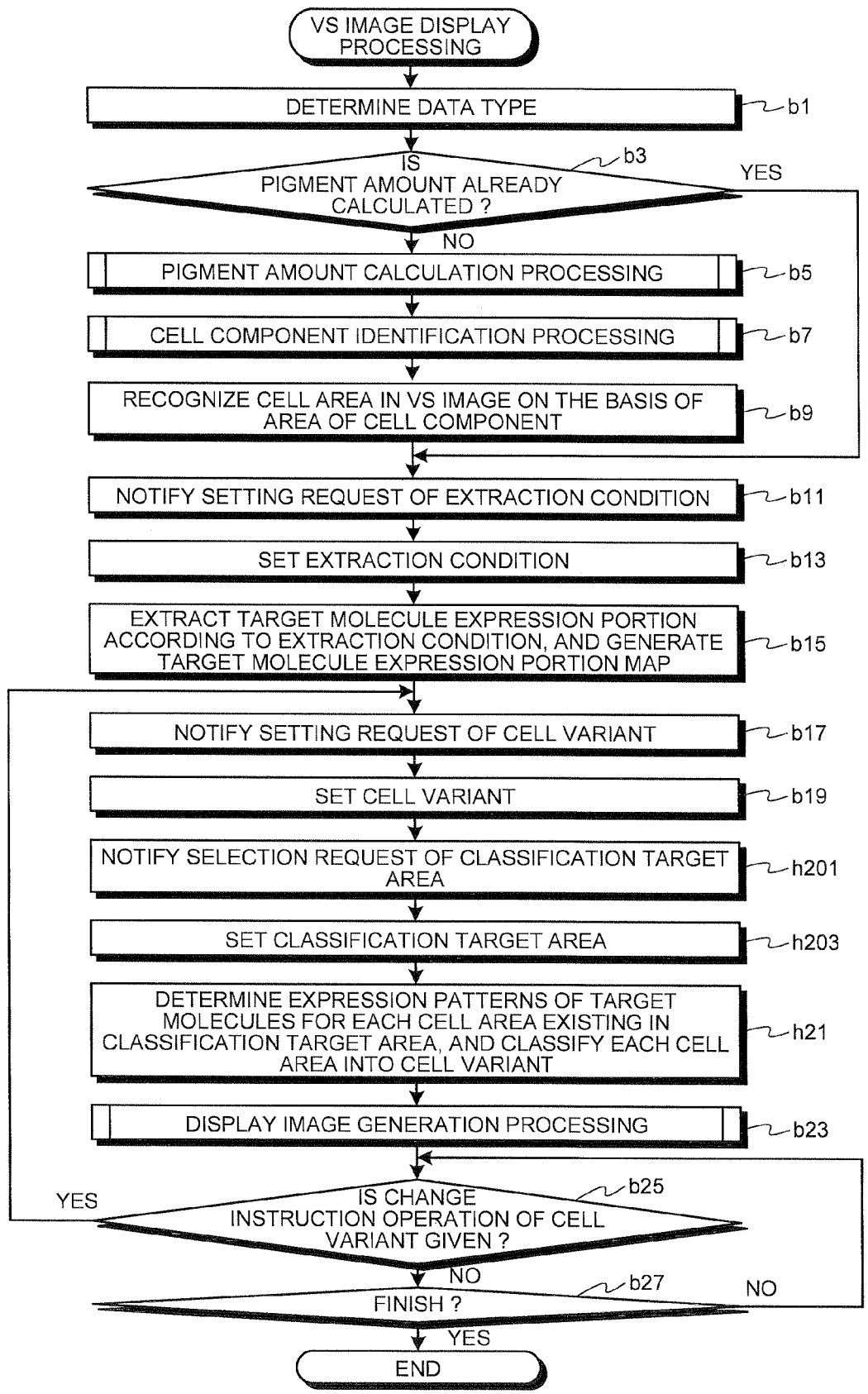
FIG. 45 is a flowchart illustrating a process sequence of VS image display processing according to the third embodiment.

FIG. 45 is a flowchart illustrating a process sequence of VS image display processing according to the third embodiment. In FIG. 45, the same processing steps as those of the first embodiment are denoted with the same reference numerals. As illustrated in FIG. 45, in the VS image display processing according to the third embodiment, the cell variant setting unit 461 sets a cell variant in step b19, and thereafter the classification target area setting unit 465c executes a process of displaying a notification of a selection request of the classification target area on the display unit 43 (step h201). For example, an RGB image of the VS image is synthesized and displayed according to the process sequence explained in step e13, and the selection request of the classification target area is notified. Then, on the RGB image, the selection operation of the classification target area performed by the user is received.

In the first embodiment, each cell area in the entire VS image is classified into cell variants. However, in the actual cancer diagnosis, it is common practice to observe and determine a cell variant to which a cell area existing within an area of a tumor (tumor site) is classified. In step h201, the selection operation of the classification target area such as tumor site is received. Since there may be a plurality of such tumor sites at portions away from each other in the VS image, the selection operation of the classification target area is received multiple times as necessary in step h201.

Then, the classification target area setting unit 465c sets classification target areas according to the selection operations of the classification target areas received in step h201 (step h203). Thereafter, the cell variant classification determining unit 462c determines the expression patterns of the target molecules in each cell area recognized in step b9 and existing within the classification target areas set in step h203, and classifies the cell areas in the classification target areas into the cell variants set in step b19 (step h21). Thereafter, step b23 is performed.

As described above, in the third embodiment, the expression patterns of the target molecules in the cell areas existing in the classification target areas in the VS image are determined, and the cell areas are classified into the cell variants. Accordingly, for example, only the cell areas existing in the area in the VS image which needs to be diagnosed are classified into the cell variants, and therefore, the processing load can be reduced. Further, a user such as a doctor can easily, visually confirm how the cells classified into a desired cell variant are distributed in a tumor site and how the cells classified into different cell variants are distributed (existing in a mixed manner) in a tumor site, and this improves the efficiency of diagnosis.

Modification of Third Embodiment

In the third embodiment, the classification target area is set according to the user's selection operation. Alternatively, a selection operation of an area that is not classified (non-classification target area) may be received. Then, in accordance with the received selection operation of the non-classification target area, cell areas existing outside of the non-classification target area may be classified into cell variants. In this case, for example, the user selects an area other than a tumor site, which is to be the classification target area, on the RGB image.

In the third embodiment, the classification target area is set according to the user's selection operation. Alternatively, a cell area in which a predetermined target molecule is expressed may be selected as a cell area to be classified, and the selected cell area may be classified into cell variants.

For example, when epithelial cells are classified into cell variants but interstitial cells are excluded from the classification, cell areas stained by a molecule target pigment for labeling an ESA antibody may be adopted as classification targets and classified into cell variants. As described above, the ESA antibody is a target molecule for recognizing an epithelial specific antigen ESA expressed on a cell membrane of an epithelial cell. FIG. 46 is a diagram illustrating an example of cell variants according to this case. In the expression patterns of the target molecules in each cell variant as illustrated in FIG. 46, the ESA is expressed in the setting. For example, in the "Luminal B1", the ER, PgR are expressed, the HER2 is expressed, and the ESA is expressed. In the actual operation, the presence/absence of expression of the ESA labeled by the VR pigment may be set by selecting "O: target molecule is expressed expression" in the corresponding dropdown box B63 in the expression pattern setting screen as illustrated in FIG. 32 of the first embodiment.

In this case, in the target molecule expression portion extraction processing (step b15 of FIG. 16), portions in which the ER and/or PgR is expressed on the cell nucleus and portions in which the HER2 is expressed on the cell membrane are extracted as the target molecule expression portions as explained in the first embodiment, and in addition, portions in which the ESA is expressed on the cell membrane is also extracted as the target molecule expression portion. Further, in the cell variant classification processing (step b21 of FIG. 16), a cell area having the ER and/or PgR expressed on the cell nucleus, having the HER2 expressed on the cell membrane, and having the ESA expressed on the cell membrane is classified into "Luminal B", and a cell area having the ER and/or PgR expressed on the cell nucleus, having the HER2 expressed on the cell membrane, and having the ESA not expressed on the cell membrane is classified into "Others", for example. According to this configuration, only cell areas of epithelial cells in which the ESA is expressed on the cell membrane are adopted as classification targets, and the cell areas adopted as the classification targets can be classified into the cell variants, i.e., "Luminal B", "Luminal A", "HER2 disease", and "Basal like".

In the explanation about this case, the cell areas adopted as the classification targets are selected according to presence/absence of expression of the ESA. However, the selection method is not limited thereto. For example, using a predetermined antibody for identifying a cancer cell (predetermined antibody for recognizing a target molecule expressed on a cancer cell), a cell area stained by a molecule target pigment labeling this antibody may be adopted as a classification target.

The present invention can also be applied to a case where a specimen stained by fluorescence antibody technique. More specifically, the present invention can also be applied to a case where a specimen stained (labeled with fluorescence) using fluorescent pigment (staining pigment) acting on a target molecule such as a desired antigen is observed as a target specimen S.

For example, a DAPI, i.e., fluorescent pigment, a Qdot (registered trademark) 545, a Qdot (registered trademark) 605, and a Qdot (registered trademark) 655 are used as molecule target staining. A specimen is prepared as a target specimen S, in which a cell nucleus is fluorescent-labeled by the DAPI, an epithelial specific antigen ESA is labeled by the Qdot (registered trademark) 655, an estrogen receptor (ER) and a progesterone receptor (PgR) are labeled by the Qdot (registered trademark) 605, the HER2 receptor (HER2) is labeled by the Qdot (registered trademark) 545.

Figure 47:
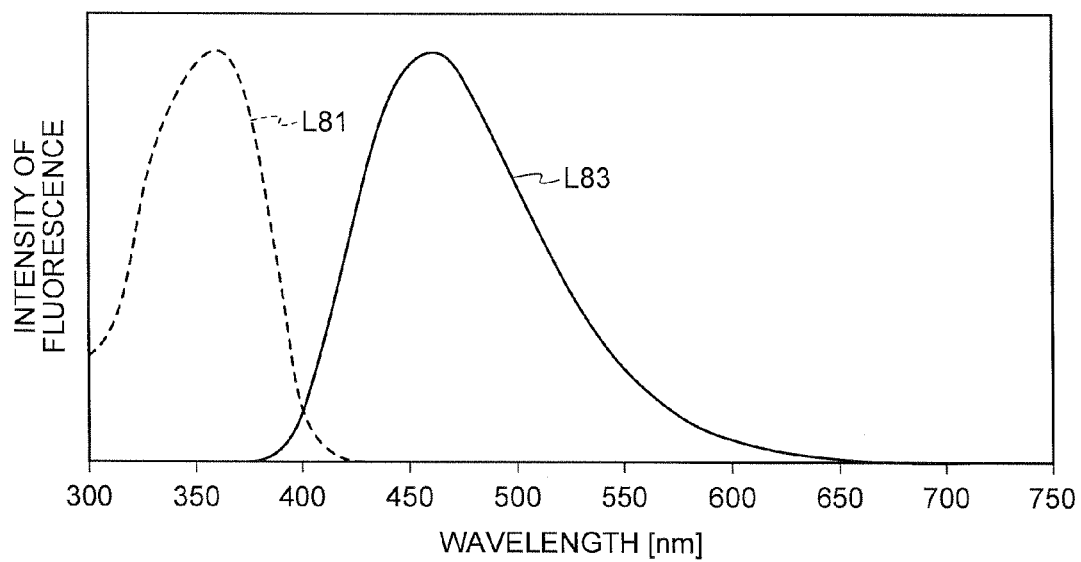
FIG. 47 is a diagram illustrating excitation wavelength characteristic and fluorescence wavelength characteristic of DAPI.

FIG. 47 is a diagram illustrating excitation wavelength characteristic and fluorescence wavelength characteristic of DAPI. A variation curve L81 of excitation wavelength characteristic is represented by a broken line. A variation curve L83 of fluorescence wavelength characteristic is represented by a solid line. As illustrated in FIG. 47, the DAPI has an excitation wavelength of about 360 nm and has a fluorescent wavelength of about 460 nm. When an excitation light having a wavelength of about 360 nm is irradiated to the DAPI, the DAPI emits fluorescent light having a wavelength of about 460 nm.

Figure 48:
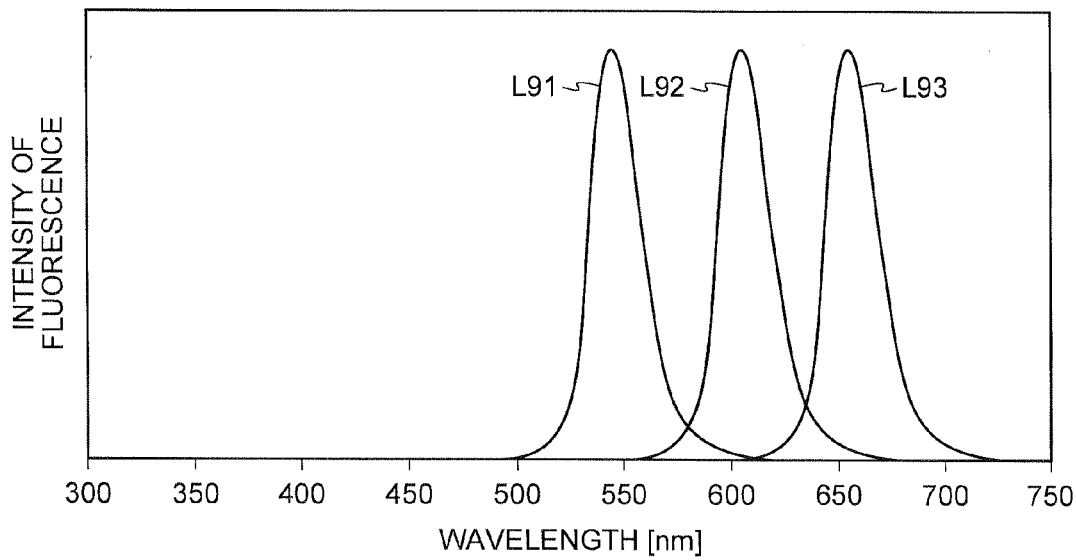
FIG. 48 is a diagram illustrating fluorescence wavelength characteristics of Qdots (registered trademark) 545, 605, 655.

FIG. 48 is a diagram illustrating a variation curve L91 of fluorescence wavelength characteristic of the Qdot (registered trademark) 545, a variation curve L92 of fluorescence wavelength characteristic of the Qdot (registered trademark) 605, and a variation curve L93 of fluorescence wavelength characteristic of the Qdot (registered trademark) 655. As illustrated in FIG. 48, a fluorescent wavelength of the Qdot (registered trademark) 545 is about 545 nm, a fluorescent wavelength of the Qdot (registered trademark) 605 is about 605 nm, and a fluorescent wavelength of the Qdot (registered trademark) 655 is about 655 nm. The excitation wavelengths of all of the Qdots (registered trademark) 545, 605, 655 are 350 nm to 488 nm, which are not illustrated in the figure. Therefore, when an excitation light having a wavelength of 350 nm to 488 nm is emitted onto the Qdot (registered trademark) 545, the Qdot (registered trademark) 545 emits fluorescent light having a wavelength of about 545 nm. When the excitation light having a wavelength of 350 nm to 488 nm is emitted onto the Qdot (registered trademark) 605, the Qdot (registered trademark) 605 emits fluorescent light having a wavelength of about 605 nm. When the excitation light having a wavelength of 350 nm to 488 nm is emitted onto the Qdot (registered trademark) 655, the Qdot (registered trademark) 655 emits fluorescent light having a wavelength of about 655 nm.

In this case, in the microscope apparatus 2 as illustrated in FIG. 2, the cube switch unit 26 causes the fluorescent cube 261 to be arranged on the optical path of the observation light, so that the incident-light illumination light emitted by the incident-light illumination light source 283 is irradiated onto the target specimen S through the incident-light illumination optical system, and the target specimen S is fluorescently observed.

More specifically, the fluorescent cube 261 of the cube switch unit 26 made into a unit is used, which includes an excitation filter 262 transmitting light having an excitation wavelength of fluorescent pigment staining the target specimen S, an absorption filter 263 transmitting light having a wavelength including the fluorescent wavelengths of all the fluorescent pigments staining the target specimen S, and a dichroic mirror 264. In this case, the excitation filter 262 is prepared that transmits light having an excitation wavelength (for example, 350 nm to 488 nm) for the DAPI and the Qdots (registered trademark) 545, 605, 655. In addition, the absorption filter 263 is prepared that transmits light having a wavelength (for example, 460 nm to 655 nm) including the fluorescent wavelength of the DAPI and the Qdots (registered trademark) 545, 605, 655. Thus, the fluorescent cube 261 is structured. When the excitation wavelengths of the fluorescent pigments staining the target specimen S are different, a fluorescent cube having an excitation filter 262 may be individually prepared to transmit light having each excitation wavelength, and the fluorescent cubes may be attached to the cube switch unit 26.

An optical filter switching unit 301 of a filter unit 30 having at least four mounting holes for attaching optical elements is prepared. Then, four optical filters 303 for transmitting light having fluorescent wavelength for the DAPI and the Qdots (registered trademark) 545, 605, 655 are respectively attached to the four mounting holes.

The incident-light illumination light emitted by the incident-light illumination light source 283 and irradiated upon the target specimen S through the incident-light illumination optical system passes through the incident-light illumination optical system and enters into the fluorescent cube 261, so that the light having the excitation wavelength (350 nm to 488 nm) for the DAPI and the Qdots (registered trademark) 545, 605, 655 passes through the excitation filter 262. Then, the excitation light having the excitation wavelength (350 nm to 488 nm) having passed through the excitation filter 262 is reflected by the dichroic mirror 264, and is irradiated upon the target specimen S through the objective lens 271. When the excitation light is irradiated upon the target specimen S, the fluorescent light (fluorescents emitted by the DAPI and the Qdots (registered trademark) 545, 605, 655) excited by the excitation light and emitted by the target specimen S enters into the objective lens 271 as an observation light. The observation light (fluorescent) having passed through the objective lens 271 enters into the fluorescent cube 261 and passes through the dichroic mirror 264. Then, the observation light (fluorescent light) having the fluorescent wavelength (460 nm to 655 nm) for the DAPI and the Qdots (registered trademark) 545, 605, 655 having passed through the absorption filter 263 enters into the lens barrel 29 after having passed through the filter unit 30.

In this case, when the specimen image of the target specimen S is captured with multi-bands, first, the optical filter switching unit 301 rotates to successively insert the four optical filter 303 into the optical path of the observation light, and the specimen images are performed by the TV camera 32. As a result, optical spectrum images are obtained for each of the fluorescent wavelengths for the DAPI and the Qdots (registered trademark) 545, 605, 655.

On the other hand, like the first embodiment, the host system 4 generates a VS image of the target specimen S, and displays the VS image. More specifically, using the DAPI as a cell nucleus identification pigment and using the Qdot (registered trademark) 655 as a cell membrane identification pigment, cell areas in the target specimen appearing in the VS image are classified into cell variants defined in advance, in accordance with expression pattern of ER, PgR, and HER2, i.e., a combination of presence/absence of expression of ER and/or PgR on the cell nucleus and presence/absence of expression of HER2 on the cell membrane, like the first embodiment. Then, a display image in the VS image is displayed, in which the cell areas are labeled and displayed in display colors according to the cell variants into which the cell areas are classified.

In the embodiments and modifications as explained above, the element identification pigments visualizing one or more cell constituent elements staining positions on the specimen corresponding to the pixels in the specimen image and the pigment amounts of the molecule target pigments visualizing the plurality of target molecules are obtained, and on the basis of the pigment amounts of the molecule target pigments in the pixels in the area of the cell constituent elements, the expression portion of the plurality of target molecules in the area of the cell constituent elements is extracted. Further, the expression pattern of the target molecules including the combination of presence/absence of expression of the plurality of target molecules is set, and an area of a cell corresponding to the expression pattern of the target molecules set on the basis of a combination of expression portions of the plurality of target molecules included in an area of a cell is classified. Then, a display image is generated in which the area of the cell classified into the expression pattern of the target molecules having been set is labeled and displayed differently from other areas of cells. In this configuration, the display image can be presented in which the expression pattern of the plurality of target molecules in the cell in the specimen is illustrated in an easy-to-see manner, so that the accuracy of diagnosis can be improved.

The present invention is not limited to the above embodiments as they are. Various inventions can be formed by combining the plurality of constituent elements disclosed in each embodiment as necessary. For example, an invention may be formed by removing several constituent elements from all the constituent elements illustrated in the embodiment. Alternatively, an invention may be formed by combining constituent elements illustrated in different embodiments as necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system, comprising:
an image acquiring unit that acquires a specimen image by capturing a single image of a specimen using a microscope configured for at least bright field observation, the specimen being stained by an element identification pigment visualizing one or more cell constituent elements constituting a cell and by a molecule target pigment visualizing a plurality of target molecules;
a pigment amount acquiring unit that detects stain intensity of the element identification pigment staining a corresponding position on the specimen and a stain intensity of the molecule target pigment, for each pixel of the specimen image;
an element area identification unit that identifies an area of the cell constituent element in the specimen image, on the basis of the detected stain intensity of the element identification pigment;
an expression portion extraction unit that extracts expression portions of the plurality of target molecules in the cell constituent element, on the basis of the detected stain intensity of the molecule target pigment at at least one pixel in the identified area of the cell constituent element;
an expression pattern setting unit that sets an expression pattern of the target molecules including a combination of presence/absence of expression of the plurality of target molecules;
an expression pattern classification unit that classifies an area of a cell corresponding to the expression pattern of the target molecules having been set, on the basis of a combination of expression portions of the plurality of target molecules included in the identified area of the cell;
a display image generating unit that generates a display image in which the classified area of the cell is labeled and displayed differently from other areas of the cell, and in which each of the plurality of expression patterns of the target molecules is labeled and displayed, wherein the generated display image also represents a staining state of the specimen stained by the element identification pigment on the basis of the detected stain intensity of the element identification pigment at each pixel in the captured single specimen image, and wherein the display image is generated by replacing a pixel value of the area of the cell classified into the expression pattern of the target molecules in the captured single specimen image with a predetermined display color; and
a display processing unit that displays the display image.

2. The microscope system according to claim 1 further comprising a statistical amount calculation unit that calculates at least a number of areas of cells classified into the expression pattern of the target molecules by the expression pattern classification unit and a rate of the number of areas of cells with respect to a total number of cells existing in the specimen.

3. The microscope system according to claim 1 further comprising an area setting unit that sets a classification target area or a non-classification target area in the specimen image, wherein the expression pattern classification unit classifies an area of a cell in the classification target area or an area of a cell outside of the non-classification target area into the expression pattern of the target molecule.

4. The microscope system according to claim 1, wherein the specimen is stained by a molecule target pigment that visualizes an estrogen receptor, a progesterone receptor, and an HER2 receptor, and the expression pattern setting unit sets the expression pattern of the target molecules by combining presence/absence of expressions of the estrogen receptor, the progesterone receptor, and the HER2 receptor.

5. The microscope system according to claim 1, wherein the specimen is stained by a molecule target pigment that visualizes an estrogen receptor, a progesterone receptor, an HER2 receptor, and a Ki-67, and the expression pattern setting unit sets the expression pattern of the target molecules by combining presence/absence of expressions of the estrogen receptor, the progesterone receptor, the HER2 receptor, and the Ki-67.

6. The microscope system according to claim 1, wherein the image acquiring unit acquires a plurality of specimen images by capturing individual parts of the specimen while relatively moving the specimen and an objective lens in a plane perpendicular to an optical axis of the objective lens, and the microscope system further comprises a specimen image generating unit that generates one specimen image by connecting the plurality of specimen images.

7. The microscope system according to claim 1, wherein the image acquiring unit captures the single image of a specimen at a single instance.

8. The microscope system according to claim 1, wherein the single image of a specimen is formed by a capturing images of a plurality of adjacent regions of the specimen at respective single instances.

9. A microscope specimen observing method, comprising:
acquiring a specimen image obtained by capturing at one instance an image of a specimen using a microscope configured for at least bright field observation, the specimen being stained by an element identification pigment visualizing one or more cell constituent elements constituting a cell and by a molecule target pigment visualizing a plurality of target molecules;
detecting a stain intensity of the element identification pigment staining a corresponding position in the specimen and a stain intensity of the molecule target pigment, for each pixel of the specimen image;
identifying an area of the cell constituent element in the specimen image, on the basis of the detected stain intensity of the element identification pigment;
extracting expression portions of the plurality of target molecules in the identified cell constituent element, on the basis of the detected stain intensity of the molecule target pigment at at least one pixel in the area of the identified cell constituent element;
setting an expression pattern of the target molecules including a combination of presence/absence of expression of the plurality of target molecules;
classifying an area of a cell corresponding to the expression pattern of the target molecules having been set, on the basis of a combination of expression portions of the plurality of target molecules included in the identified area of the cell;
generating a display image in which the classified area of the cell is labeled and displayed differently from other areas of the cell, and in which each of the plurality of expression patterns of the target molecules is labeled and displayed, wherein the generated display image also represents a staining state of the specimen stained by the element identification pigment on the basis of the detected stain intensity of the element identification pigment at each pixel in the captured single specimen image, and wherein the display image is generated by replacing a pixel value of the area of the cell classified into the expression pattern of the target molecules in the captured single specimen image with a predetermined display color; and displaying the display image.

10. The microscope specimen observing method according to claim 9, wherein the capturing of a single image of a specimen in the acquiring step is performed by capturing the single image of a specimen at a single instance.

11. A non-transitory computer-readable storage medium with an executable program stored thereon, wherein the program instructs a processor to perform:

acquiring a specimen image obtained by capturing a single image of a specimen using a microscope configured for at least bright field observation, the specimen being stained by an element identification pigment visualizing one or more cell constituent elements constituting a cell and by a molecule target pigment visualizing a plurality of target molecules;

detecting a stain intensity of the element identification pigment staining a corresponding position in the specimen and a stain intensity of the molecule target pigment, for each pixel of the specimen image;

identifying an area of the cell constituent element in the specimen image, on the basis of the detected stain intensity of the element identification pigment;

extracting expression portions of the plurality of target molecules in the cell constituent element, on the basis of the detected stain intensity of the molecule target pigment at at least one pixel in the identified area of the cell constituent element;

setting an expression pattern of the target molecules including a combination of presence/absence of expression of the plurality of target molecules;

classifying an area of a cell corresponding to the expression pattern of the target molecules having been set, on the basis of a combination of expression portions of the plurality of target molecules included in the identified area of the cell;

generating a display image in which the classified area of the cell is labeled and displayed differently from other areas of the cell, and in which each of the plurality of expression patterns of the target molecules is labeled and displayed, wherein the generated display image also represents a staining state of the specimen stained by the element identification pigment on the basis of the detected stain intensity of the element identification pigment at each pixel in the captured single specimen image, and wherein the display image is generated by replacing a pixel value of the area of the cell classified into the expression pattern of the target molecules in the captured single specimen image with a predetermined display color; and displaying the display image.

12. The microscope specimen observing method according to claim 9, wherein the capturing of a single image of a specimen in the acquiring step is performed by capturing images of a plurality of adjacent regions of the specimen at respective single instances to form said single image of a specimen.

13. The non-transitory computer-readable storage medium with an executable program stored thereon according to claim 11, wherein the capturing of a single image of a specimen in the acquiring step is performed by capturing the single image of a specimen at a single instance.

14. The non-transitory computer-readable storage medium with an executable program stored thereon according to claim 11, wherein the capturing of a single image of a specimen in the acquiring step is performed by capturing images of a plurality of adjacent regions of the specimen at respective single instances to form said single image of a specimen.

* * * * *